(12) United States Patent
Michael

(10) Patent No.: US 8,985,867 B2
(45) Date of Patent: Mar. 24, 2015

(54) OPTICAL FIBER CONNECTION SYSTEM

(75) Inventor: James Ott Michael, Chaska, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 148 days.

(21) Appl. No.: 13/607,283

(22) Filed: Sep. 7, 2012

(65) Prior Publication Data
US 2013/0216186 A1 Aug. 22, 2013

Related U.S. Application Data

(60) Provisional application No. 61/531,855, filed on Sep. 7, 2011.

(51) Int. Cl.
*G02B 6/38* (2006.01)
*G02B 6/36* (2006.01)

(52) U.S. Cl.
CPC .............. *G02B 6/3825* (2013.01); *G02B 6/389* (2013.01)
USPC .............................................. 385/88; 385/60

(58) Field of Classification Search
None
See application file for complete search history.

(56) References Cited

U.S. PATENT DOCUMENTS

| | | | |
|---|---|---|---|
| 4,102,561 A | 7/1978 | Hawk et al. | |
| 4,320,938 A | 3/1982 | Gunnersen et al. | |
| 4,411,491 A | 10/1983 | Larkin et al. | |
| 4,929,046 A | 5/1990 | Barlow | |
| 5,125,056 A | 6/1992 | Hughes et al. | |
| 5,321,917 A | 6/1994 | Franklin et al. | |
| 5,631,985 A | 5/1997 | Yamada et al. | |
| 5,674,114 A | 10/1997 | Miller et al. | |
| 5,694,506 A | 12/1997 | Kobayashi et al. | |
| 5,732,174 A * | 3/1998 | Carpenter et al. | 385/72 |
| 5,993,071 A | 11/1999 | Hultermans | |
| 6,099,392 A | 8/2000 | Wiegand et al. | |

(Continued)

FOREIGN PATENT DOCUMENTS

| | | |
|---|---|---|
| EP | 0 928 978 A1 | 7/1999 |
| EP | 1 143 277 A2 | 10/2001 |

(Continued)

OTHER PUBLICATIONS

Fiber Stripper, Tools and Consumables, http://www.go4fiber.com/spec/Fiber%20Stripper.pdf, 2 pages (Downloaded Jun. 8, 2011).

(Continued)

*Primary Examiner* — Tina Wong
(74) *Attorney, Agent, or Firm* — Merchant & Gould, P.C.

(57) ABSTRACT

An optical fiber connection system includes a first and a second optical fiber, each with end portions that are terminated by a first and a second fiber optic connector, respectively. A fiber optic adapter connects the first and the second fiber optic connectors. A fiber alignment apparatus includes V-blocks and gel blocks. Each of the fiber optic connectors includes a connector housing and a sheath. The end portions of the optical fibers are positioned beyond distal ends of the respective connector housings. The sheath is slidably connected to the connector housing and slides between an extended configuration and a retracted configuration. The sheath covers the end portion of the respective optical fiber when the sheath is at the extended configuration and exposes the end portion when at the retracted configuration. The end portions of the optical fibers are cleaned when slid between the V-blocks and the gel blocks.

24 Claims, 51 Drawing Sheets

(56) References Cited

U.S. PATENT DOCUMENTS

| | | |
|---|---|---|
| 6,275,642 B1 | 8/2001 | Pouyez et al. |
| 6,491,444 B1 | 12/2002 | Greub et al. |
| 6,648,521 B2 * | 11/2003 | Roehrs et al. .................... 385/84 |
| 6,678,442 B2 * | 1/2004 | Gall et al. ........................ 385/24 |
| 6,779,931 B2 | 8/2004 | Murata et al. |
| 6,808,444 B1 | 10/2004 | Kuprin et al. |
| 6,918,816 B2 | 7/2005 | Bianchi |
| 6,951,425 B2 | 10/2005 | Vergeest |
| 7,114,855 B2 | 10/2006 | Wittrisch |
| 7,192,194 B2 | 3/2007 | Giotto et al. |
| 7,822,309 B2 | 10/2010 | Bianchi |
| 7,833,090 B2 | 11/2010 | Lu |
| 8,442,375 B2 | 5/2013 | Bylander et al. |
| 8,579,518 B2 | 11/2013 | Isenhour et al. |
| 2003/0202752 A1 | 10/2003 | Gall et al. |
| 2004/0057676 A1 | 3/2004 | Doss et al. |
| 2005/0207708 A1 | 9/2005 | Wittrisch |
| 2007/0196053 A1 | 8/2007 | Kewitsch |
| 2010/0183265 A1 | 7/2010 | Barnes et al. |
| 2010/0302530 A1 | 12/2010 | Liu et al. |
| 2010/0303434 A1 | 12/2010 | Liu et al. |
| 2011/0229094 A1 | 9/2011 | Isenhour et al. |
| 2013/0156379 A1 | 6/2013 | Ott |
| 2013/0183001 A1 * | 7/2013 | Ott .................................. 385/72 |

FOREIGN PATENT DOCUMENTS

| | | |
|---|---|---|
| KR | 10-0493336 B1 | 6/2005 |
| WO | WO 83/00935 | 3/1983 |
| WO | WO 2012/112343 A1 | 8/2012 |
| WO | WO 2012/112344 A1 | 8/2012 |

OTHER PUBLICATIONS

Industrial Oil Gels, http://www.kraton.com/Applications/Coatings_and_Gels/Industrial_Oil_Gels[Jul. 26, 2011 9:35:23 AM], 1 page (Copyright 2011).

Kraton Polymers—Giving Innovators Their Edge, http://www.kratom.com [Jul. 26, 2011 9:40:47 AM], 2 pages (Copyright 2011).

Stripping Tools, http://www.techoptics.com/pages/p102htool.html, 1 page (Downloaded Jun. 8, 2011).

International Search Report and Written Opinion for PCT/US2012/054274 mailed Feb. 27, 2013.

* cited by examiner

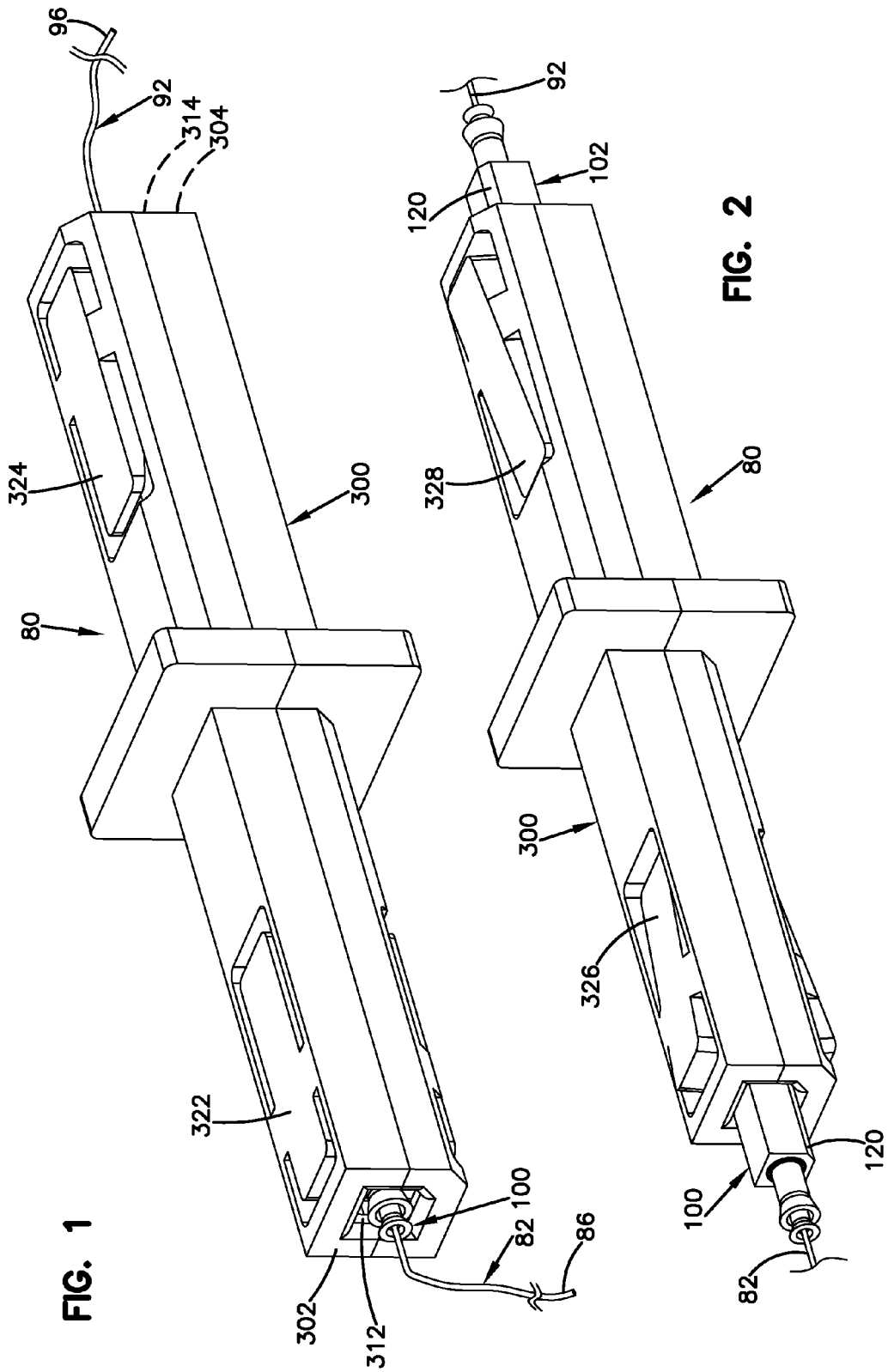

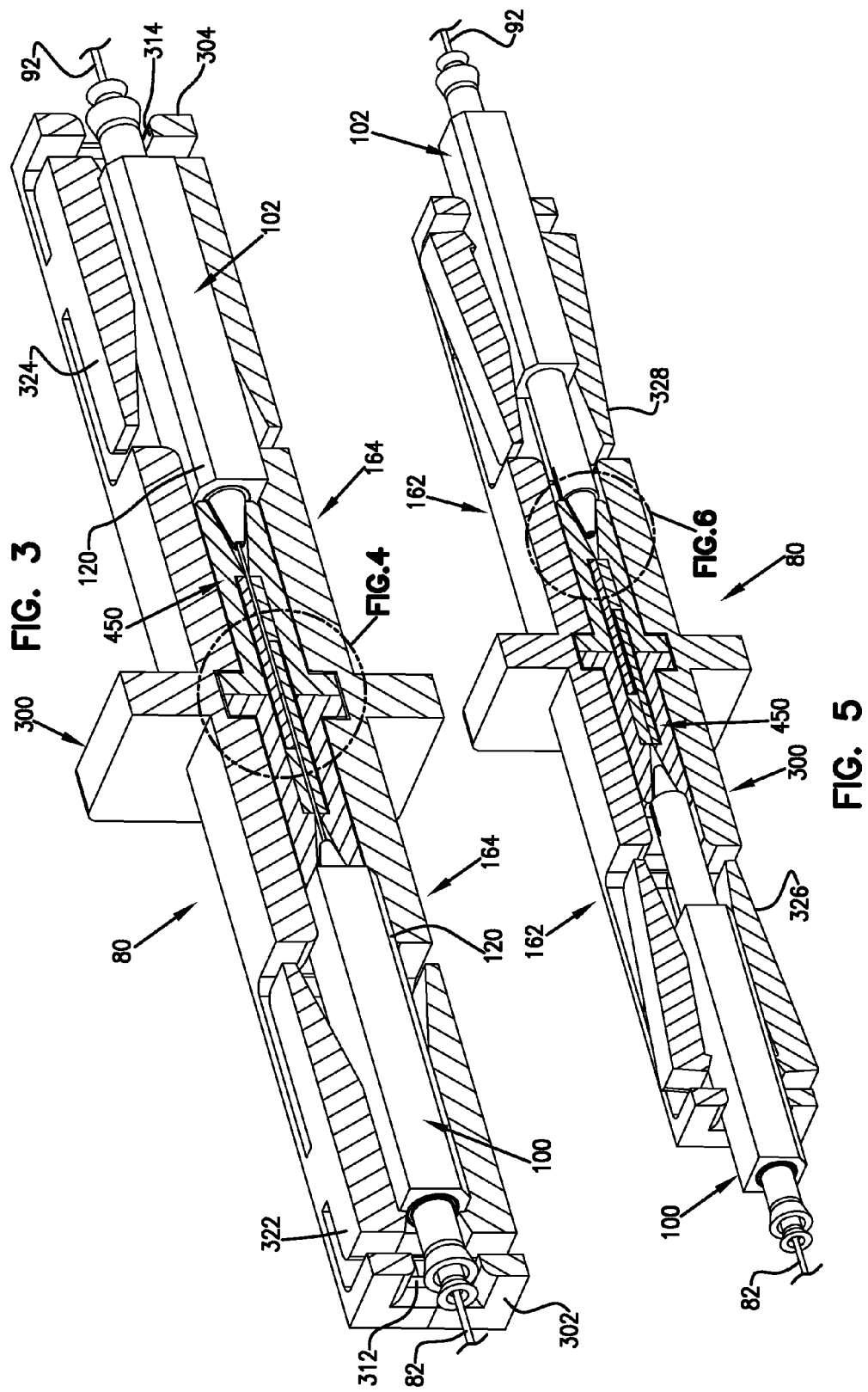

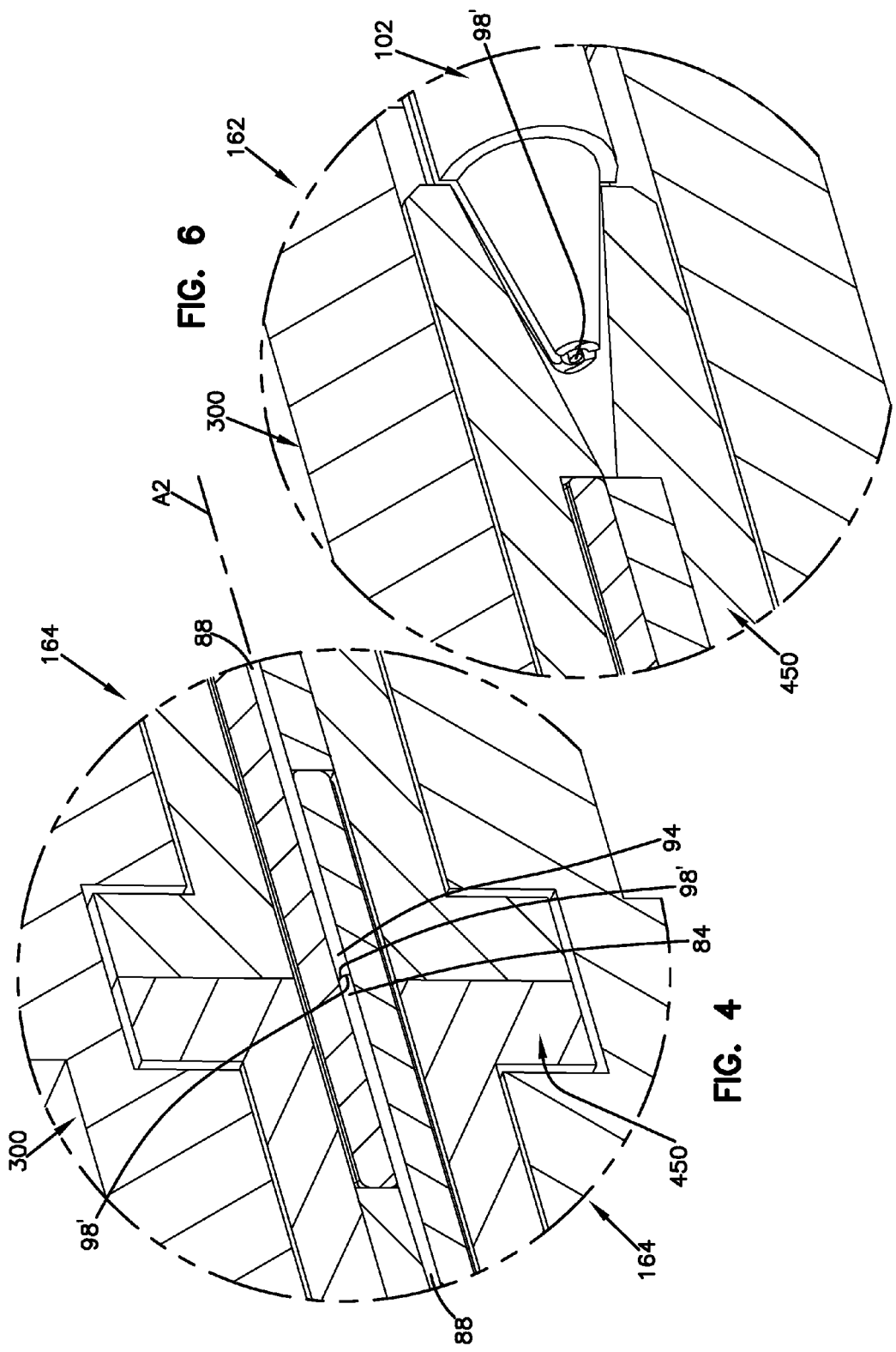

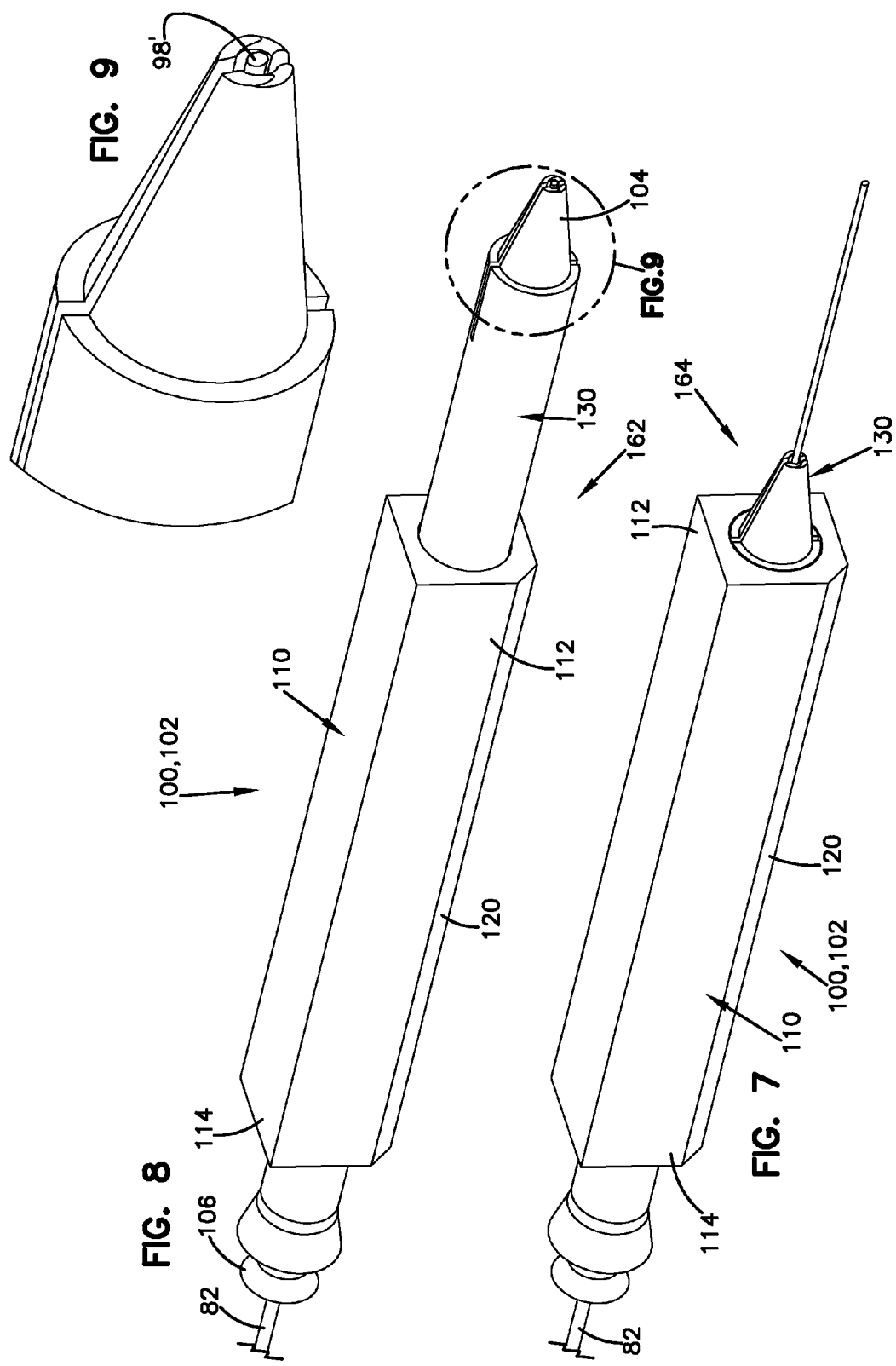

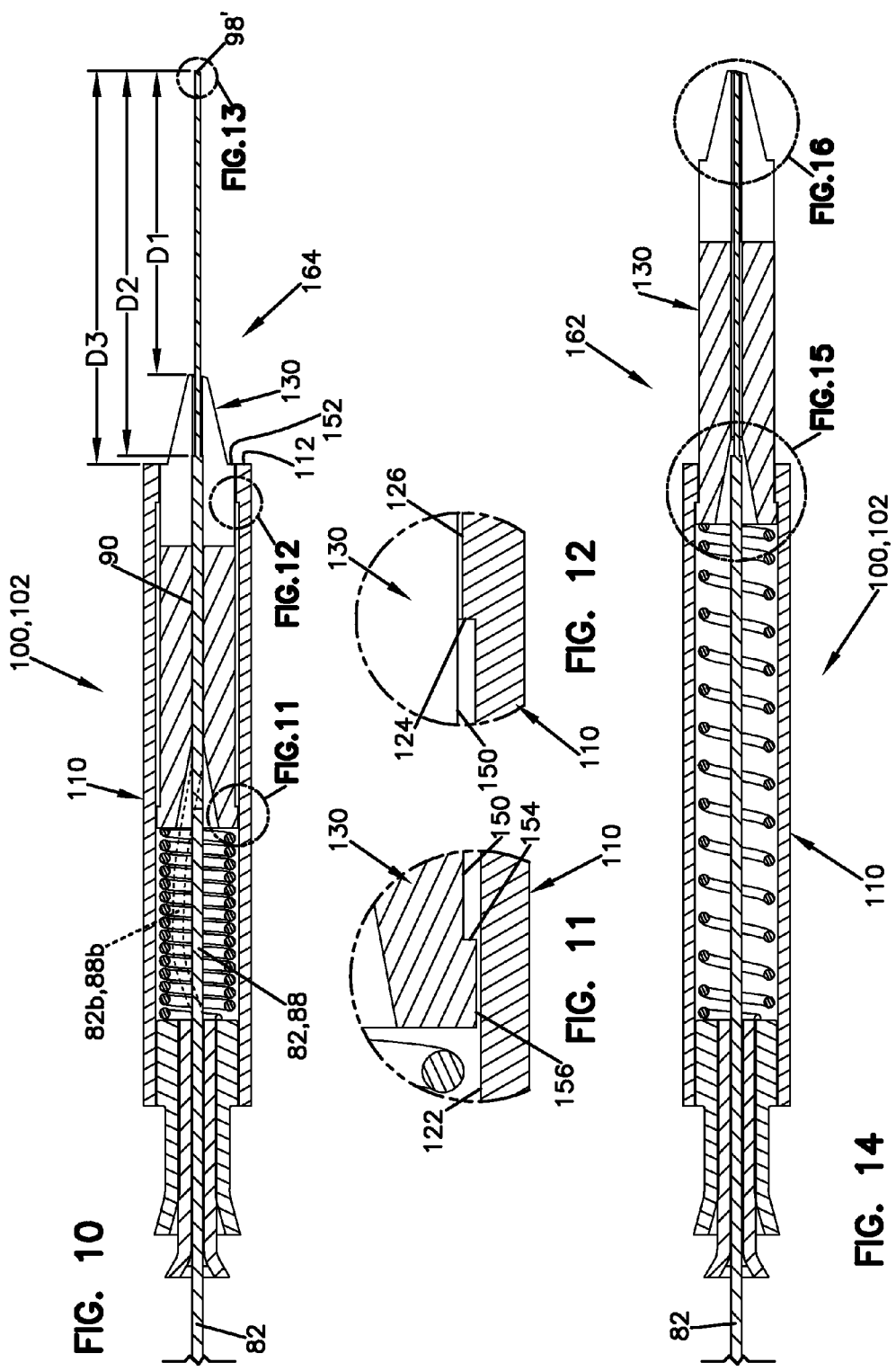

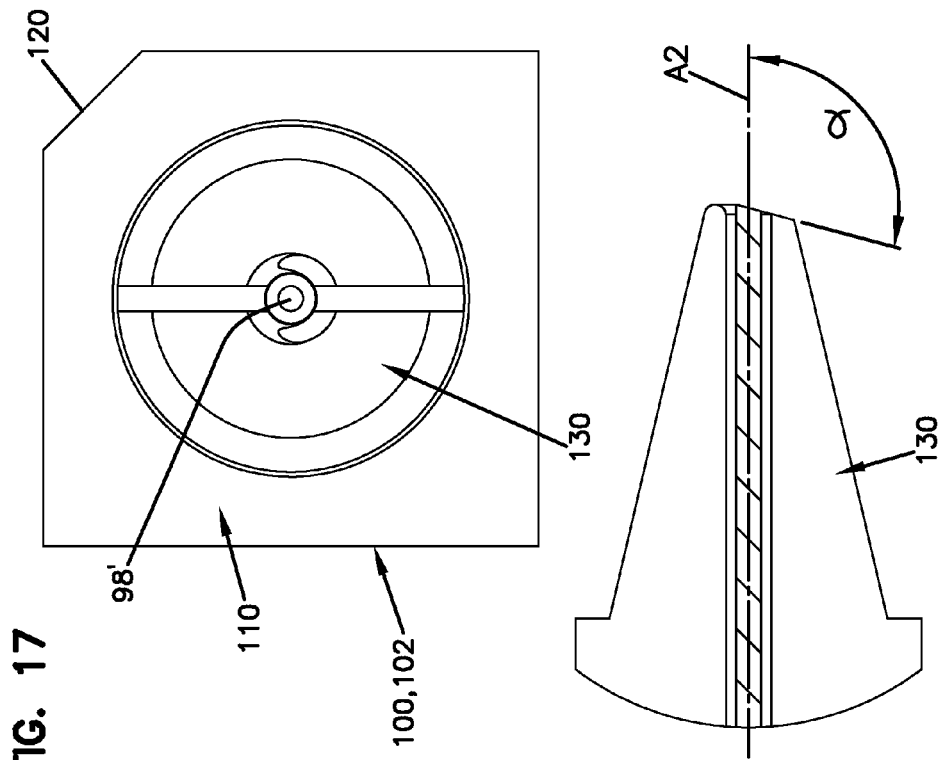
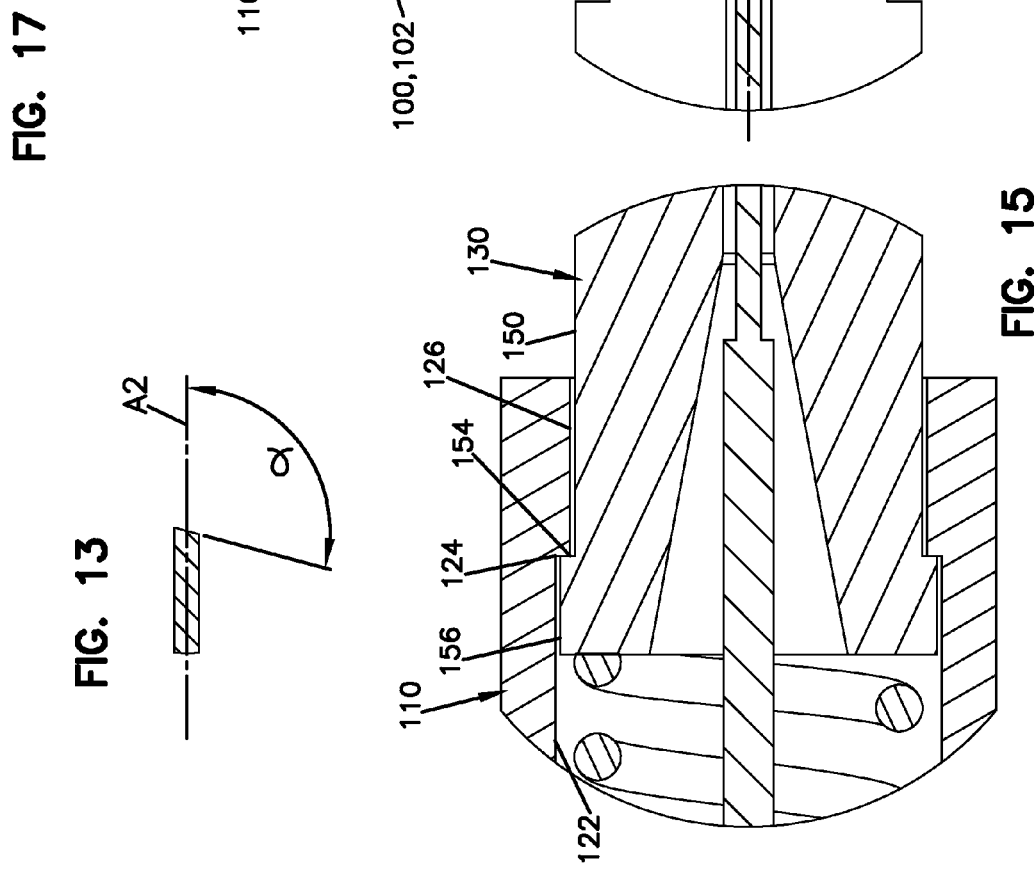

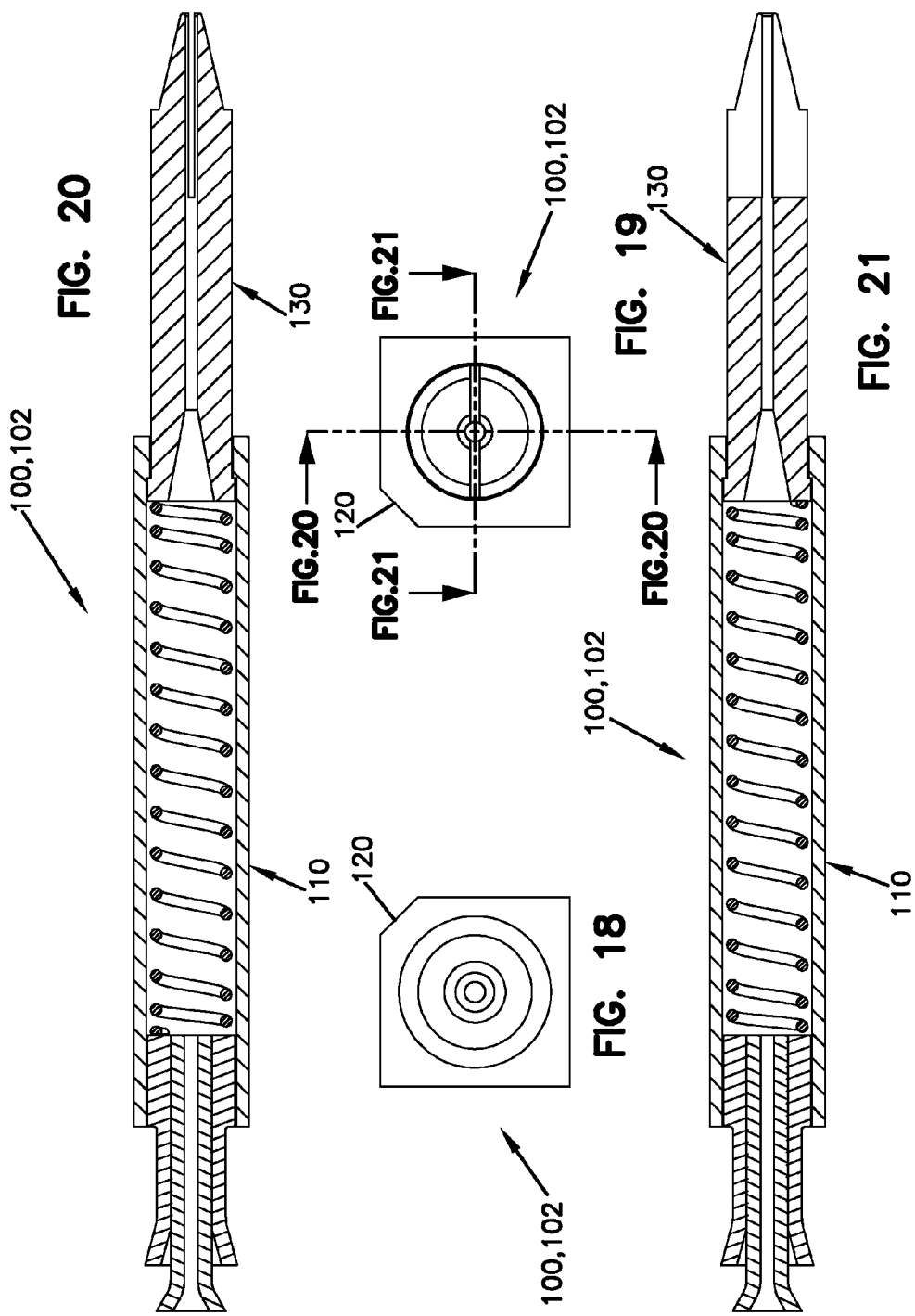

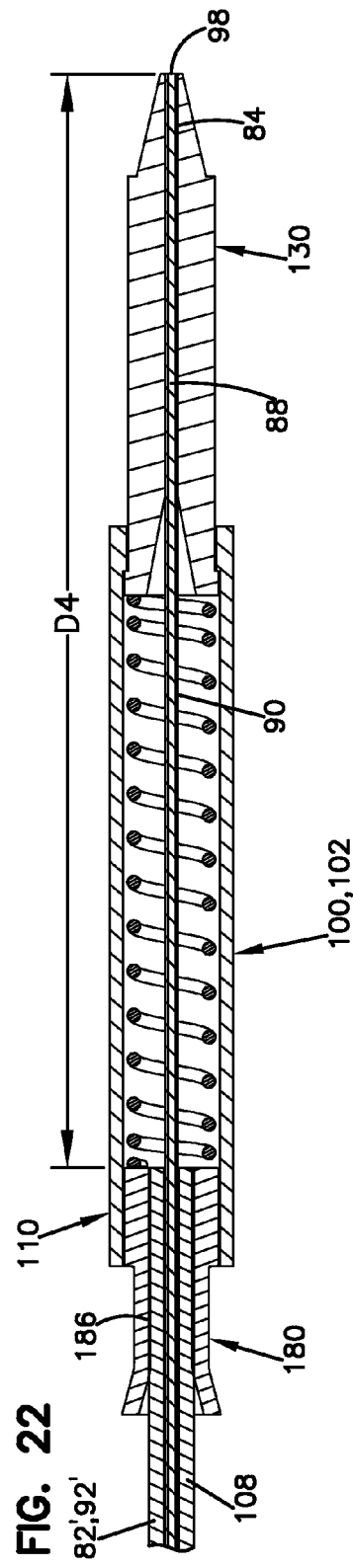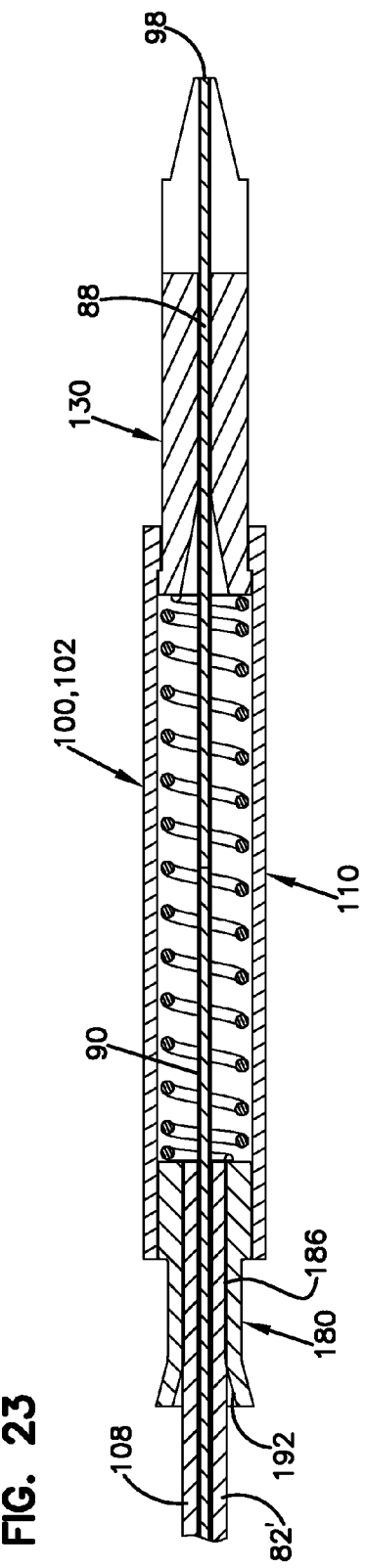

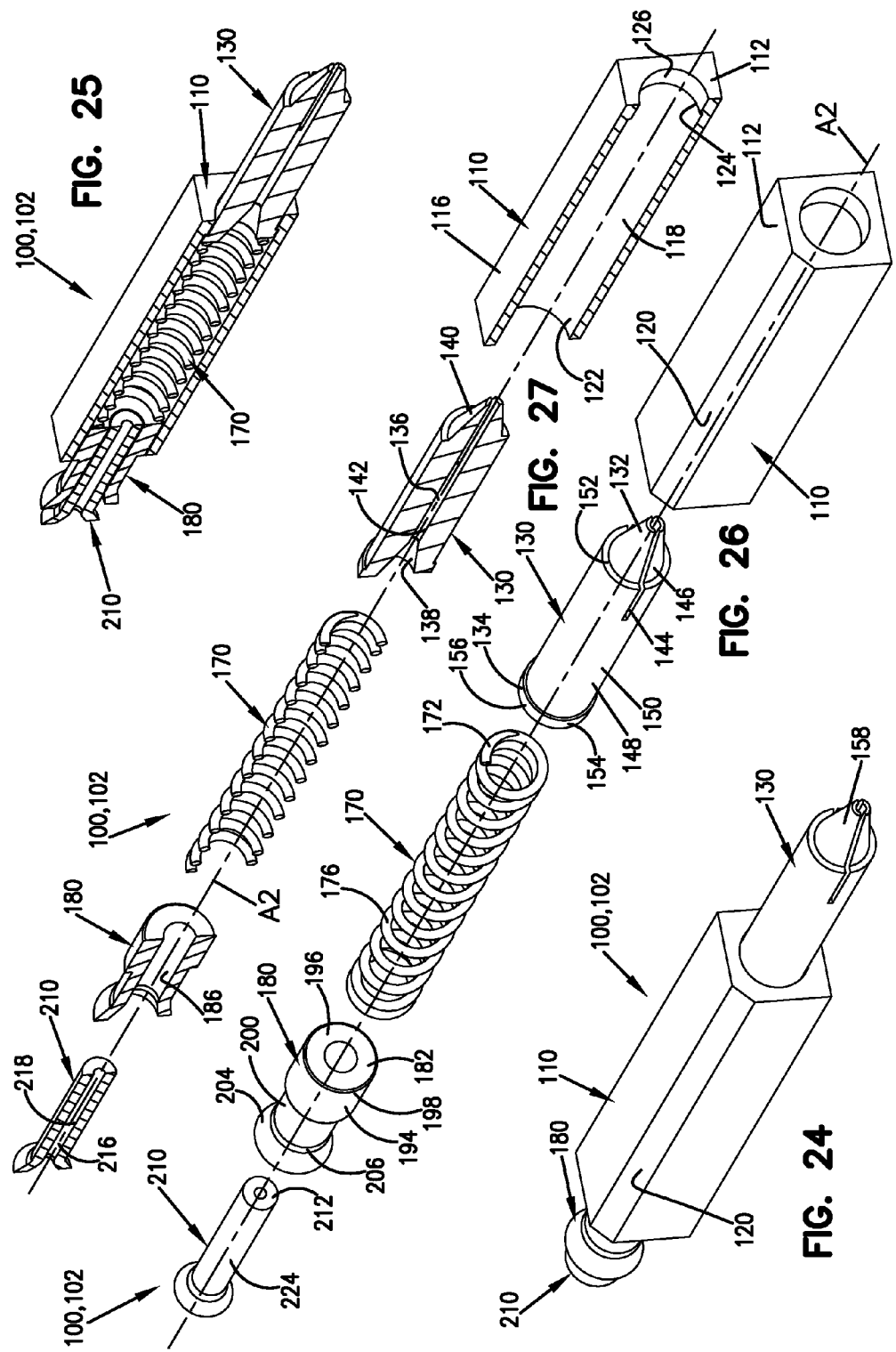

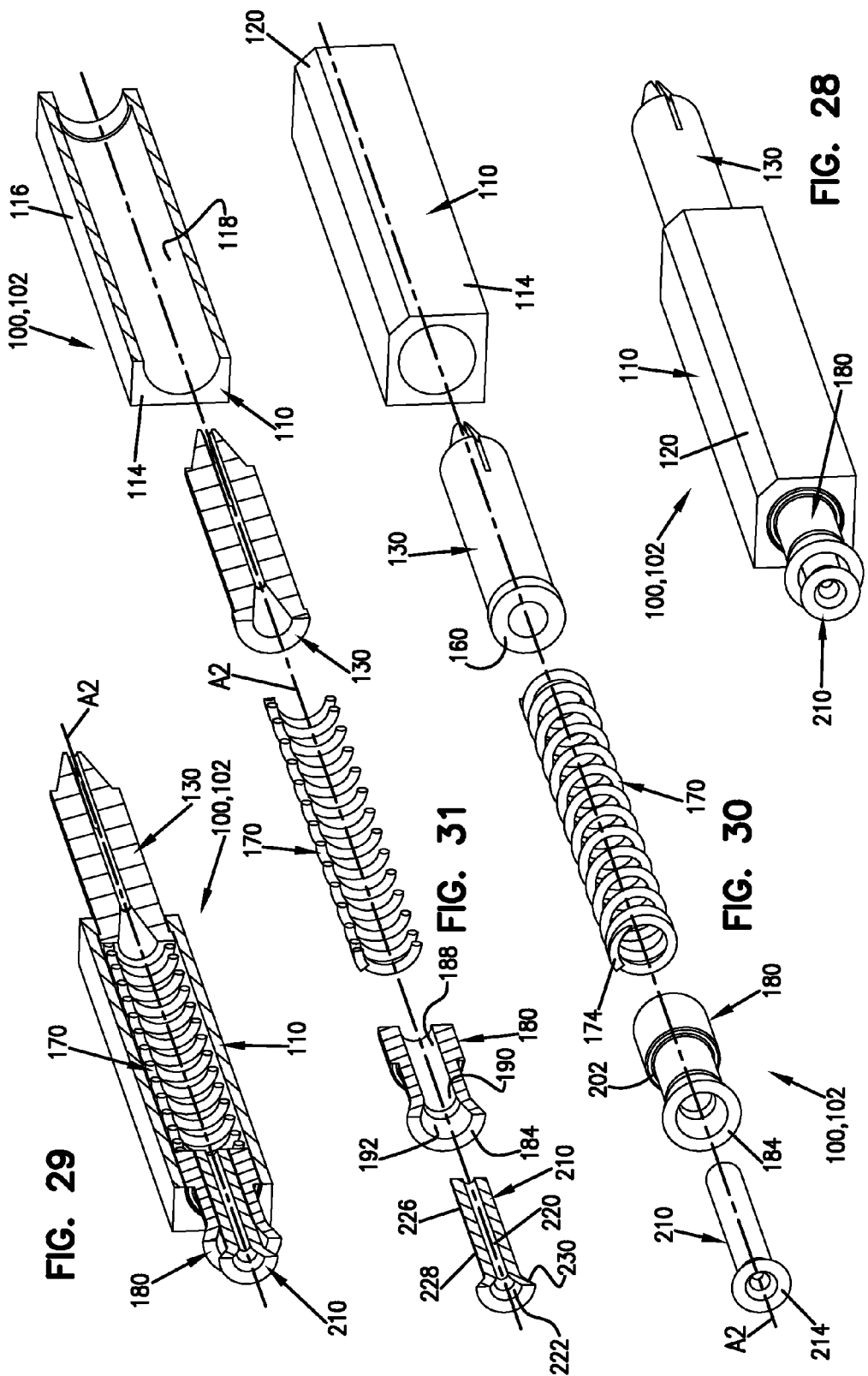

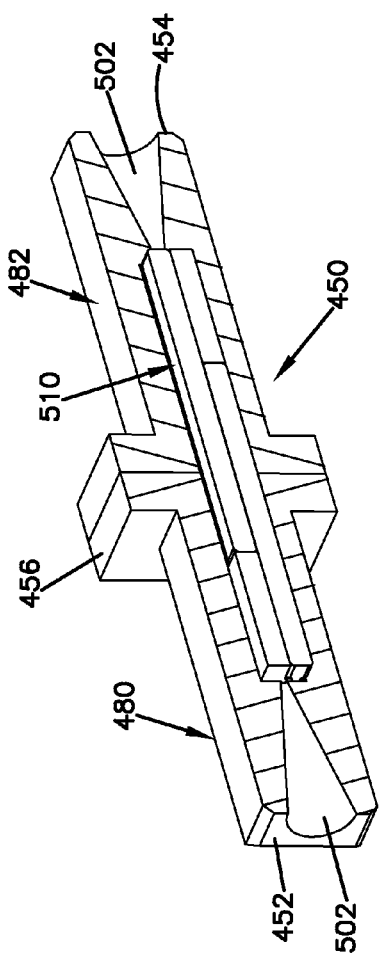
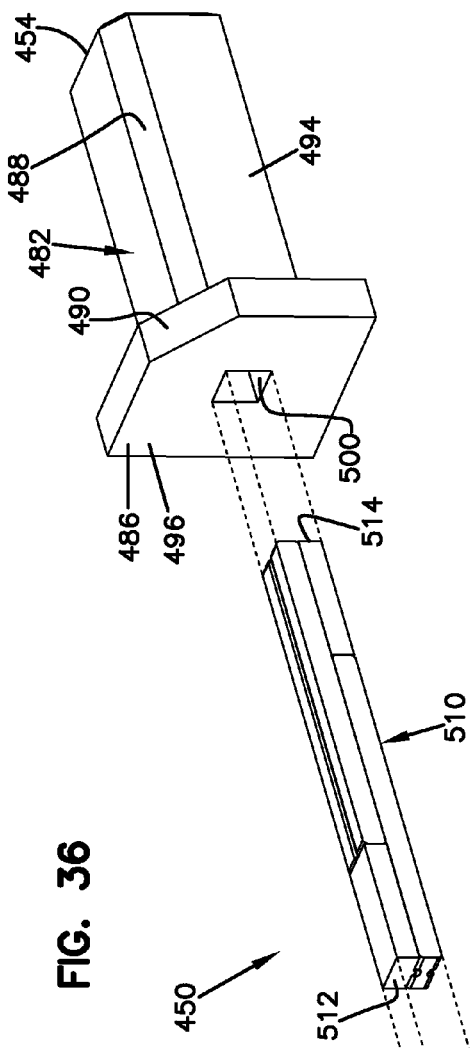
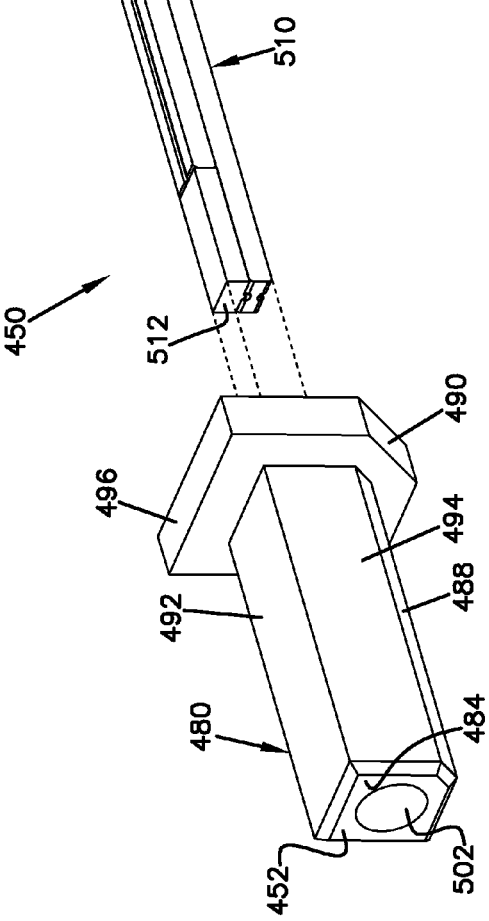
FIG. 36
FIG. 37

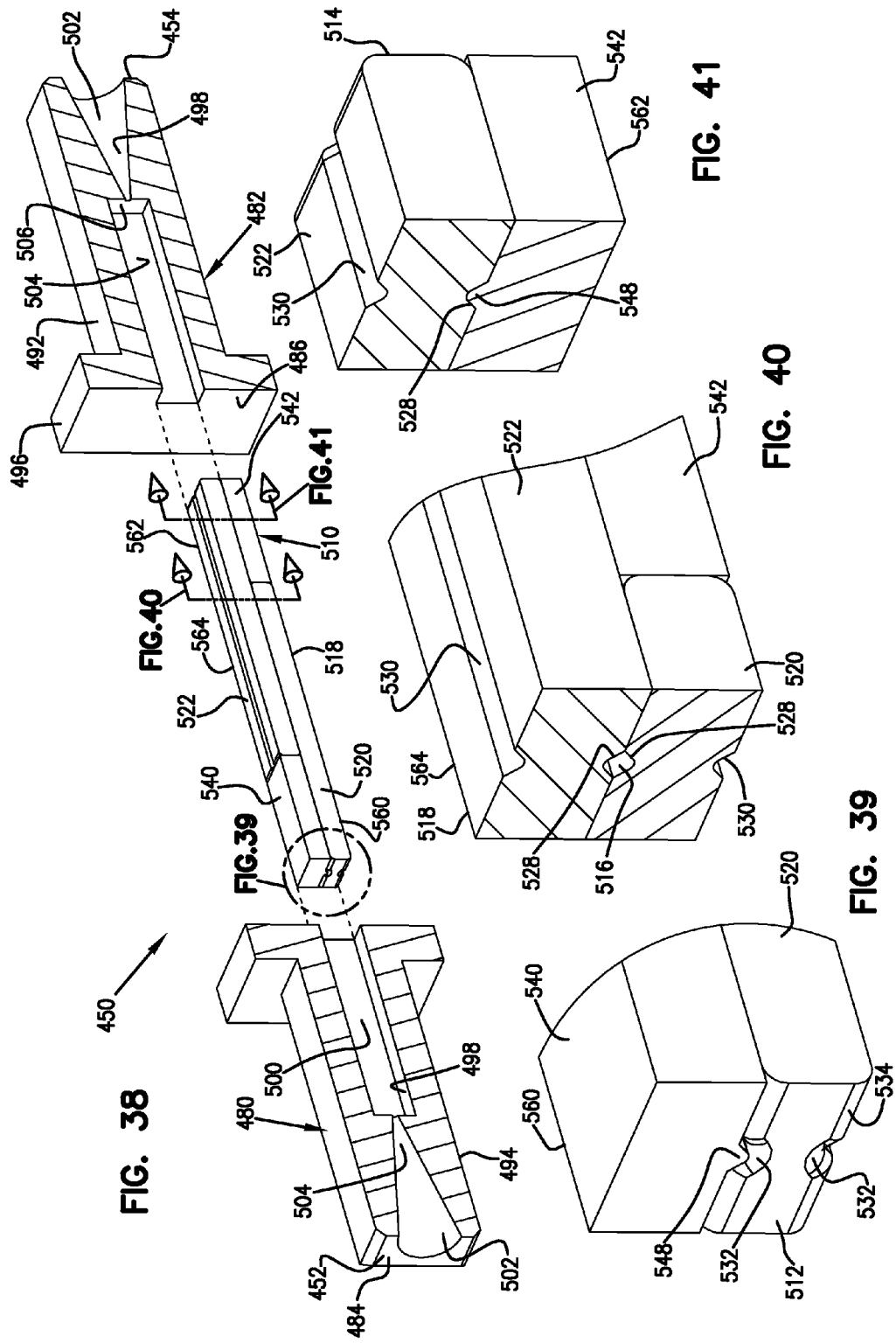

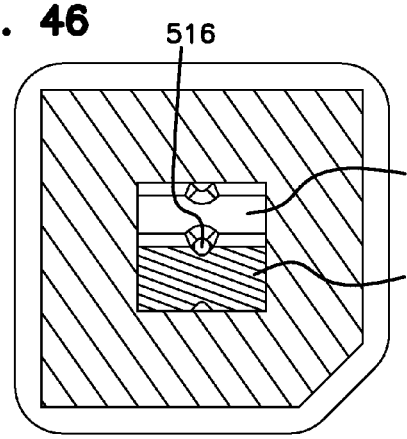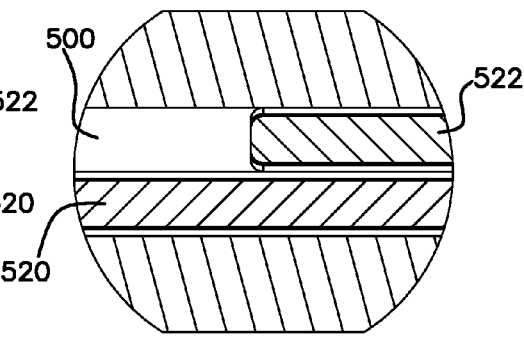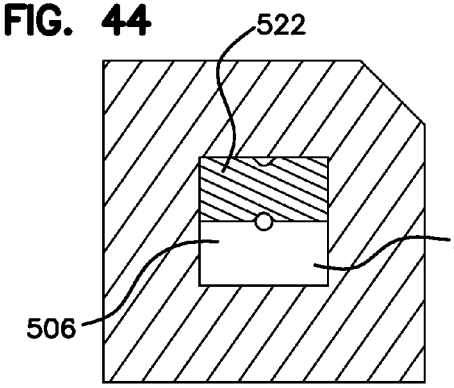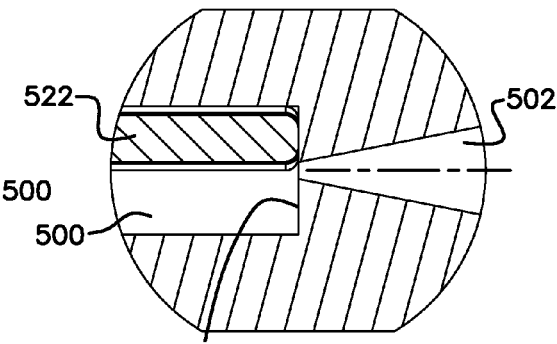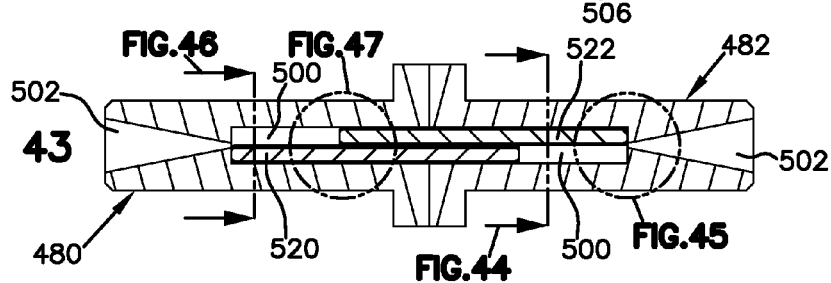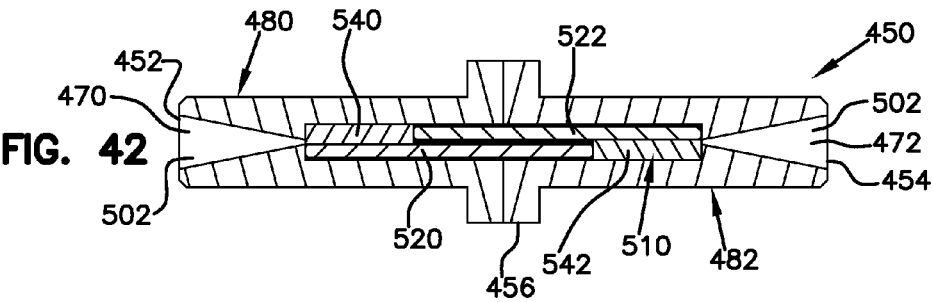

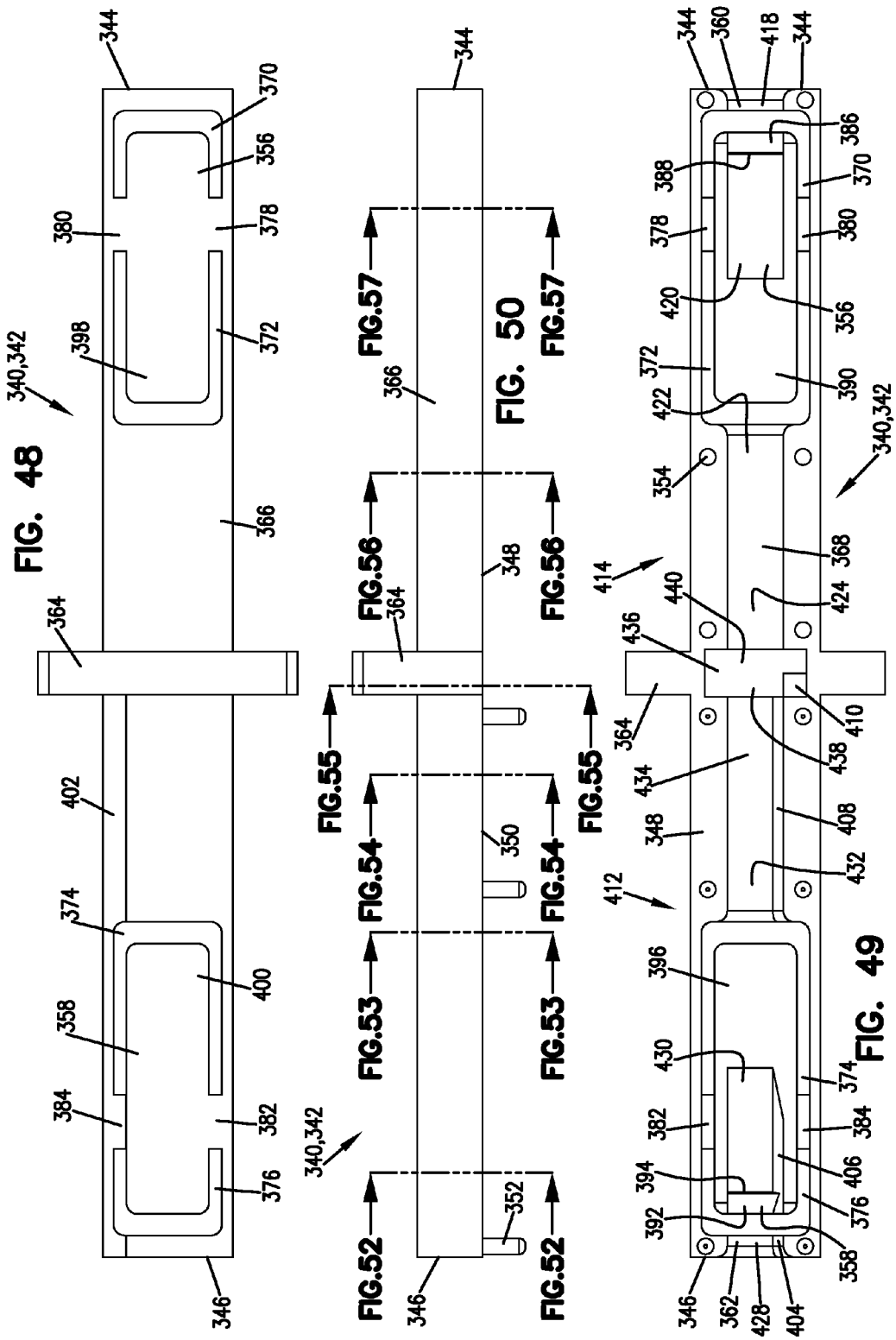

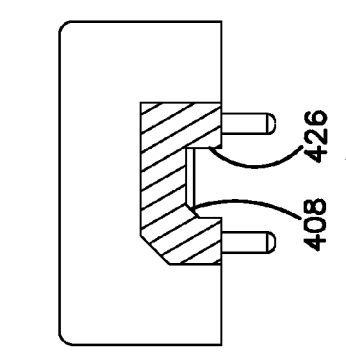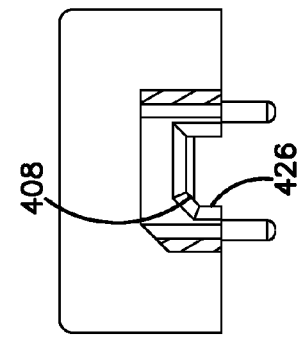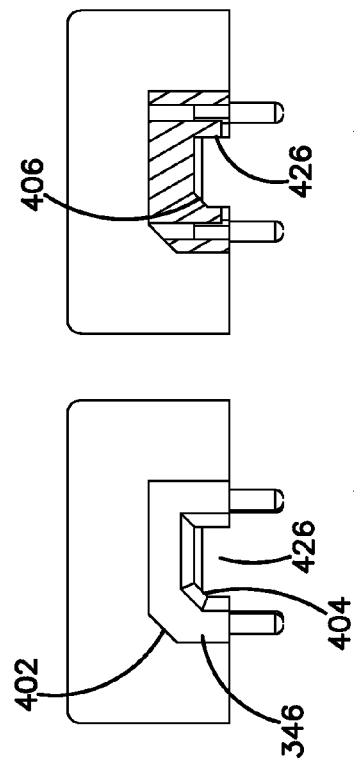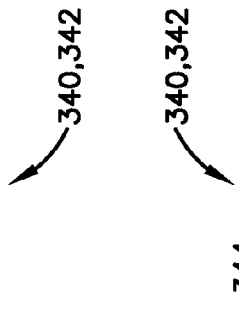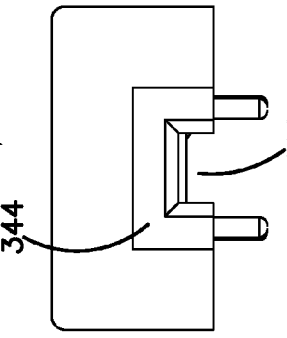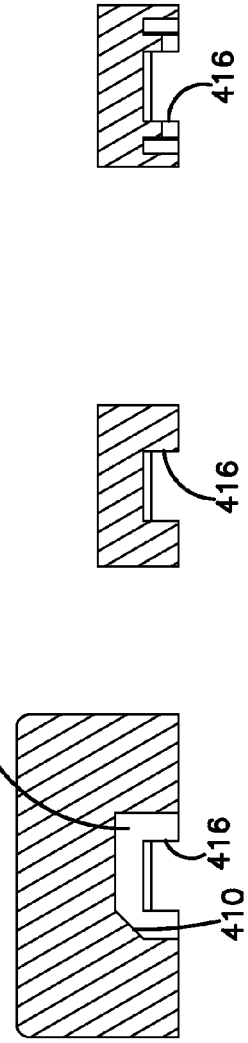

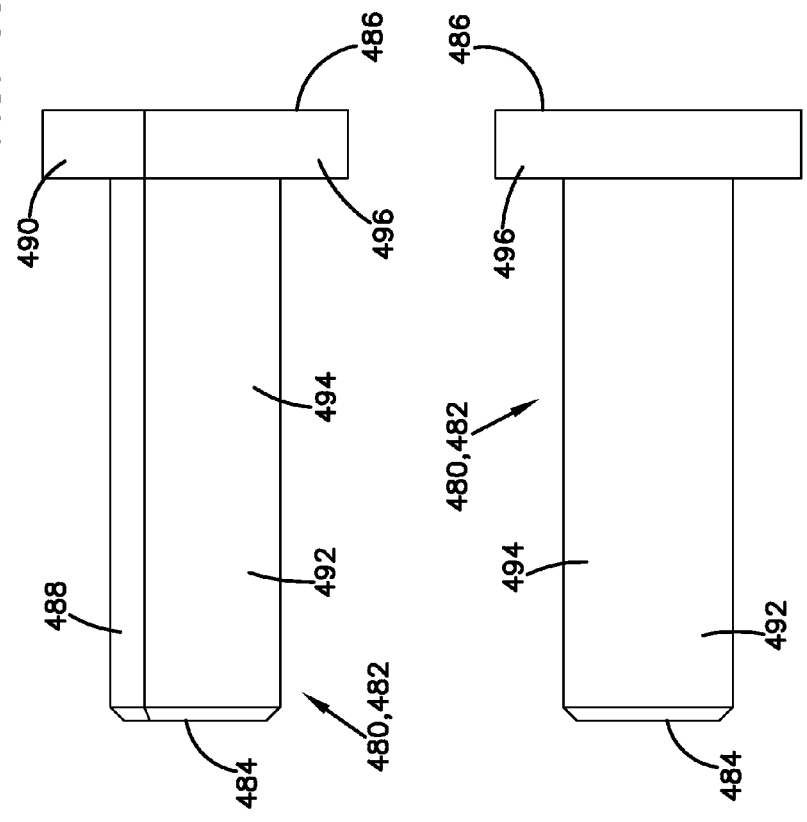
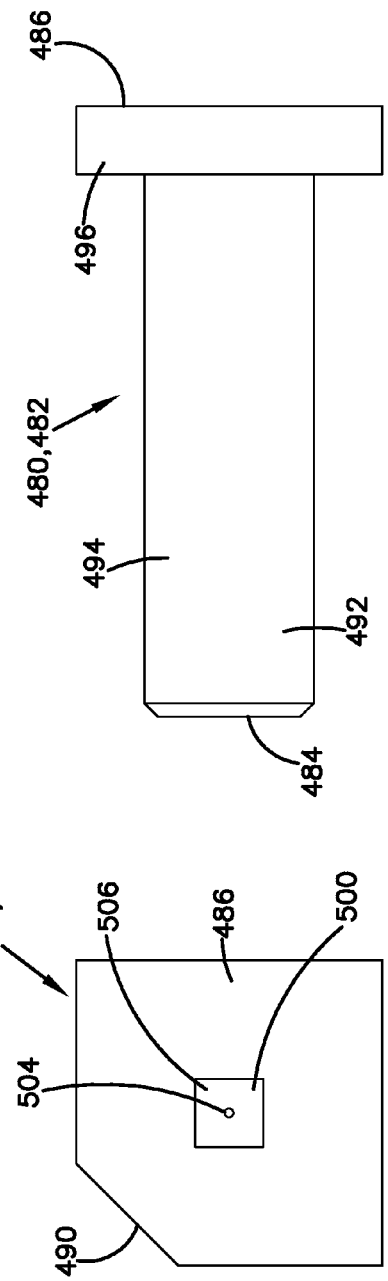
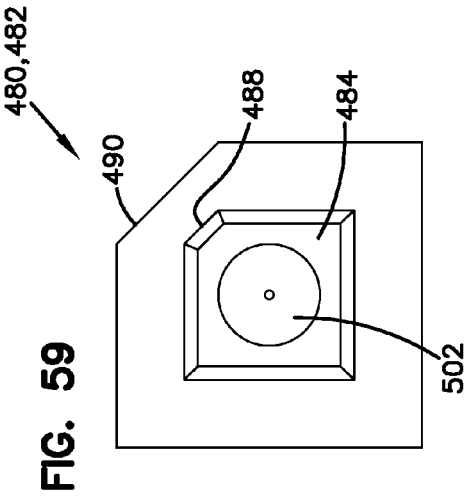

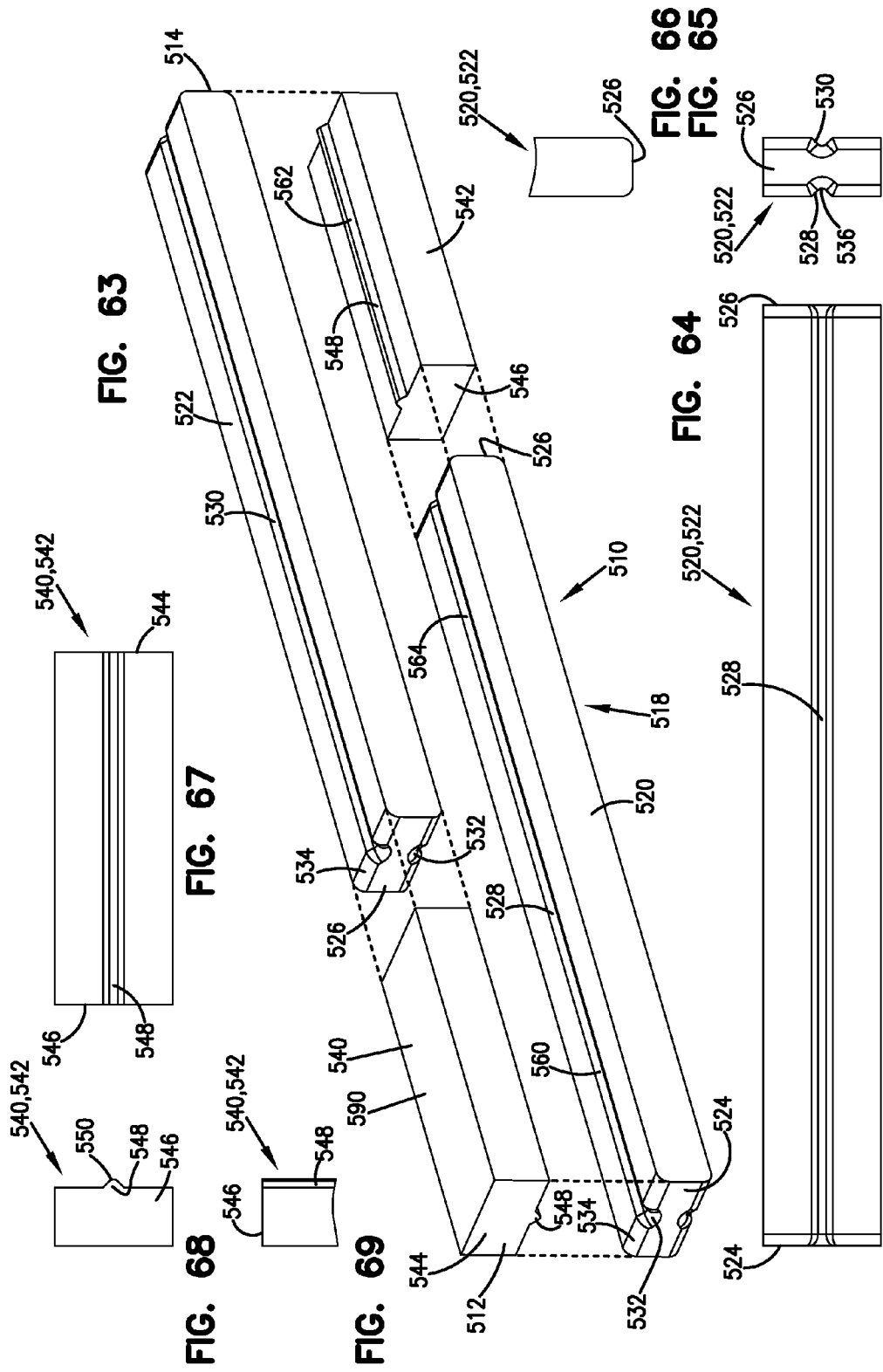

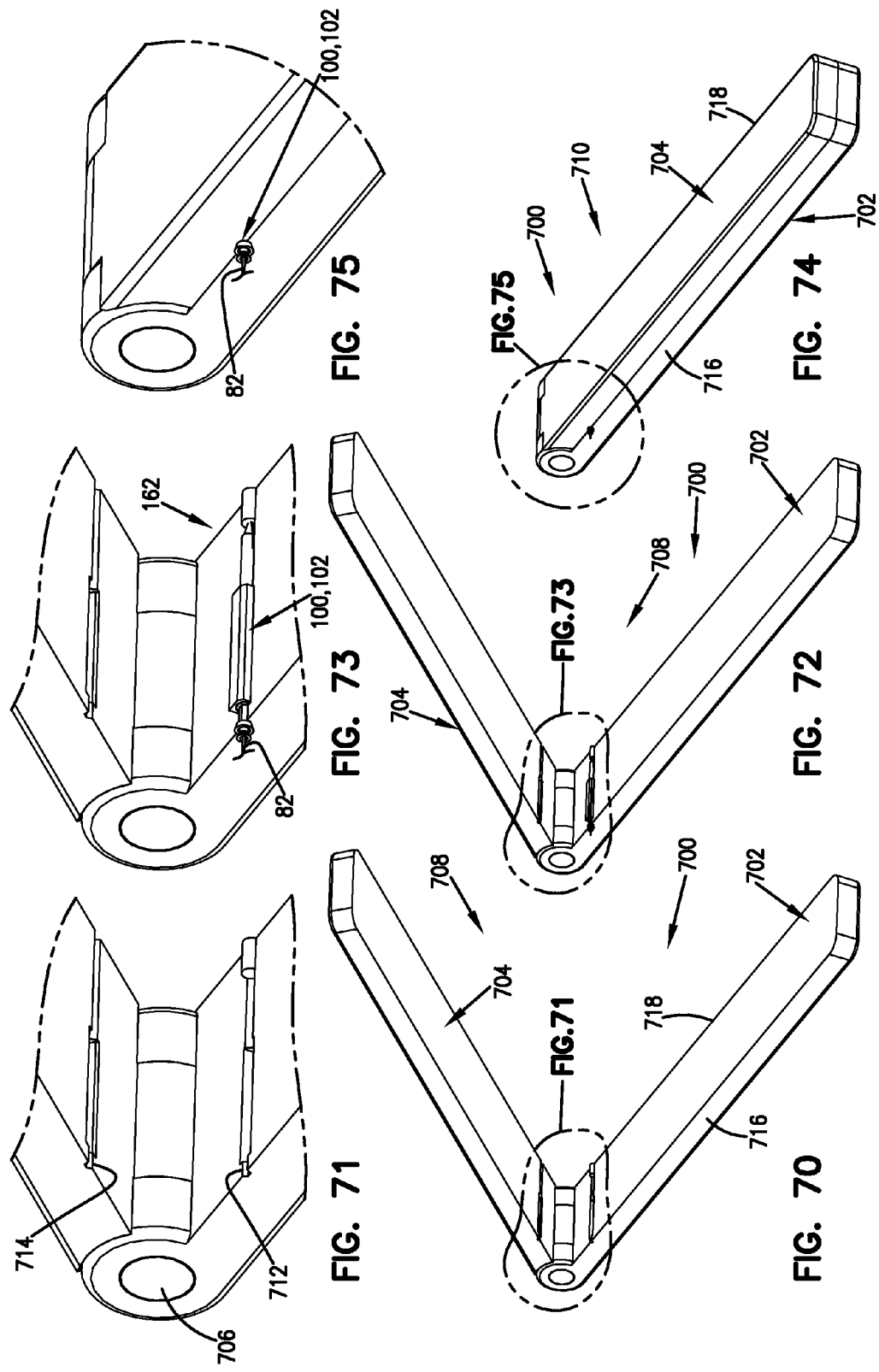

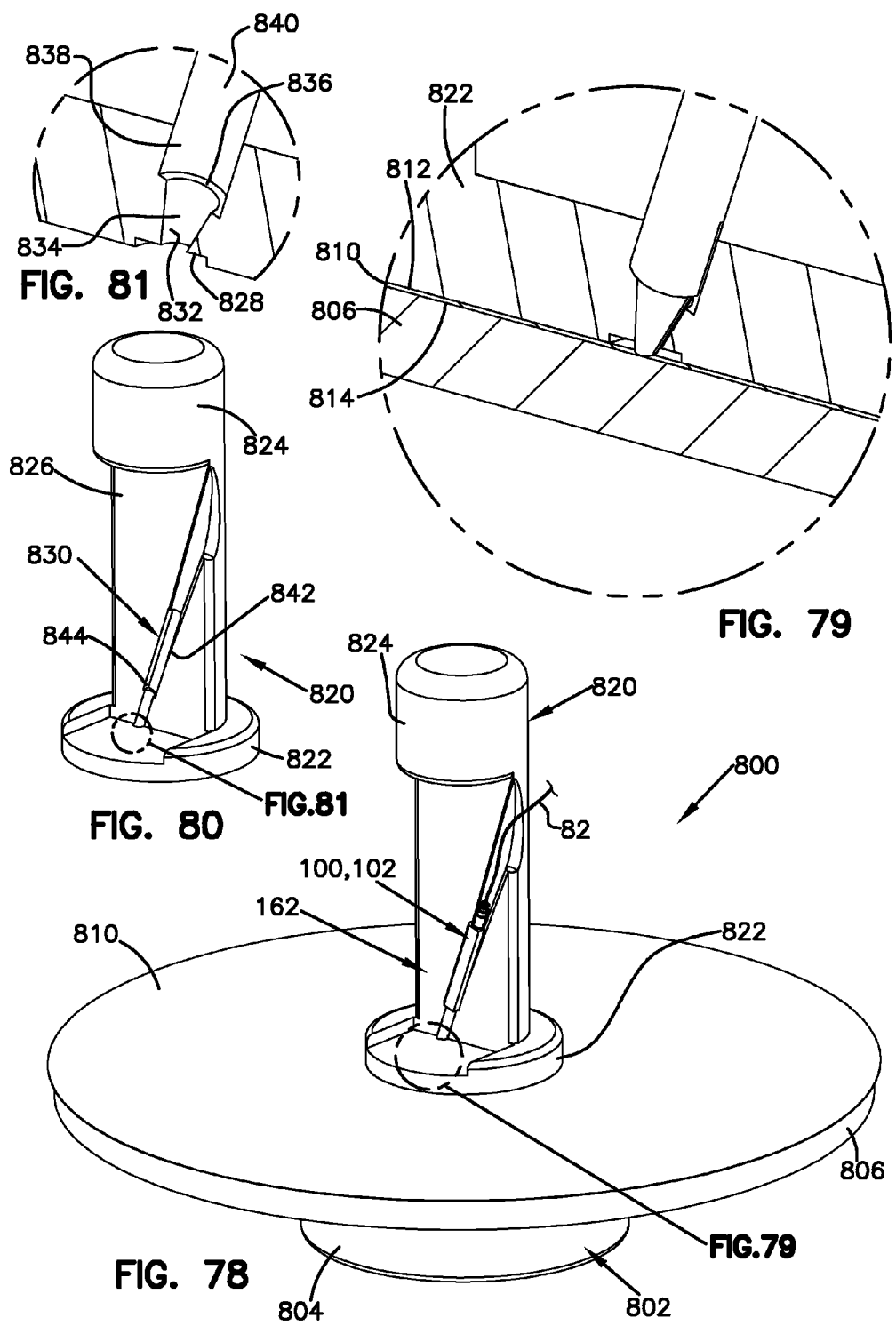

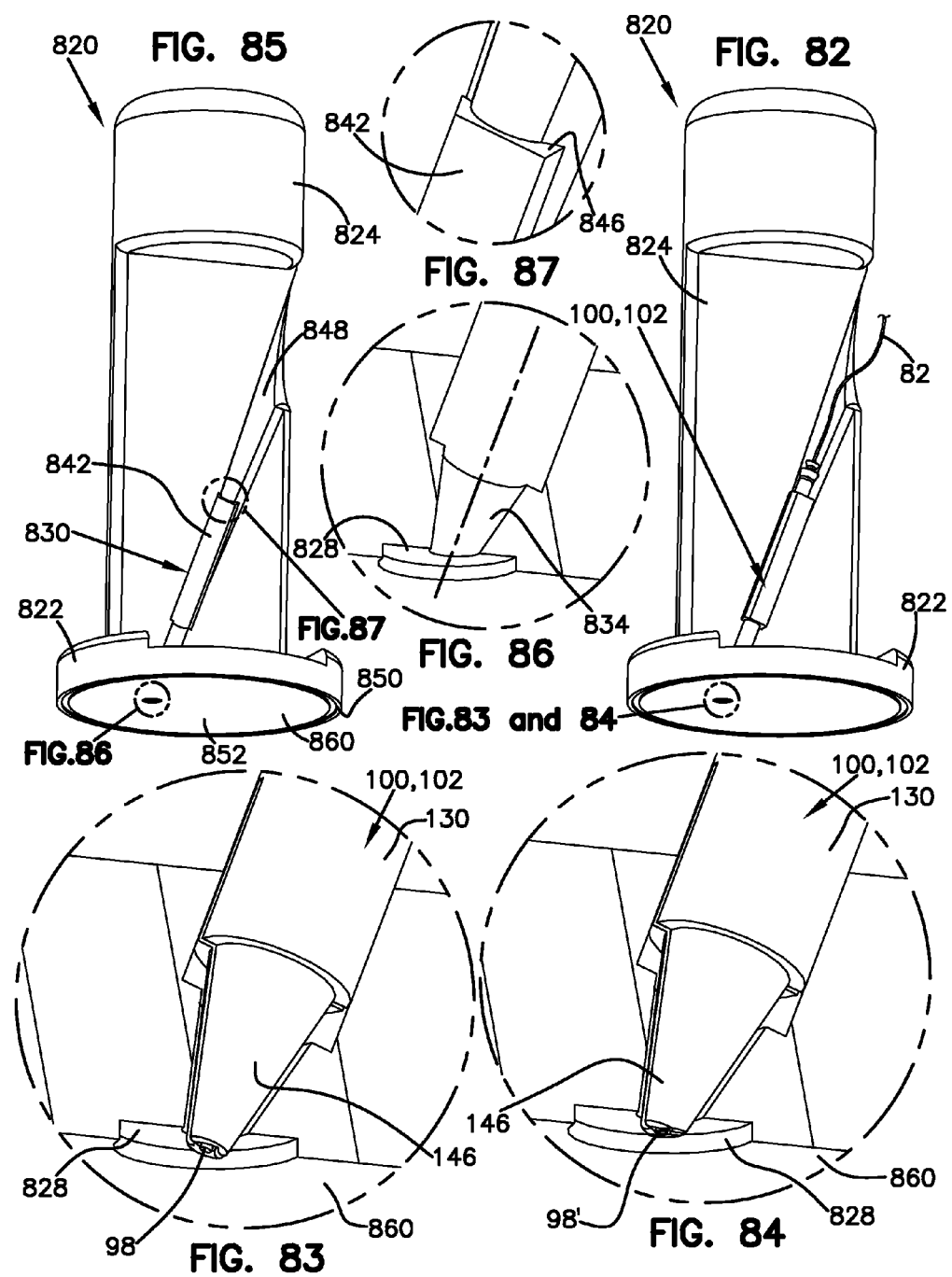

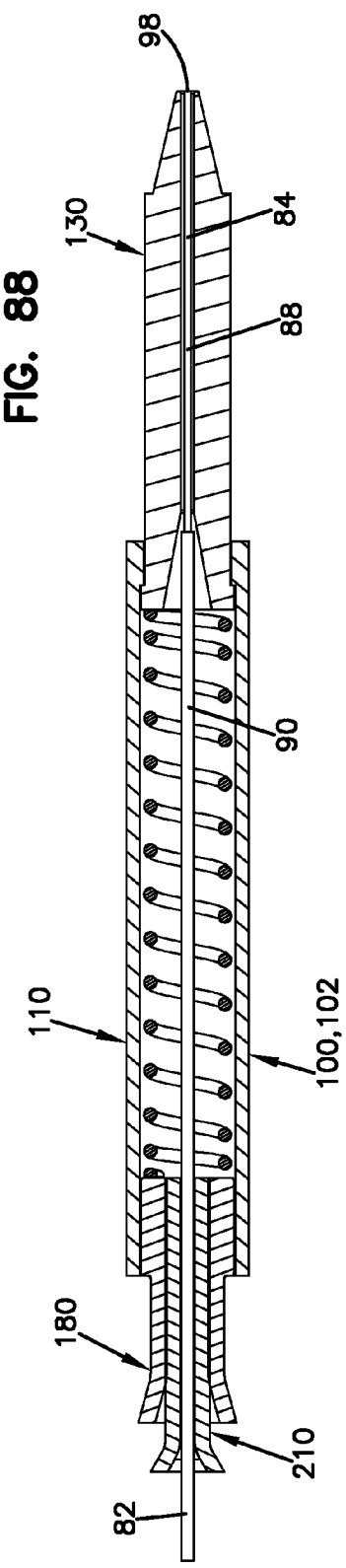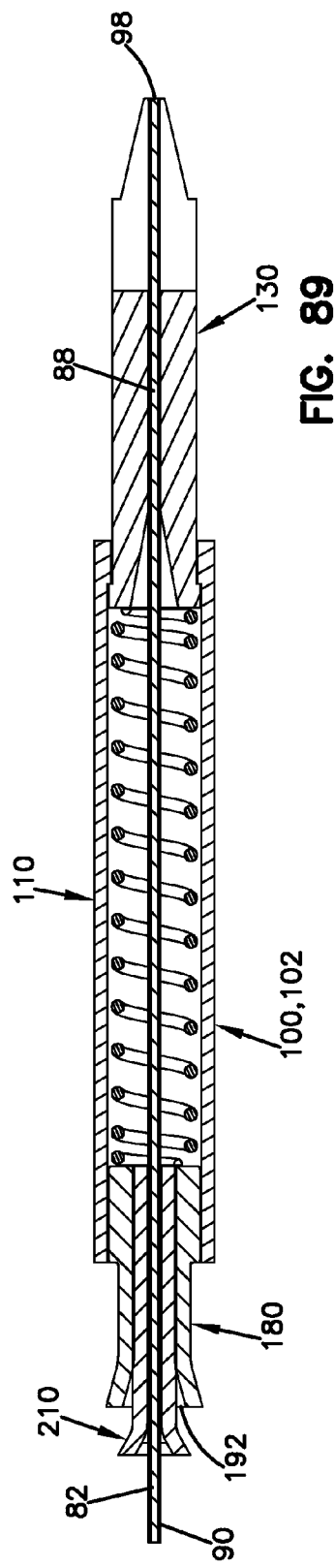

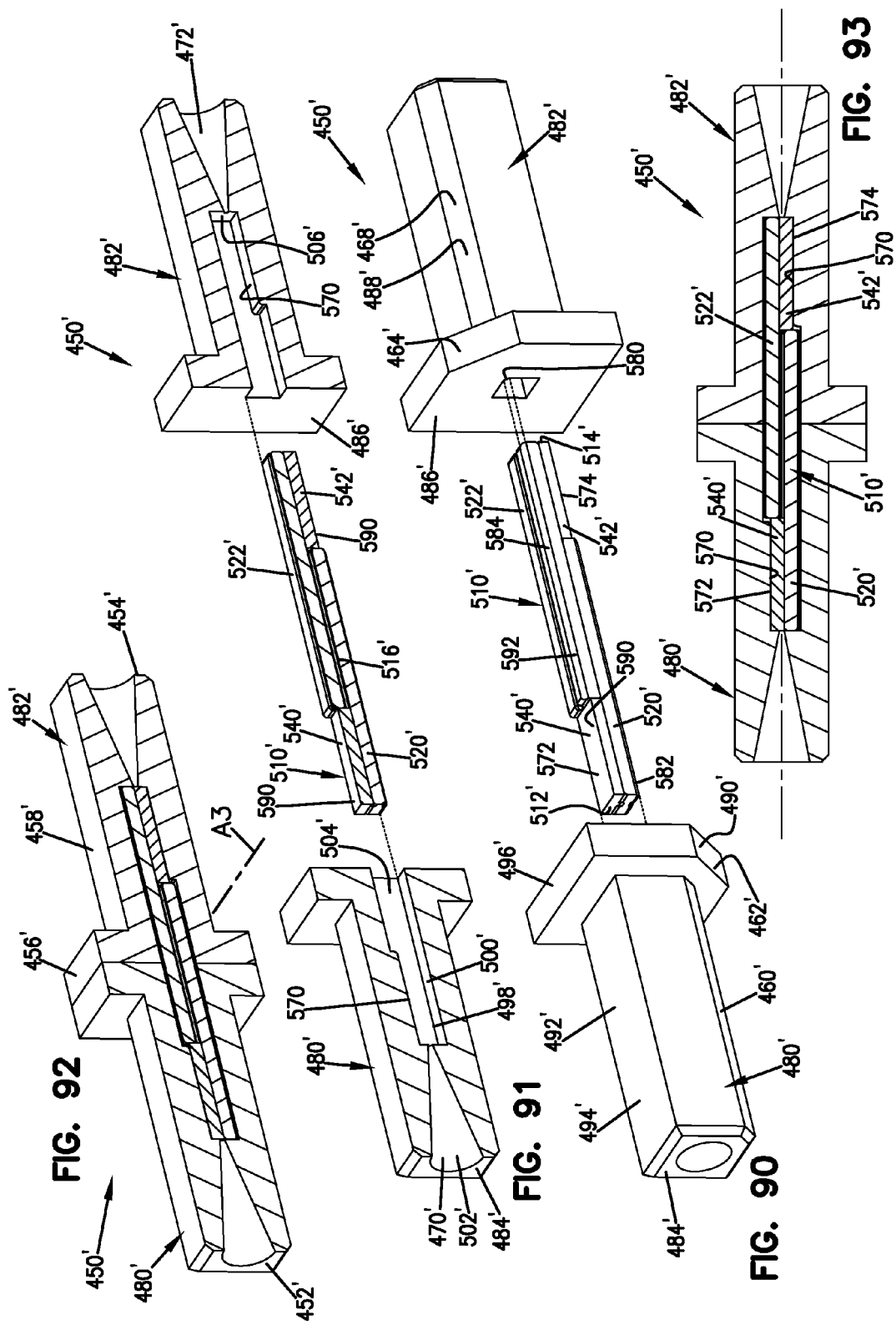

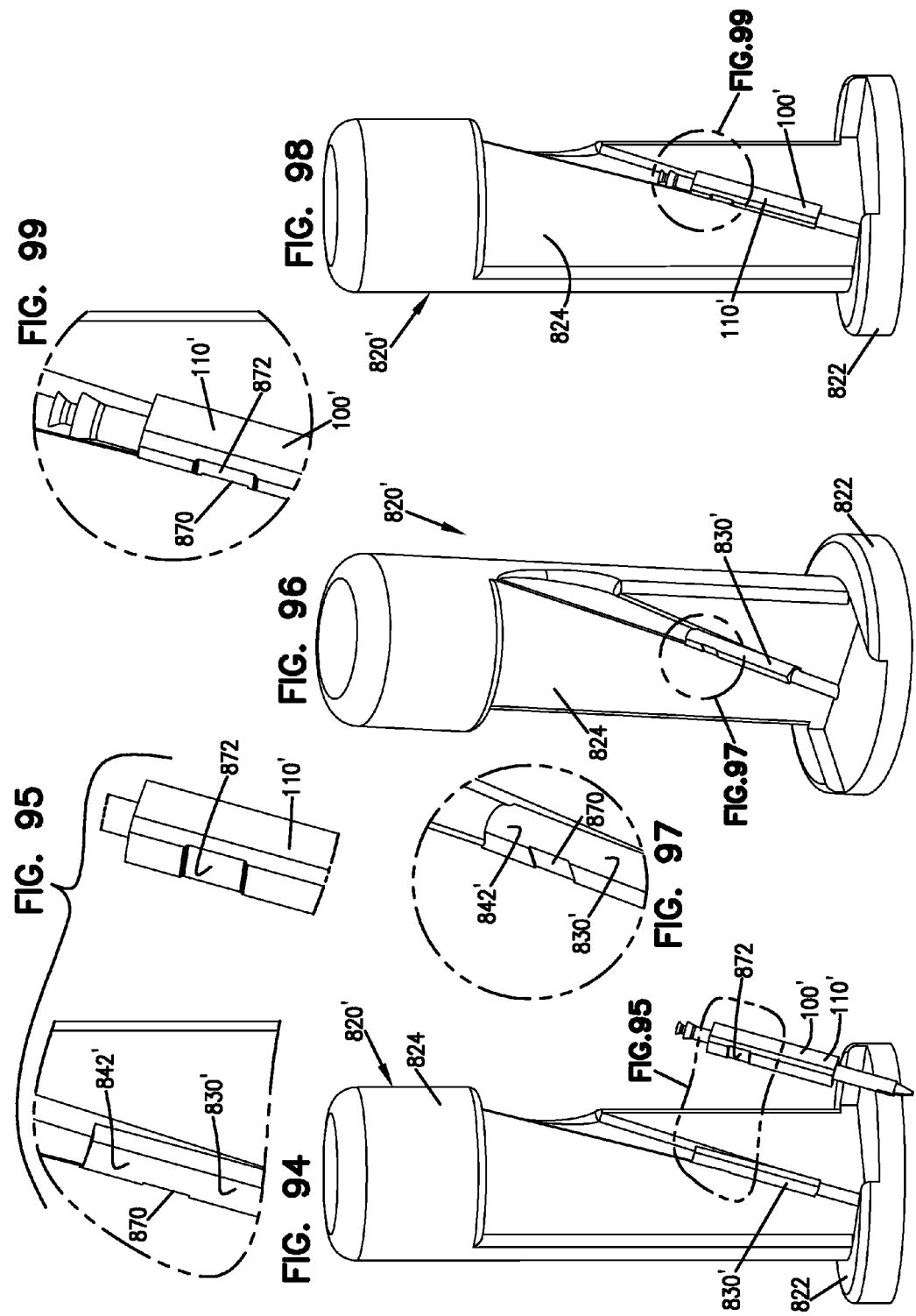

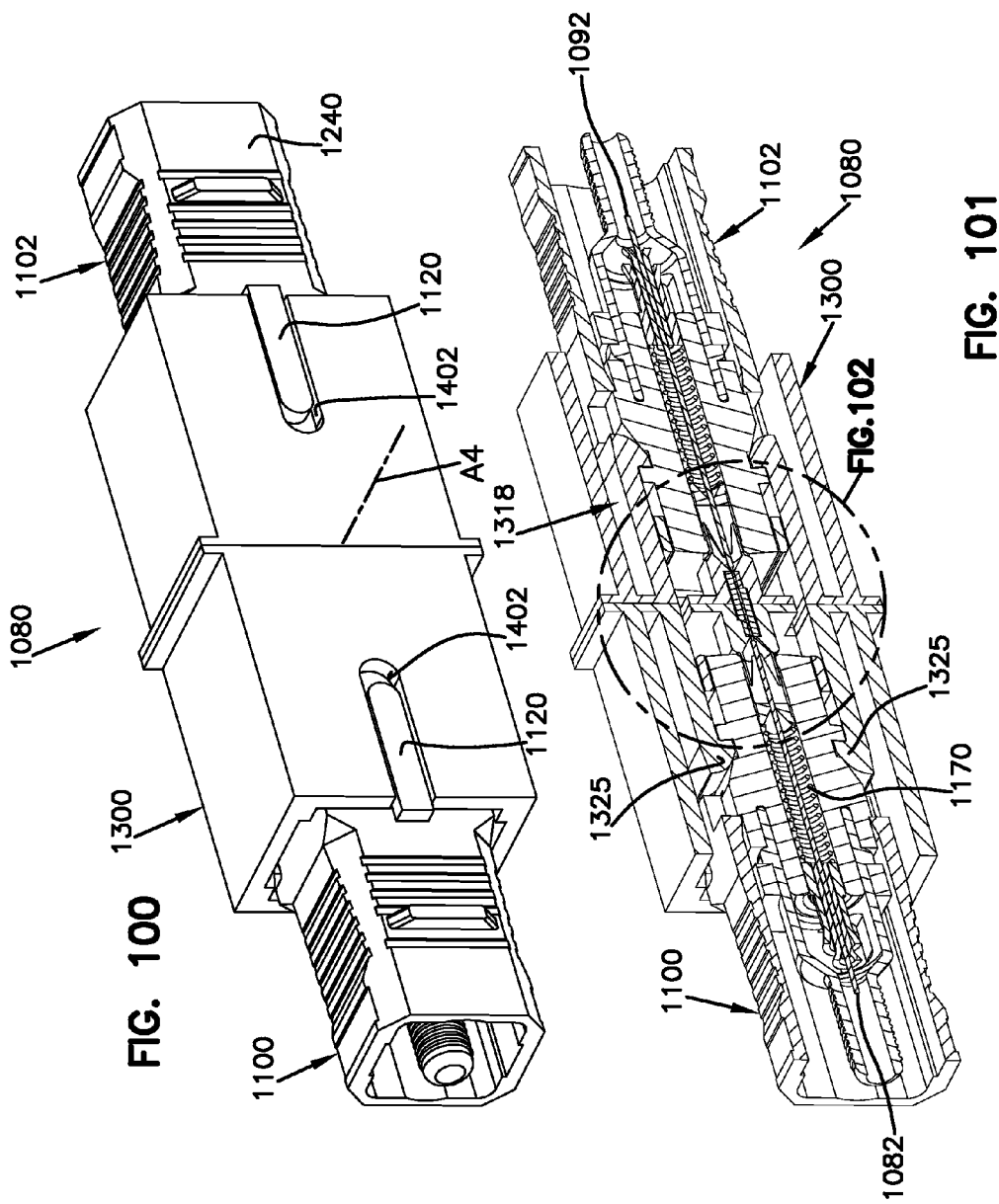

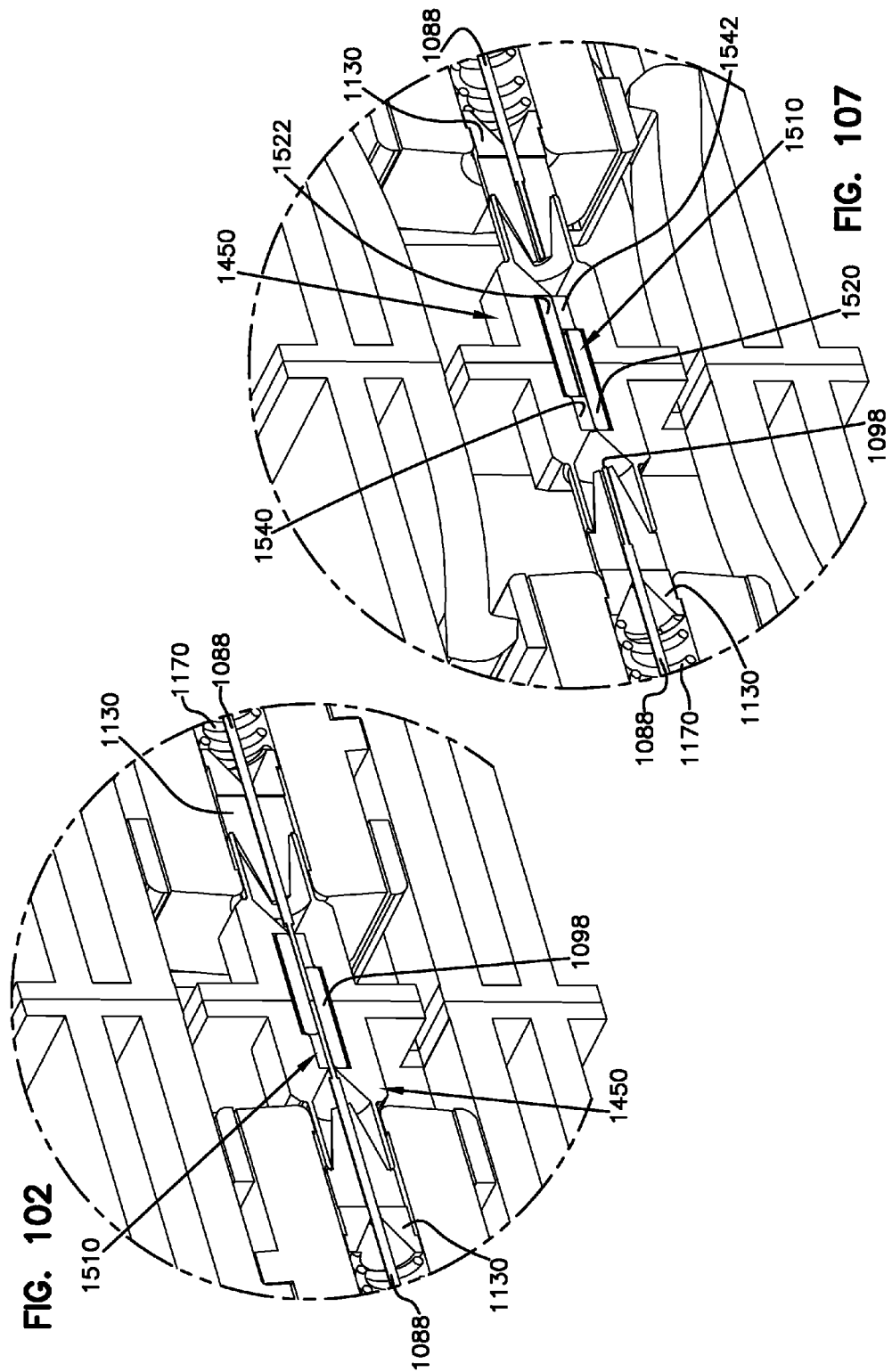

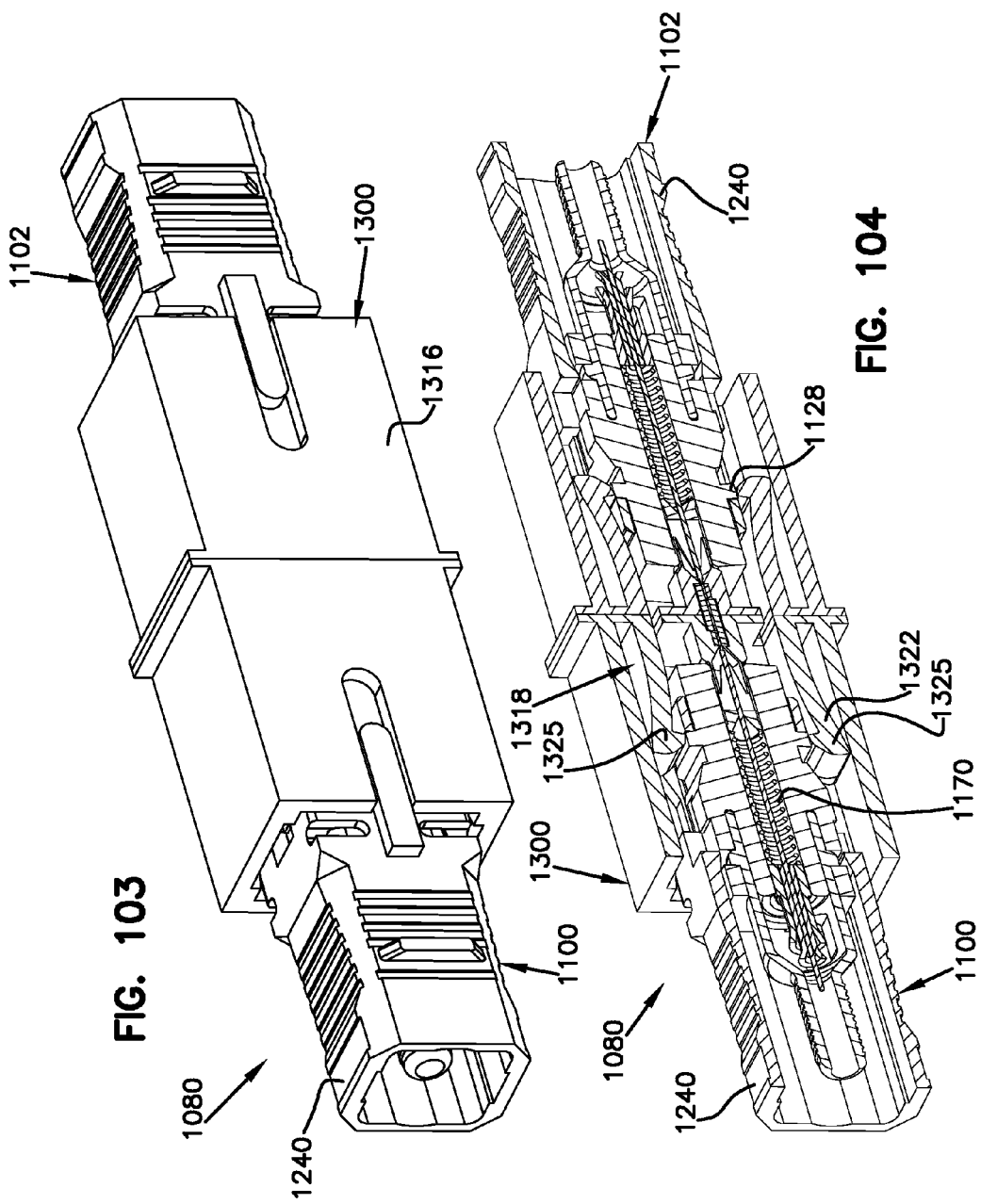

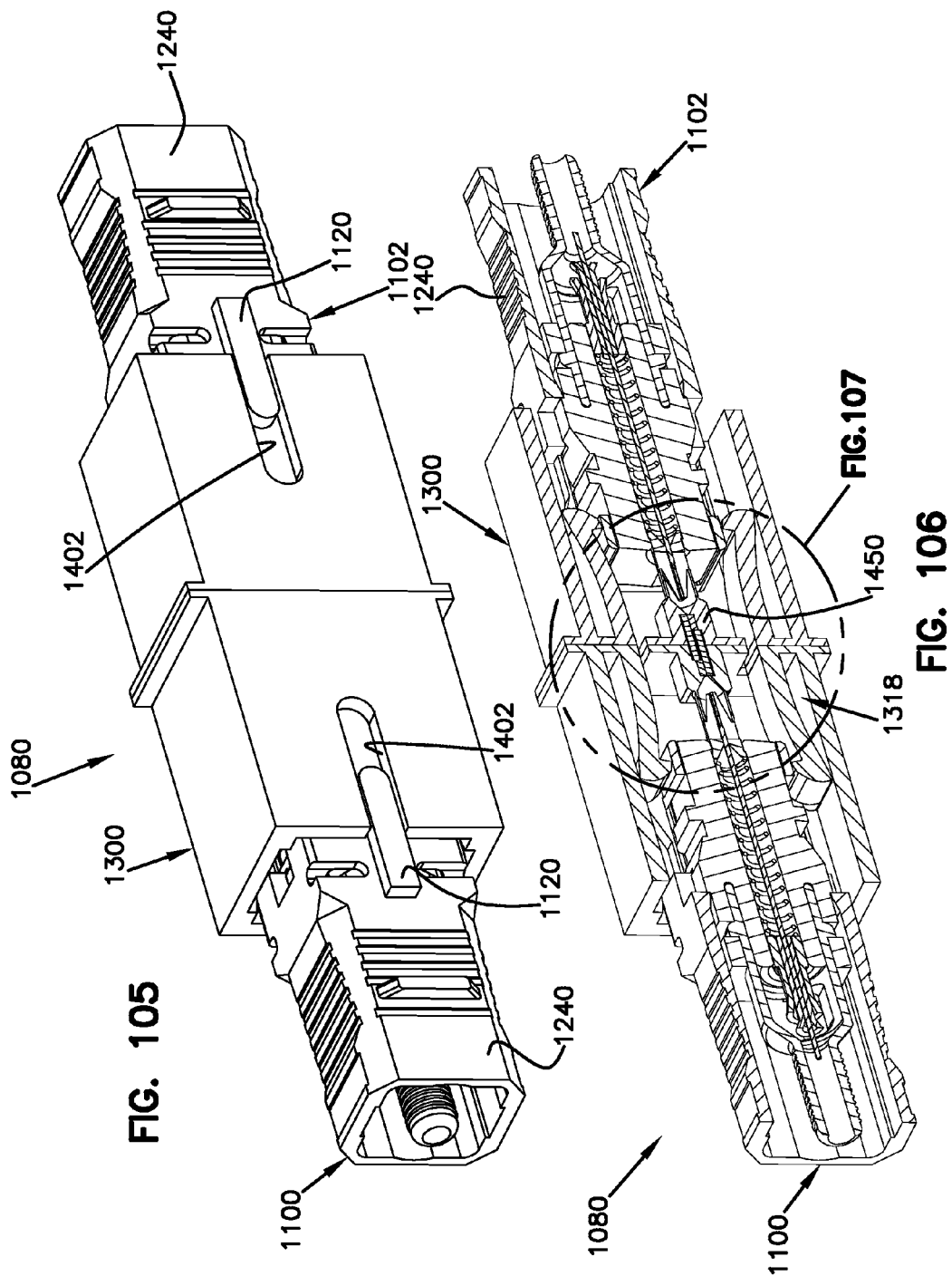

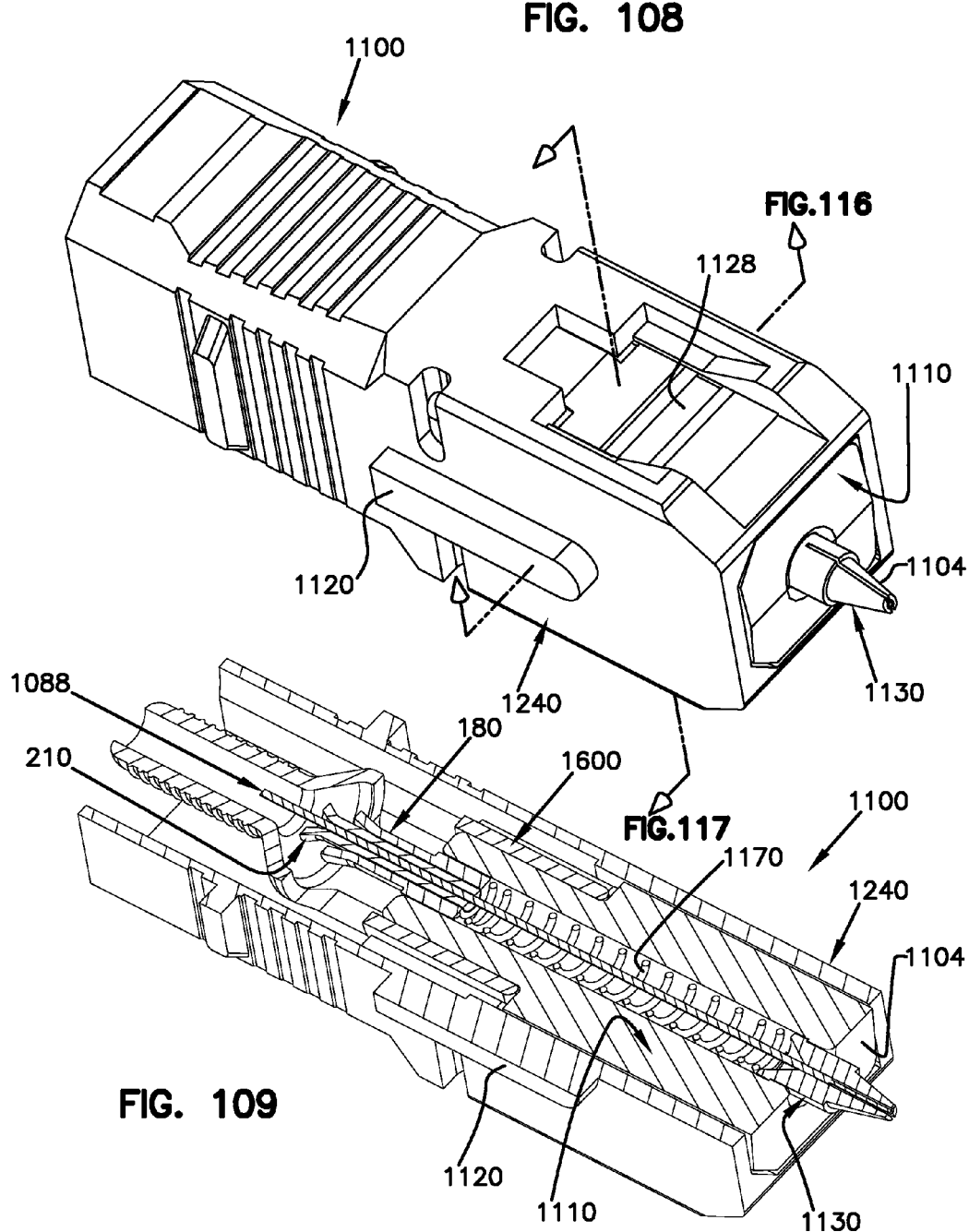

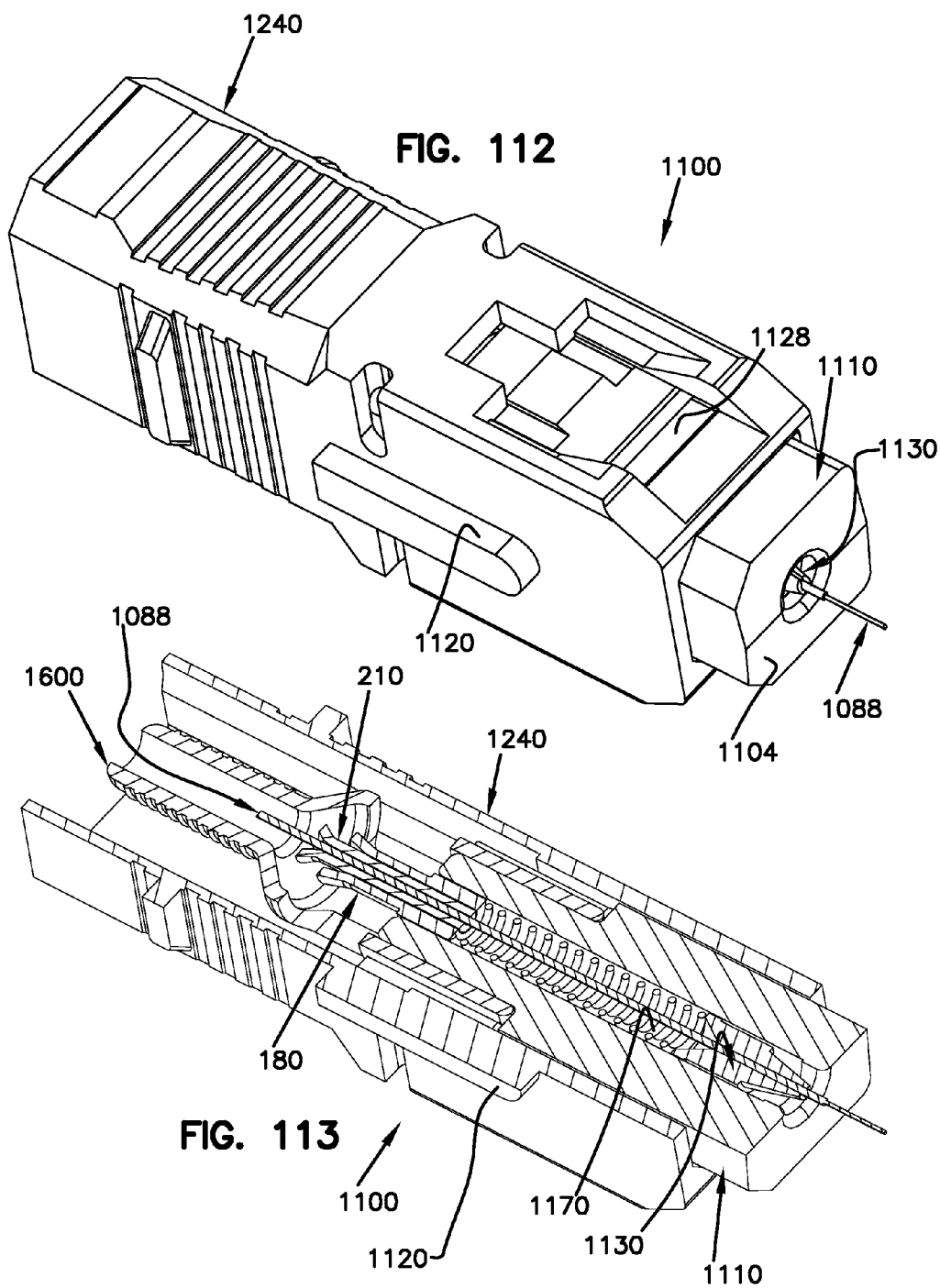

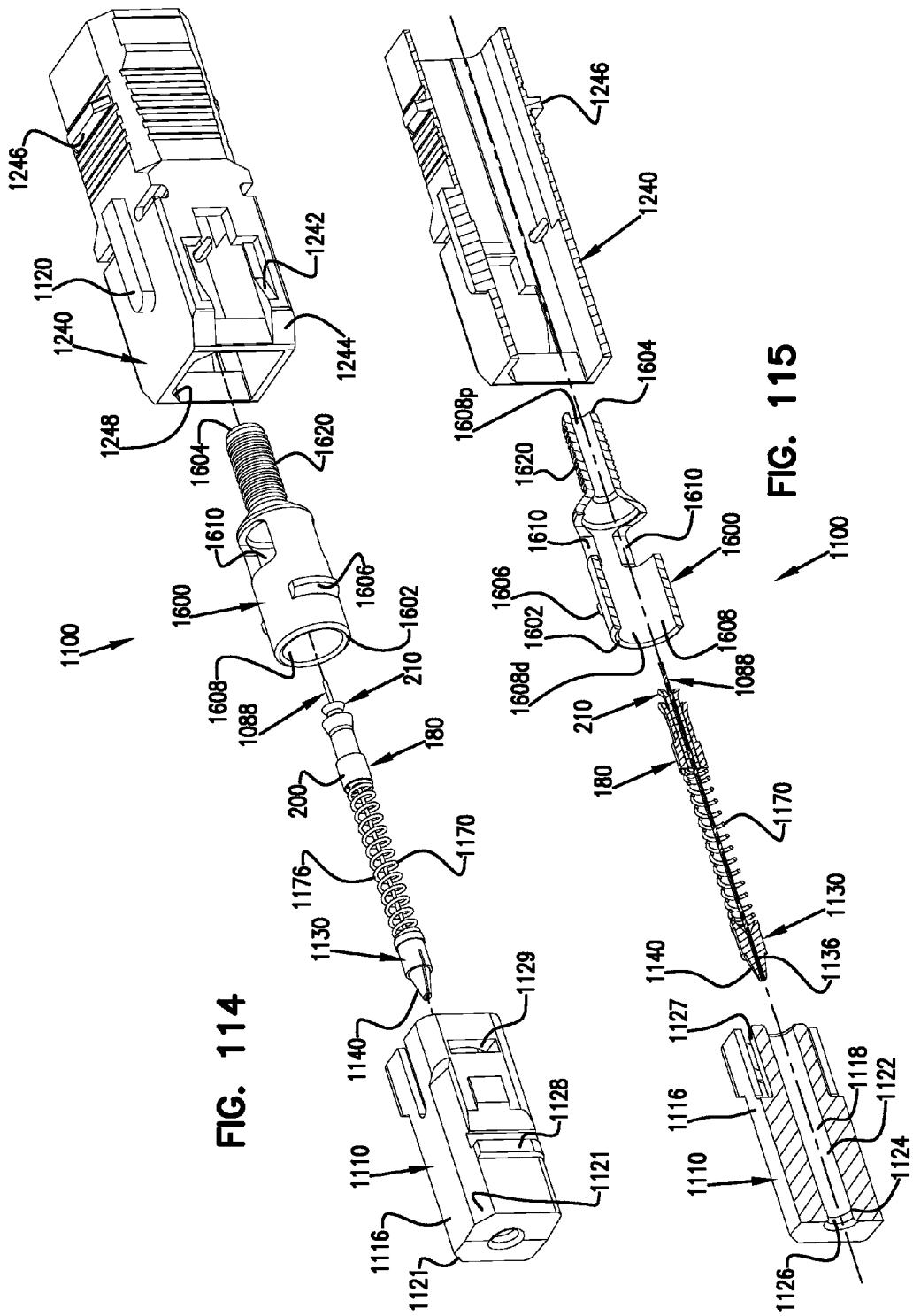

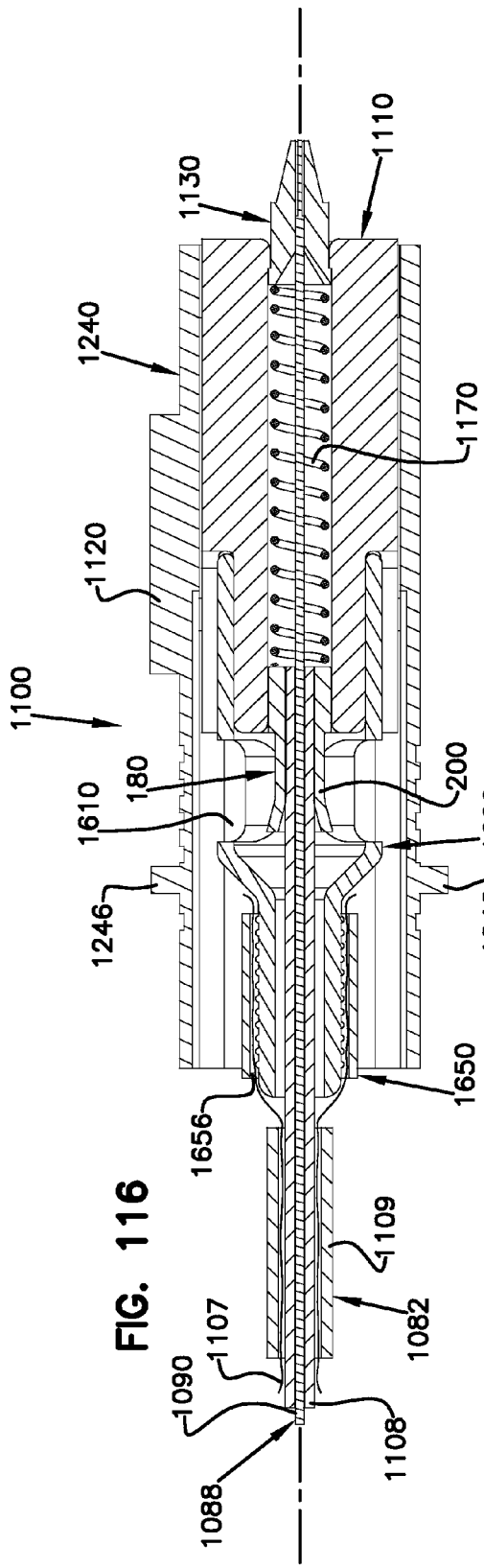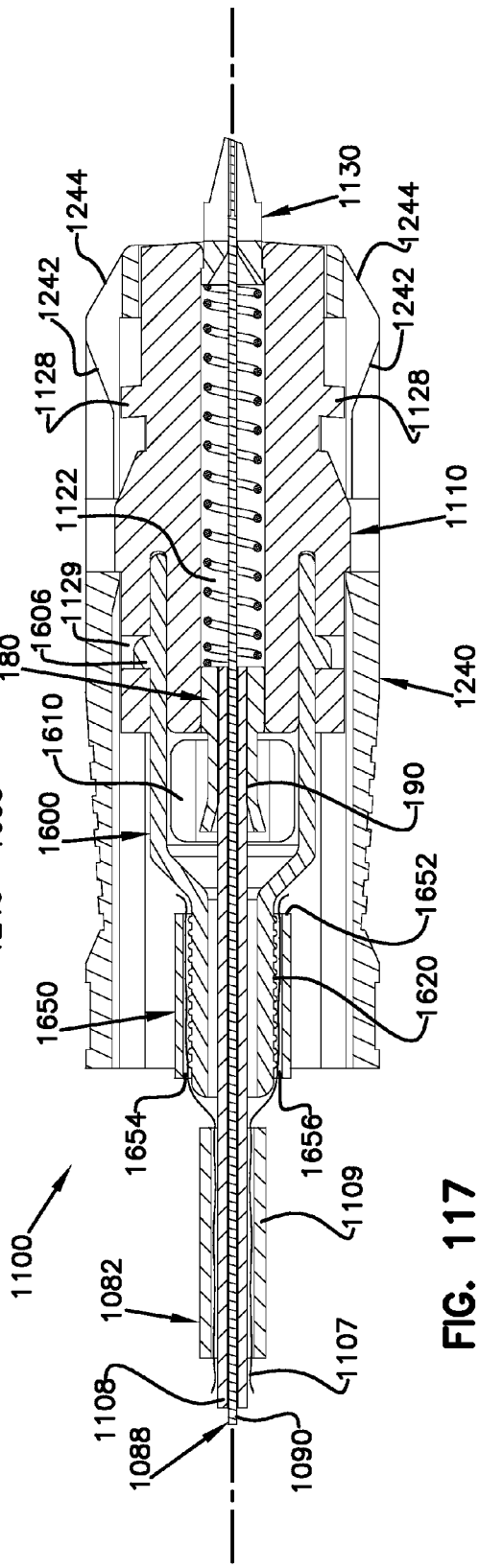

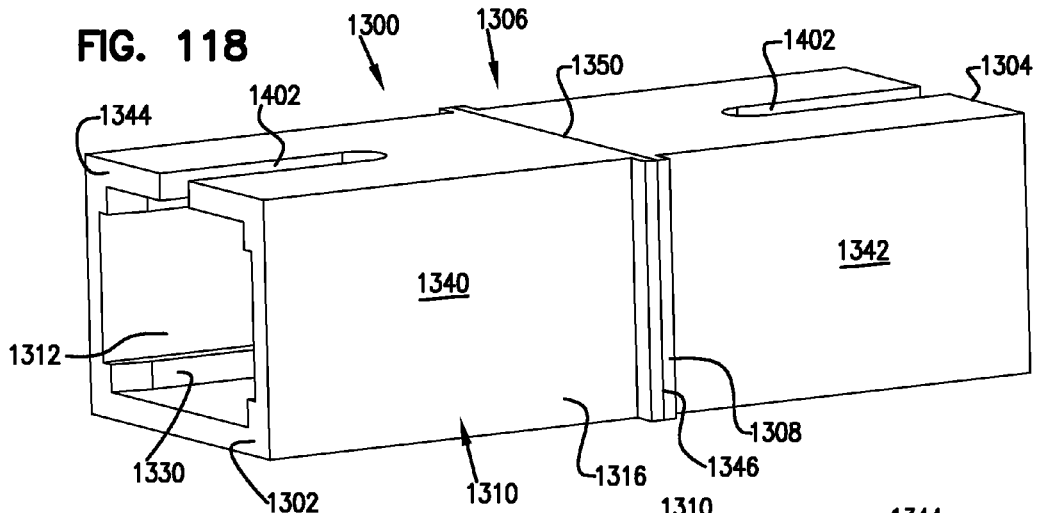
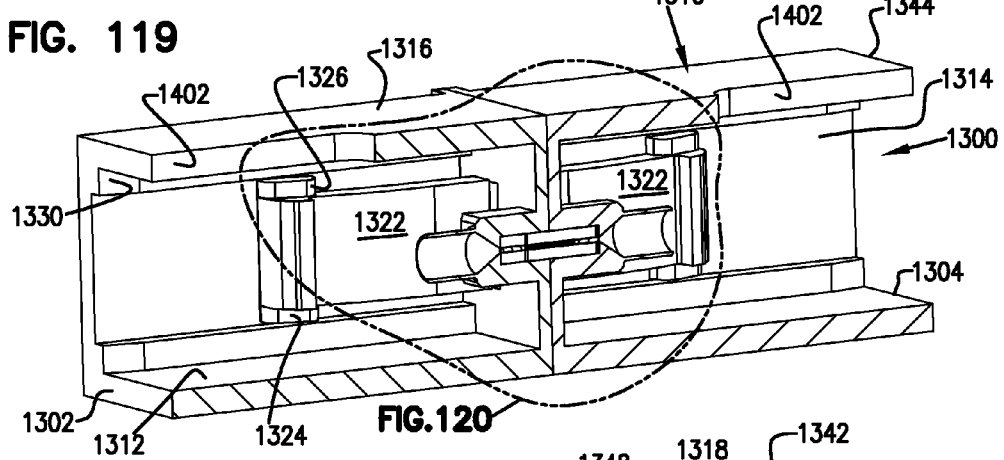
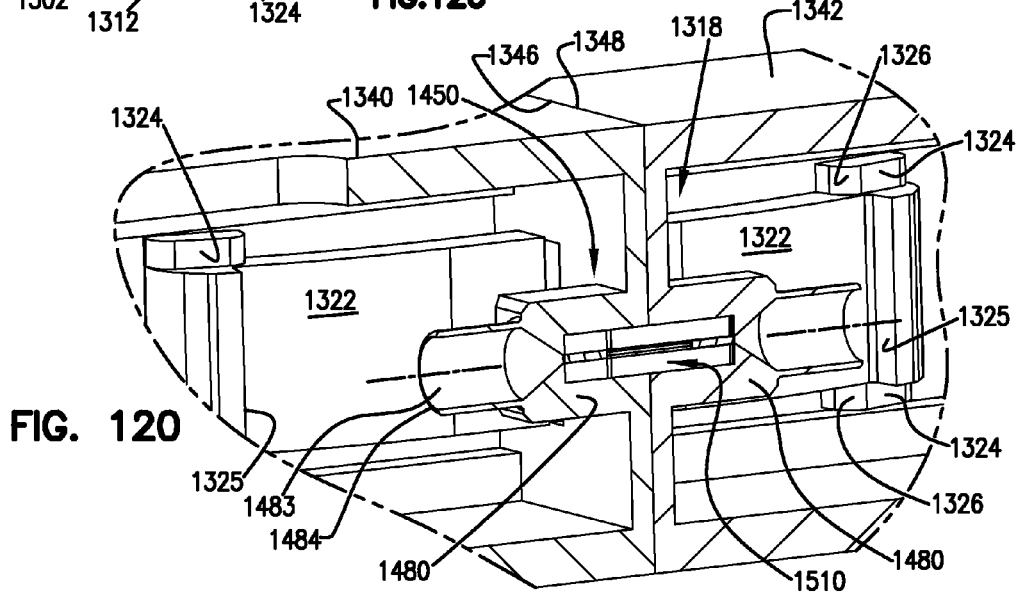

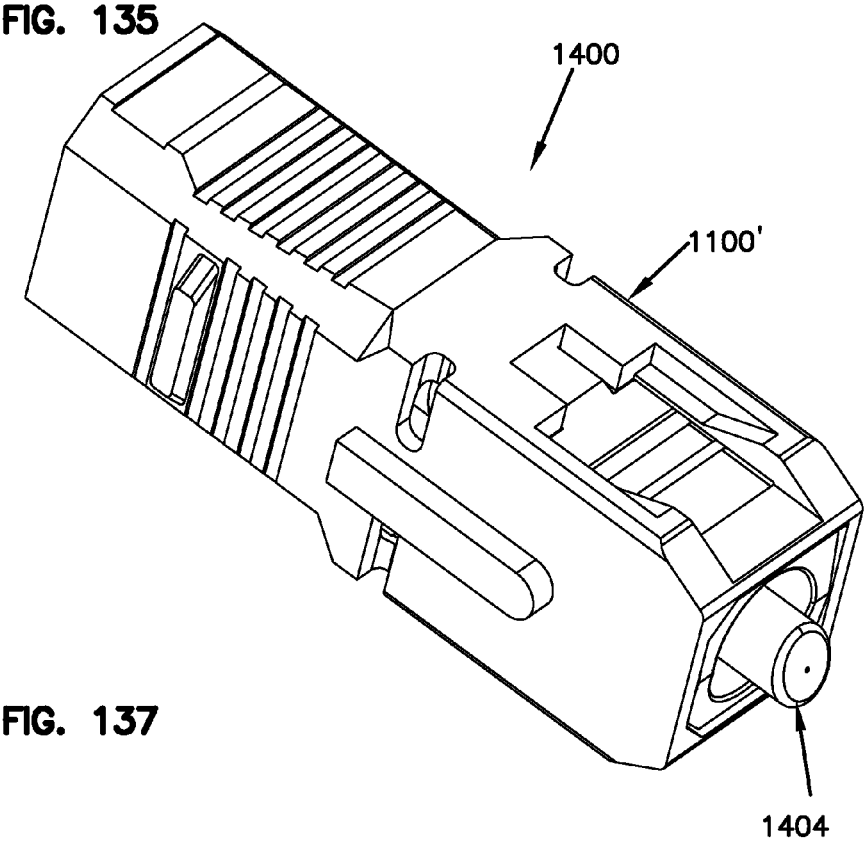
FIG. 135
FIG. 137
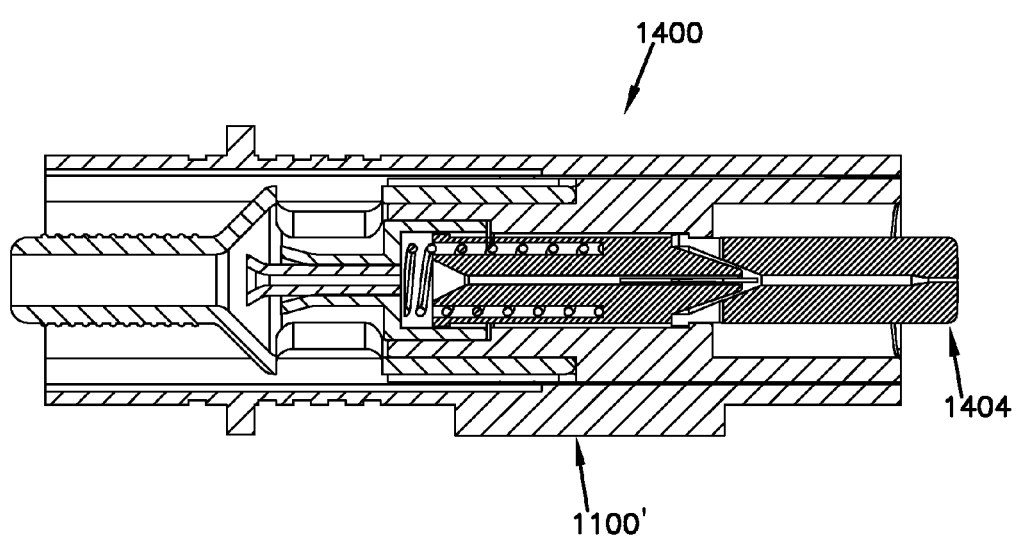

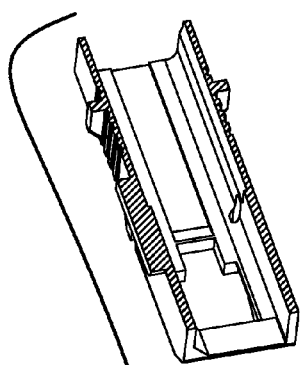
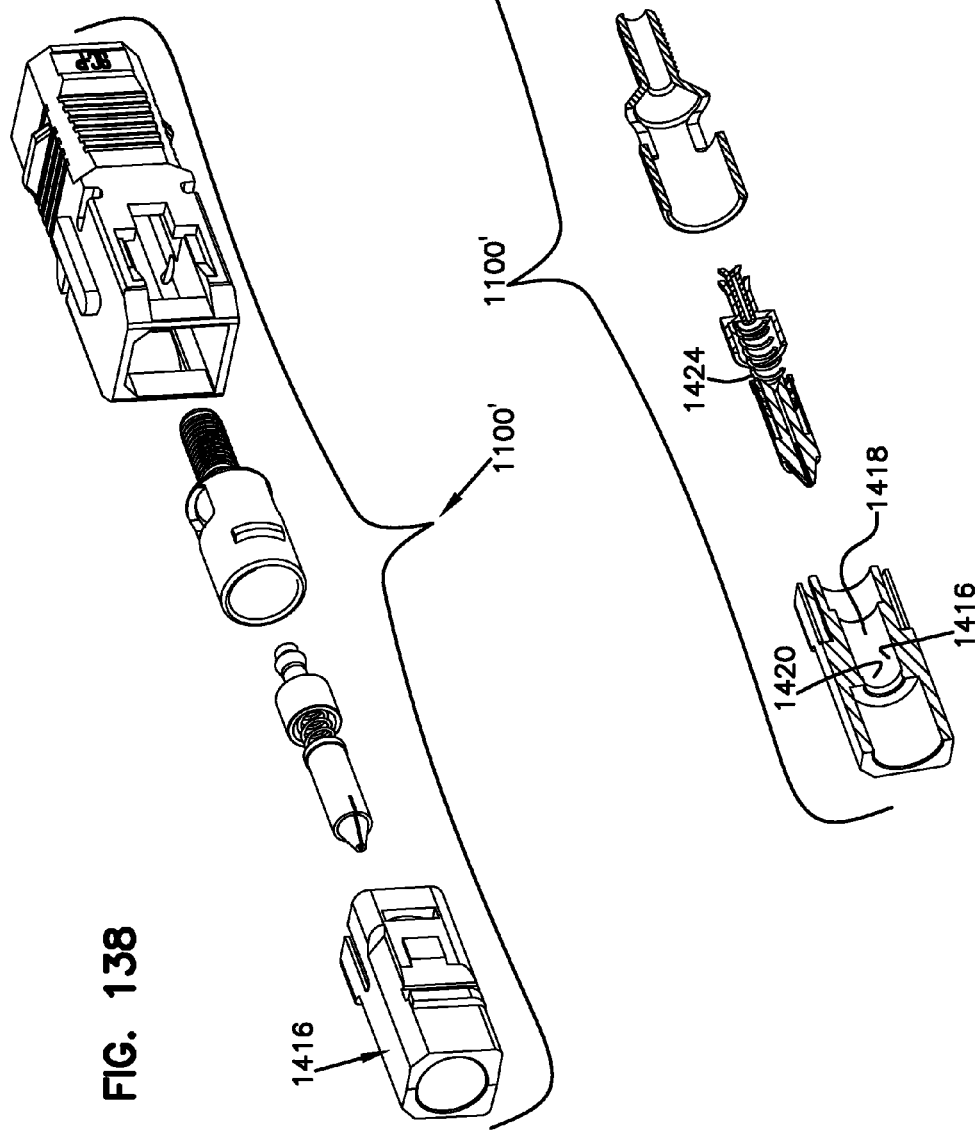
FIG. 138
FIG. 139

OPTICAL FIBER CONNECTION SYSTEM

CROSS-REFERENCE TO RELATED APPLICATIONS

This application claims the benefit of U.S. Provisional Patent Application Ser. No. 61/531,855, filed Sep. 7, 2011, and entitled OPTICAL FIBER CONNECTION SYSTEM, which application is hereby incorporated by reference in its entirety. This application is also related to U.S. Provisional Patent Application Ser. No. 61/531,836, also filed Sep. 7, 2011, and entitled OPTICAL FIBER ALIGNMENT DEVICE AND METHOD, which application is hereby incorporated by reference in its entirety. This application is also related to U.S. Provisional Patent Application Ser. No. 61/531,830, also filed Sep. 7, 2011, and entitled TOOLS AND METHODS FOR PREPARING A FERRULE-LESS OPTICAL FIBER CONNECTOR, which application is hereby incorporated by reference in its entirety.

FIELD

The inventive aspects of this disclosure pertain to devices and methods for connecting optical fibers.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors often include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter often includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter.

SUMMARY

An aspect of the present disclosure relates to an optical fiber connection system including a first optical fiber, a fiber optic adapter, and a first fiber optic connector. The first optical fiber includes an end portion with an end. The fiber optic adapter includes a housing and a fiber alignment apparatus. The housing includes a first port and a second port. The fiber alignment apparatus includes a first V-block and a first gel block. The fiber alignment apparatus is positioned between the first port and the second port. The first fiber optic connector includes a housing and a sheath. The housing extends between a proximal end and a distal end. The first optical fiber extends through the housing and is attached to the housing. The end portion of the first optical fiber is positioned outside the housing and beyond the distal end of the housing. The sheath is slidably connected to the housing. The sheath is slidable between an extended configuration and a retracted configuration. The sheath covers the end portion of the first optical fiber when the sheath is at the extended configuration, and the sheath exposes the end portion of the first optical fiber when the sheath is at the retracted configuration.

Another aspect of the present disclosure relates to a coating included on the first optical fiber. In certain embodiments, the coating is stripped off of the end portion of the first optical fiber. In certain embodiments, the coating is pre-stripped off of the end portion of the first optical fiber before the first optical fiber is attached to the housing. In preferred embodiments, the coating is post-stripped off of the end portion of the first optical fiber after the first optical fiber is attached to the housing.

Still another aspect of the present disclosure relates to the first optical fiber sliding between the first V-block and the first gel block when the first fiber optic connector is connected to the fiber optic adapter. The first gel block cleans contaminants from the end of the first optical fiber when the first optical fiber is sliding between the first V-block and the first gel block.

Yet another aspect of the present disclosure relates to a tool set for connecting a fiber optic cable to the fiber optic connector and/or finishing the end of the optical fiber after termination by the fiber optic connector. The tool set may include a crimping tool and/or a polishing tool. The crimping tool includes an end stop and a housing locating feature that locates the end of the optical fiber relative to the housing of the fiber optic connector while the crimping tool crimps the optical fiber to the housing. The polishing tool defines a polishing plane and includes a housing locating feature that locates a polished end of the optical fiber relative to the housing of the fiber optic connector while the polishing tool polishes the polished end. The polishing tool may uniquely orient and/or angle the polished end relative to the housing and thereby relative to the fiber optic connector.

Still another aspect of the present disclosure relates to a second fiber optic connector and the connection of the first and the second fiber optic connectors via the fiber optic adapter. The second fiber optic connector can be the same as or similar to the first fiber optic connector. The first and the second fiber optic connectors are individually connectable to the fiber optic adapter at the first and the second ports. Components of the first and the second fiber optic connectors and the fiber optic adapter are assemblable in a configuration that ensures a predetermined orientation between the first and the second fiber optic connectors. The components may also ensure a predetermined orientation between the fiber optic adapter and the first and the second fiber optic connectors.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a perspective view of an optical fiber connection system, according to the principles of the present disclosure, including a fiber optic adapter and two fiber optic connectors with the fiber optic connectors fully inserted into the fiber optic adapter;

FIG. 2 is the perspective view of FIG. 1 but with the fiber optic connectors partially inserted into the fiber optic adapter;

FIG. 3 is the perspective view of FIG. 1 but with the fiber optic adapter cut away revealing a protective sheath of the fiber optic connectors in a retracted configuration;

FIG. 4 is an enlarged portion of FIG. 3;

FIG. 5 is the perspective view of FIG. 1 but with the fiber optic connectors partially inserted into the fiber optic adapter, as in FIG. 2, and with the fiber optic adapter cut away, as in FIG. 3, revealing the protective sheaths of FIG. 3 in an extended configuration;

FIG. 6 is an enlarged portion of FIG. 5;

FIG. 7 is a perspective view of the fiber optic connector of FIG. 1, according to the principles of the present disclosure, with the protective sheath of FIG. 3 in the retracted configuration;

FIG. 8 is the perspective view of FIG. 7 but with the protective sheath of FIG. 3 in the extended configuration;

FIG. 9 is an enlarged portion of FIG. 8;

FIG. 10 is a cross-sectional elevation side view of the fiber optic connector of FIG. 1 with the protective sheath of FIG. 3 in the retracted configuration;

FIG. 11 is an enlarged portion of FIG. 10;

FIG. 12 is an enlarged portion of FIG. 10;

FIG. 13 is an enlarged portion of FIG. 10;

FIG. 14 is the cross-sectional elevation side view of FIG. 10 but with the protective sheath of FIG. 3 in the extended configuration;

FIG. 15 is an enlarged portion of FIG. 14;

FIG. 16 is an enlarged portion of FIG. 14;

FIG. 17 is an elevation distal end view of the fiber optic connector of FIG. 1;

FIG. 18 is a proximal end view of the fiber optic connector of FIG. 1 rotated 90 degrees from the view of FIG. 17 and before an optical fiber is inserted;

FIG. 19 is a distal end view of the fiber optic connector of FIG. 1 rotated as in FIG. 18 and before an optical fiber is inserted or polished;

FIG. 20 is a cross-sectional view of FIG. 19;

FIG. 21 is a cross-sectional view of FIG. 19;

FIG. 22 is the cross-sectional view of FIG. 20 but with a buffered optical fiber included and a sleeve removed;

FIG. 23 is the cross-sectional view of FIG. 21 but with the buffered optical fiber of FIG. 22 inserted and the sleeve removed at FIG. 22 also removed;

FIG. 24 is a perspective view of the fiber optic connector of FIG. 1 with the protective sheath of FIG. 3 in the extended configuration and before an optical fiber is inserted or polished;

FIG. 25 is the perspective view of FIG. 24 but with the fiber optic connector of FIG. 1 cut away;

FIG. 26 is the perspective view of FIG. 24 but exploded;

FIG. 27 is the exploded perspective view of FIG. 26 but with the fiber optic connector of FIG. 1 cut away, as in FIG. 25;

FIG. 28 is another perspective view of the fiber optic connector of FIG. 1 with the protective sheath of FIG. 3 in the extended configuration and before an optical fiber is inserted or polished;

FIG. 29 is the perspective view of FIG. 28 but with the fiber optic connector of FIG. 1 cut away, as in FIG. 25;

FIG. 30 is the perspective view of FIG. 28 but exploded;

FIG. 31 is the exploded perspective view of FIG. 30 but with the fiber optic connector of FIG. 1 cut away, as in FIG. 25;

FIG. 36 is the perspective view of FIG. 33 of the alignment sleeve of FIG. 33, according to the principles of the present disclosure, with a pair of sleeves of the alignment sleeve cut away revealing a pair of V-blocks and a pair of gel blocks;

FIG. 37 is the perspective view of FIG. 33 of the alignment sleeve of FIG. 33 with the pair of the sleeves of FIG. 36 exploded;

FIG. 38 is the perspective view of FIG. 37 of the alignment sleeve of FIG. 33 with the pair of the sleeves of FIG. 36 exploded and with the pair of the sleeves cut away, as in FIG. 36;

FIG. 39 is an enlarged portion of FIG. 38;

FIG. 40 is an enlarged cross-sectional perspective view of a portion of FIG. 38;

FIG. 41 is an enlarged cross-sectional perspective view of a portion of FIG. 38;

FIG. 42 is a cross-sectional elevation side view of the alignment sleeve of FIG. 33;

FIG. 43 is the cross-sectional elevation side view of FIG. 42 but with the pair of the gel blocks of FIG. 36 removed;

FIG. 44 is a cross-sectional view of the alignment sleeve of FIG. 33 as indicated at FIG. 43 with the pair of the gel blocks of FIG. 36 removed;

FIG. 45 is an enlarged portion of FIG. 43;

FIG. 46 is a cross-sectional view of the alignment sleeve of FIG. 33 as indicated at FIG. 43 with the pair of the gel blocks of FIG. 36 removed;

FIG. 47 is an enlarged portion of FIG. 43;

FIG. 48 is a top plan view of a half-piece of the housing of FIG. 34, according to the principles of the present disclosure;

FIG. 49 is a bottom plan view of the half-piece of FIG. 48;

FIG. 50 is a side elevation view of the half-piece of FIG. 48;

FIG. 51 is a first end elevation view of the half-piece of FIG. 48;

FIG. 52 is a cross-sectional view of FIG. 50;

FIG. 53 is a cross-sectional view of FIG. 50;

FIG. 54 is a cross-sectional view of FIG. 50;

FIG. 55 is a cross-sectional view of FIG. 50;

FIG. 56 is a cross-sectional view of FIG. 50;

FIG. 57 is a cross-sectional view of FIG. 50;

FIG. 58 is a second end elevation view of the half-piece of FIG. 48;

FIG. 59 is an outer end view of the sleeve of FIG. 36, according to the principles of the present disclosure;

FIG. 60 is a side view of the sleeve of FIG. 36;

FIG. 61 is an inner end view of the sleeve of FIG. 36;

FIG. 62 is a bottom view of the sleeve of FIG. 36;

FIG. 63 is an exploded perspective view of the pair of the V-blocks and the pair of the gel blocks of FIG. 36, according to the principles of the present disclosure;

FIG. 64 is a top plan view of the V-block of FIG. 36;

FIG. 65 is an end view of the V-block of FIG. 36;

FIG. 66 is a partial side view of the V-block of FIG. 36;

FIG. 67 is a top plan view of the gel block of FIG. 36;

FIG. 68 is an end view of the gel block of FIG. 36;

FIG. 69 is a partial side view of the gel block of FIG. 36;

FIG. 70 is a perspective view of a crimping tool, according to the principles of the present disclosure, in an open configuration, the crimping tool adapted to crimp the fiber optic connector of FIG. 1 to a fiber optic cable;

FIG. 71 is an enlarged portion of FIG. 70;

FIG. 72 is the perspective view of the crimping tool of FIG. 70 but with the fiber optic connector of FIG. 1 loaded;

FIG. 73 is an enlarged portion of FIG. 72;

FIG. 74 is the perspective view of the crimping tool of FIG. 70 but with the fiber optic connector of FIG. 1 loaded and the crimping tool in a closed configuration;

FIG. 75 is an enlarged portion of FIG. 74;

FIG. 78 is a perspective view of a polishing tool, according to the principles of the present disclosure, with the fiber optic connector of FIG. 1 loaded into a holder of the polishing tool;

FIG. 79 is an enlarged portion of FIG. 78 but with the polishing tool cut away;

FIG. 80 is the perspective view of FIG. 78 but with only the holder of FIG. 78 shown;

FIG. 81 is an enlarged portion of FIG. 80 but with the holder cut away;

FIG. 82 is a perspective view of the holder of FIG. 78 with the fiber optic connector of FIG. 1 loaded;

FIG. 83 is an enlarged portion of FIG. 82 but with the holder cut away and with the fiber optic connector shown before polishing;

FIG. 84 is an enlarged portion of FIG. 82 but with the holder cut away and with the fiber optic connector shown after polishing;

FIG. 85 is the perspective view of FIG. 82 but with only the holder of FIG. 78 shown;

FIG. 86 is an enlarged portion of FIG. 85 but with the holder cut away;

FIG. 87 is an enlarged portion of FIG. 85;

FIG. 88 is the cross-sectional view of FIG. 20 but with a partially stripped optical fiber overlaid;

FIG. 89 is the cross-sectional view of FIG. 21 but with an un-stripped optical fiber inserted and cross-sectioned;

FIG. 90 is an exploded perspective view of another alignment sleeve, according to the principles of the present disclosure, compatible with the fiber optic adapter of FIG. 1;

FIG. 91 is the exploded perspective view of FIG. 90 but with the alignment sleeve cross-sectioned;

FIG. 92 is the cross-sectional perspective view of FIG. 91 but unexploded;

FIG. 93 is the cross-sectional view of FIG. 92 but is a side elevation view;

FIG. 94 is an exploded perspective view of another holder, according to the principles of the present disclosure, compatible with the polishing tool of FIG. 78 and another fiber optic connector similar to the fiber optic connector of FIG. 1;

FIG. 95 is an enlarged portion of FIG. 94;

FIG. 96 is a perspective view of the holder of FIG. 94;

FIG. 97 is an enlarged portion of FIG. 96;

FIG. 98 is the perspective view of FIG. 94 but unexploded;

FIG. 99 is an enlarged portion of FIG. 98;

FIG. 100 is a perspective view of another optical fiber connection system, according to the principles of the present disclosure, including a fiber optic adapter and two fiber optic connectors with the fiber optic connectors fully inserted into the fiber optic adapter;

FIG. 101 is the perspective view of FIG. 100 but with the fiber optic adapter and the fiber optic connectors cross-sectioned revealing a protective sheath of the fiber optic connectors in a refracted configuration and a release sleeve of the fiber optic connectors in a non-releasing configuration;

FIG. 102 is an enlarged portion of FIG. 101 with cross-hatching removed;

FIG. 103 is the perspective view of FIG. 100 but with the release sleeves of the fiber optic connectors moved to a releasing configuration;

FIG. 104 is the perspective view of FIG. 103 but with the fiber optic adapter and the fiber optic connectors cross-sectioned revealing the protective sheath of the fiber optic connectors in the retracted configuration;

FIG. 105 is the perspective view of FIG. 100 but with the fiber optic connectors partially inserted into the fiber optic adapter;

FIG. 106 is the perspective view of FIG. 105 but with the fiber optic adapter and the fiber optic connectors cross-sectioned revealing the protective sheaths of the fiber optic connectors in an extended configuration;

FIG. 107 is an enlarged portion of FIG. 106 with cross-hatching removed;

FIG. 108 is a perspective view of the fiber optic connector of FIG. 100, according to the principles of the present disclosure, with the protective sheath of FIG. 101 in the extended configuration and the release sleeve of FIG. 101 in the non-releasing configuration;

FIG. 109 is the perspective view of FIG. 108 but with the fiber optic connector cross-sectioned;

FIG. 112 is the perspective view of FIG. 108 but with the protective sheath of FIG. 101 in the refracted configuration and the release sleeve of FIG. 101 in the releasing configuration;

FIG. 113 is the perspective view of FIG. 112 but with the fiber optic connector cross-sectioned;

FIG. 114 is an exploded perspective view of the fiber optic connector of FIG. 100;

FIG. 115 is the exploded perspective view of FIG. 114 but with the fiber optic connector cross-sectioned;

FIG. 116 is a cross-sectional view of the fiber optic connector of FIG. 100, as called out at FIG. 108, with the protective sheath of FIG. 101 in the extended configuration and the release sleeve of FIG. 101 in the non-releasing configuration further including a crimp sleeve and a fiber optic cable with a buffer layer, strength members, and a jacket;

FIG. 117 is a cross-sectional view of the fiber optic connector of FIG. 100, as called out at FIG. 108, with the protective sheath of FIG. 101 in the extended configuration and the release sleeve of FIG. 101 in the non-releasing configuration further including the fiber optic cable and crimp sleeve of FIG. 116;

FIG. 118 is a perspective view of the fiber optic adapter of FIG. 100, according to the principles of the present disclosure;

FIG. 119 is the perspective view of FIG. 118 but with the fiber optic adapter cross-sectioned;

FIG. 120 is an enlarged portion of FIG. 119;

FIG. 121 is an exploded perspective view of another pair of V-blocks and another pair of gel blocks, according to the principles of the present disclosure, similar to those of FIG. 36, but defining undulating paths for the optical fibers;

FIG. 122 is an end elevation view of one of the pair of V-blocks of FIG. 121, according to the principles of the present disclosure;

FIG. 123 is a cross-sectional side elevation view of the V-block of FIG. 122, as called out at FIG. 122;

FIG. 124 is a partial enlarged cross-sectional side elevation view of the pair of V-blocks and the pair of gel blocks of FIG. 121 assembled, and the undulating paths of FIG. 121 formed between an intermediate portion of the assembled pair of V-blocks;

FIG. 125 is a cross-sectional side elevation view of the pair of V-blocks and the pair of gel blocks of FIG. 121 assembled and aligning a pair of optical fibers, and ends of the pair of optical fibers abutting each other within the intermediate portion and urged together, at least in part, by the undulating paths of FIG. 121;

Figure 121:
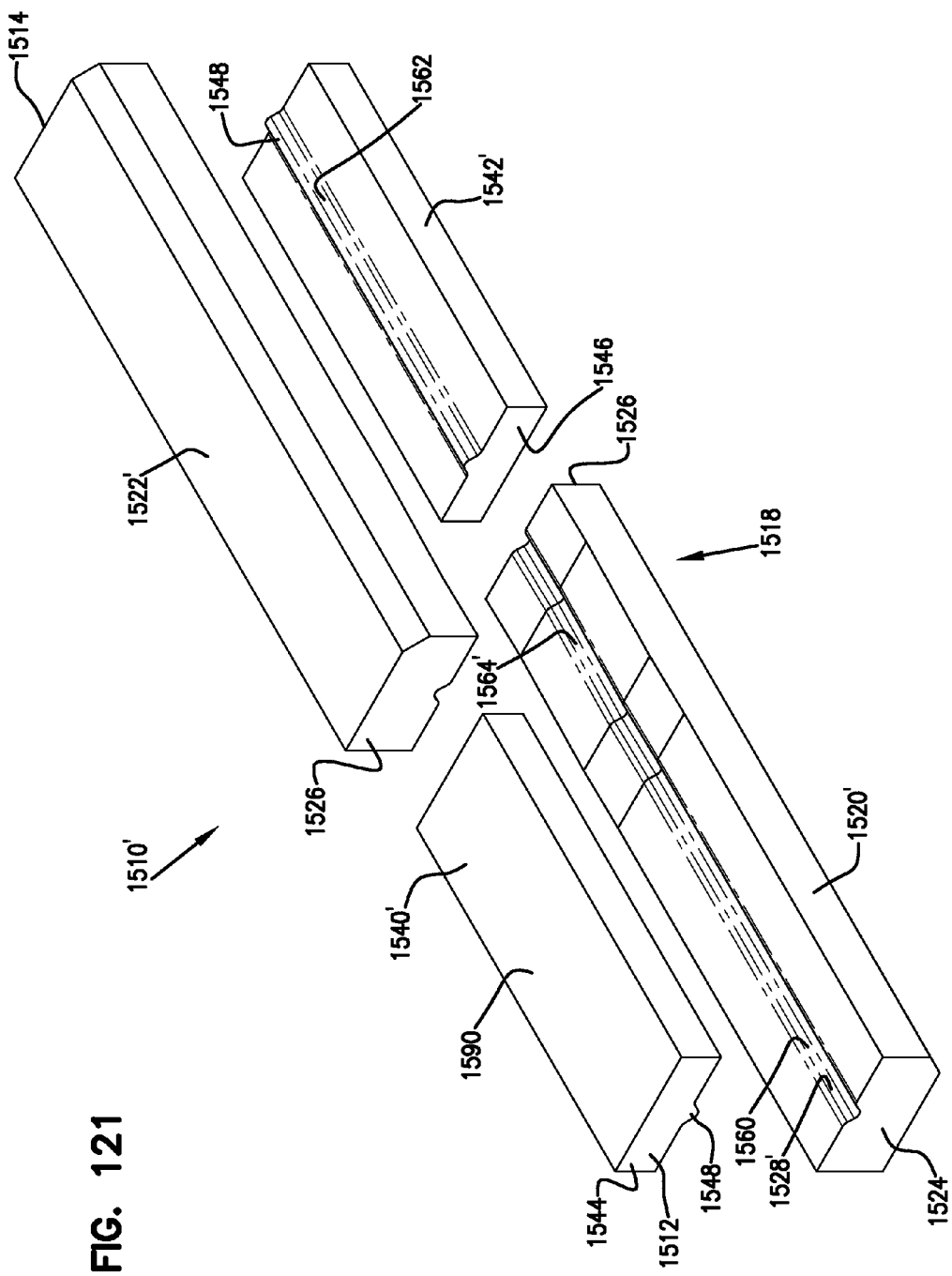
Figure 122:
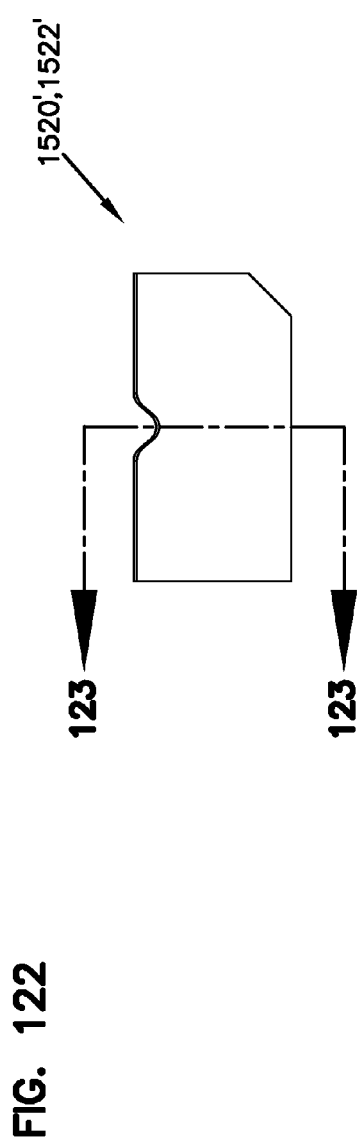
Figure 123:
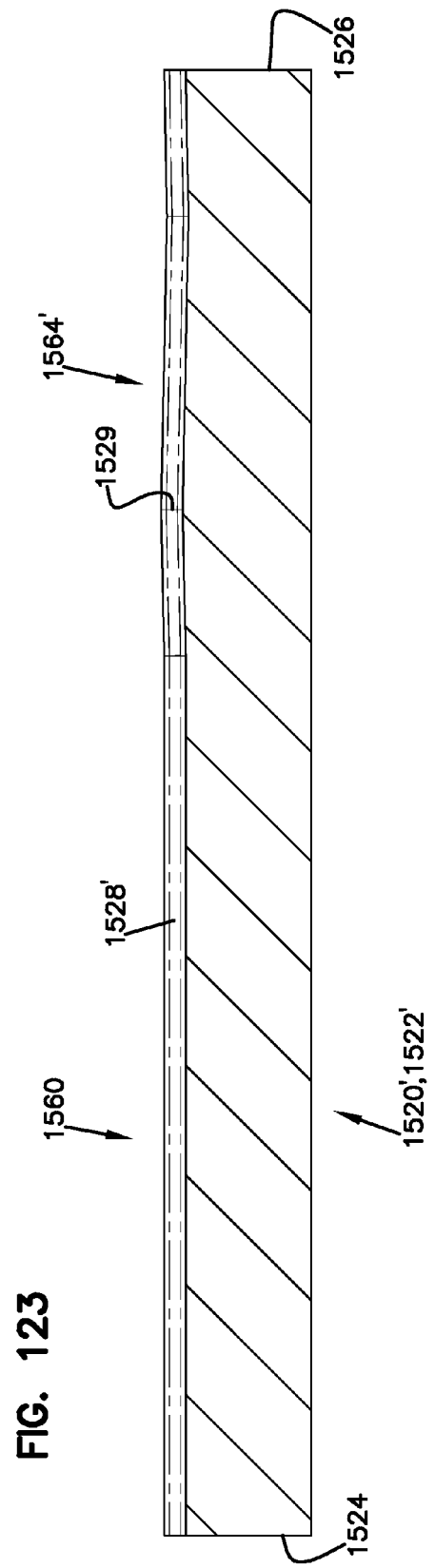
Figure 124:
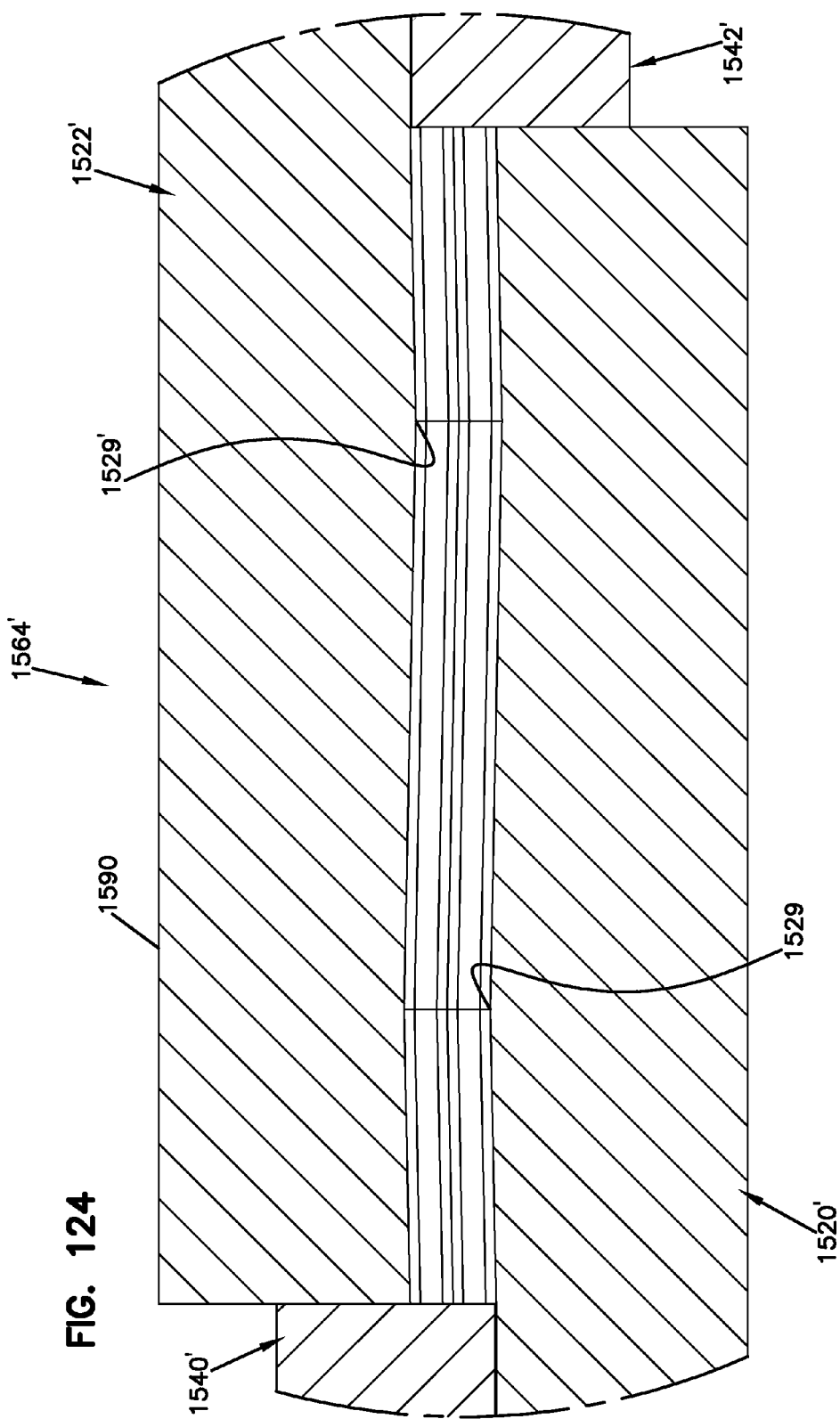
Figure 125:
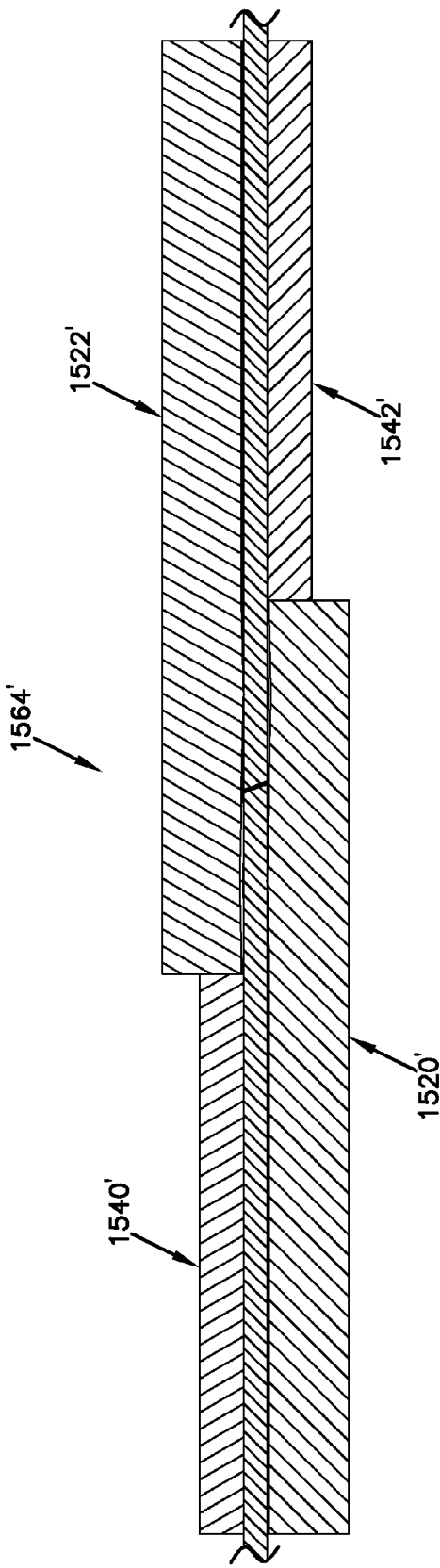
Figure 126:
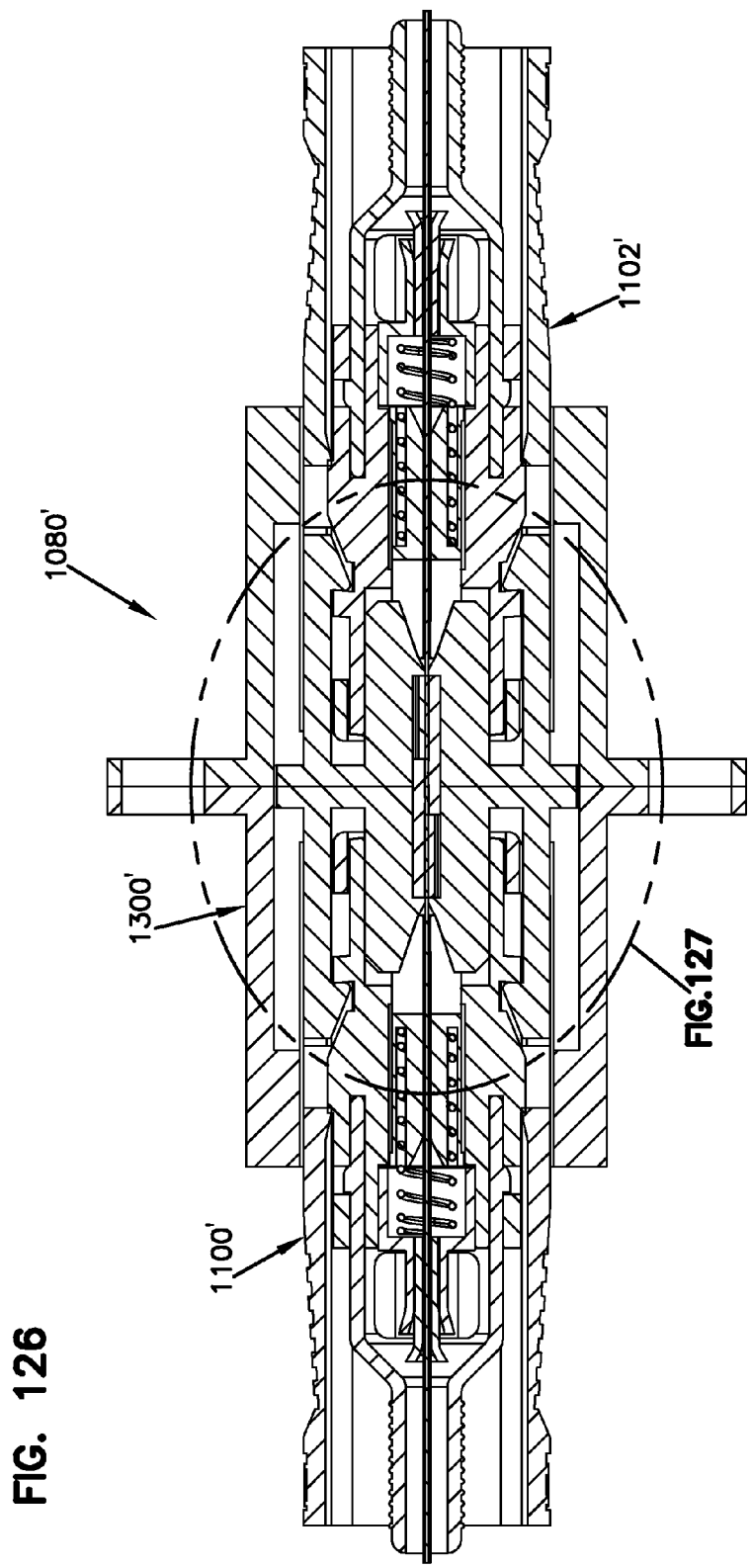
Figure 127:
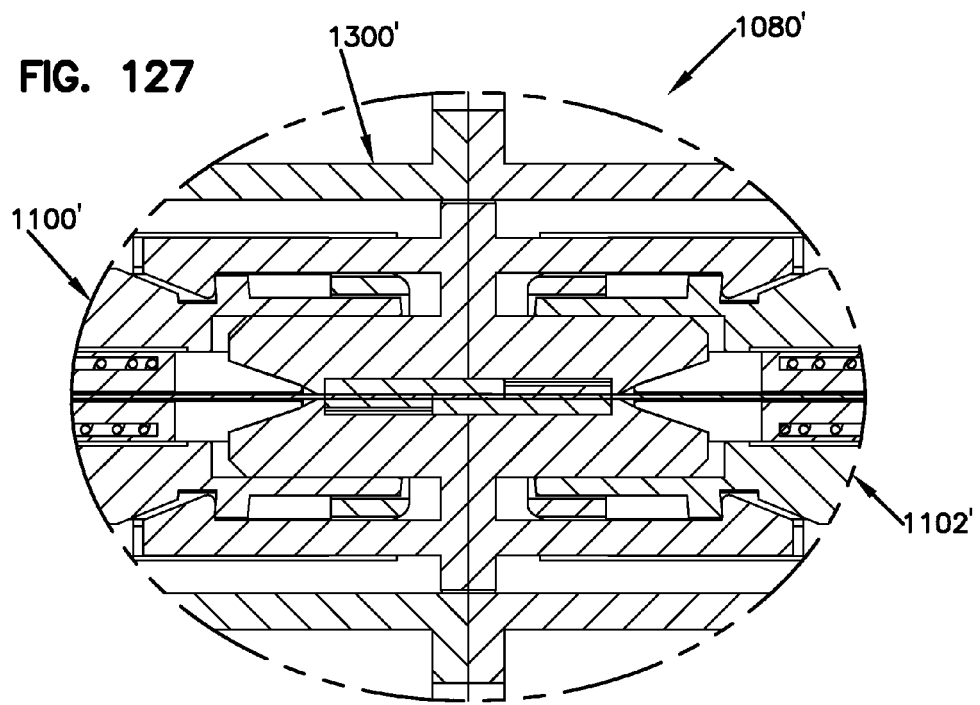
Figure 130:
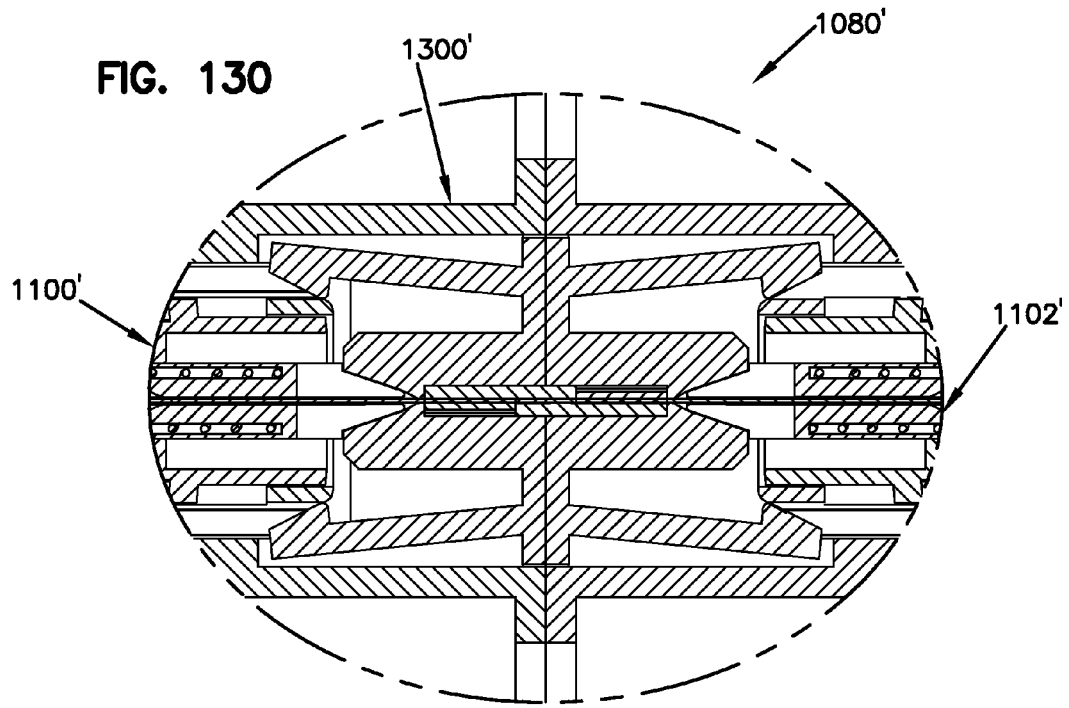
Figure 128:
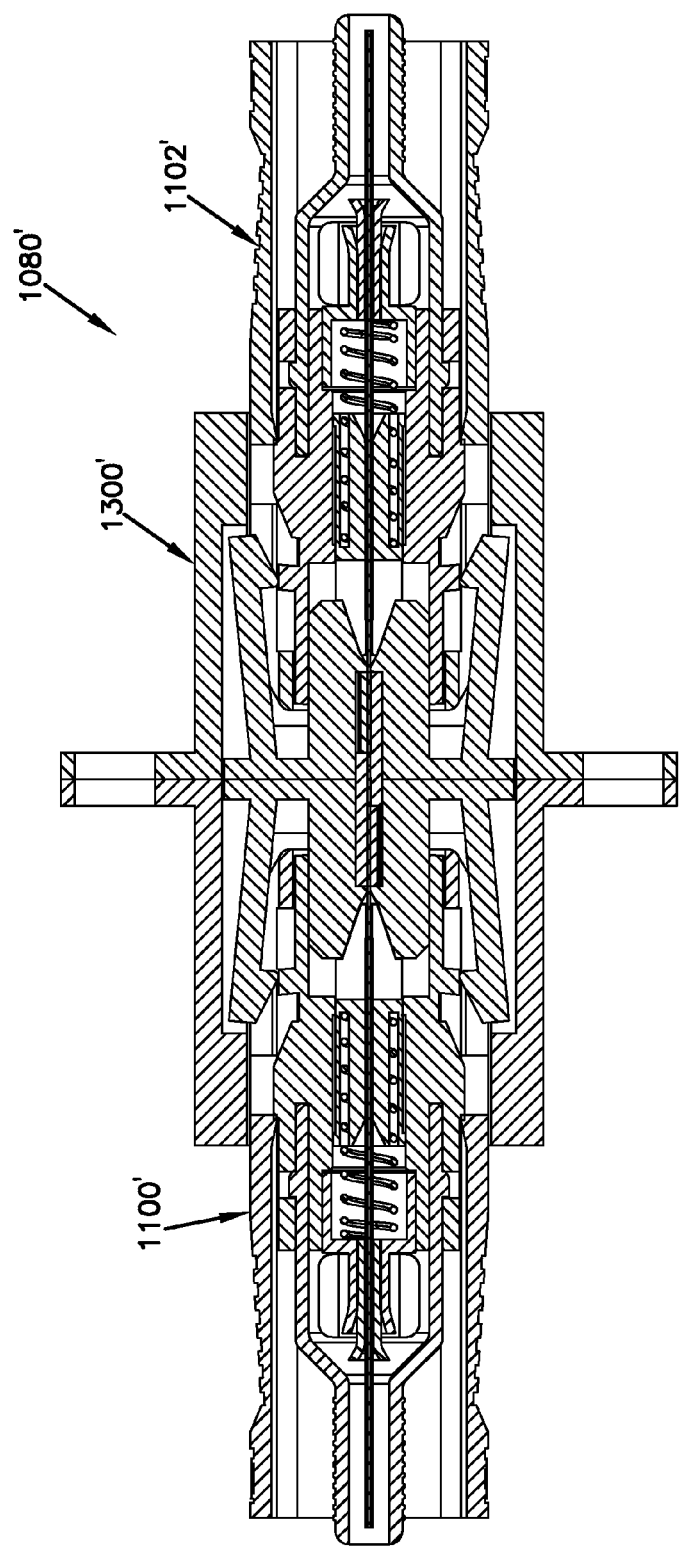
Figure 129:
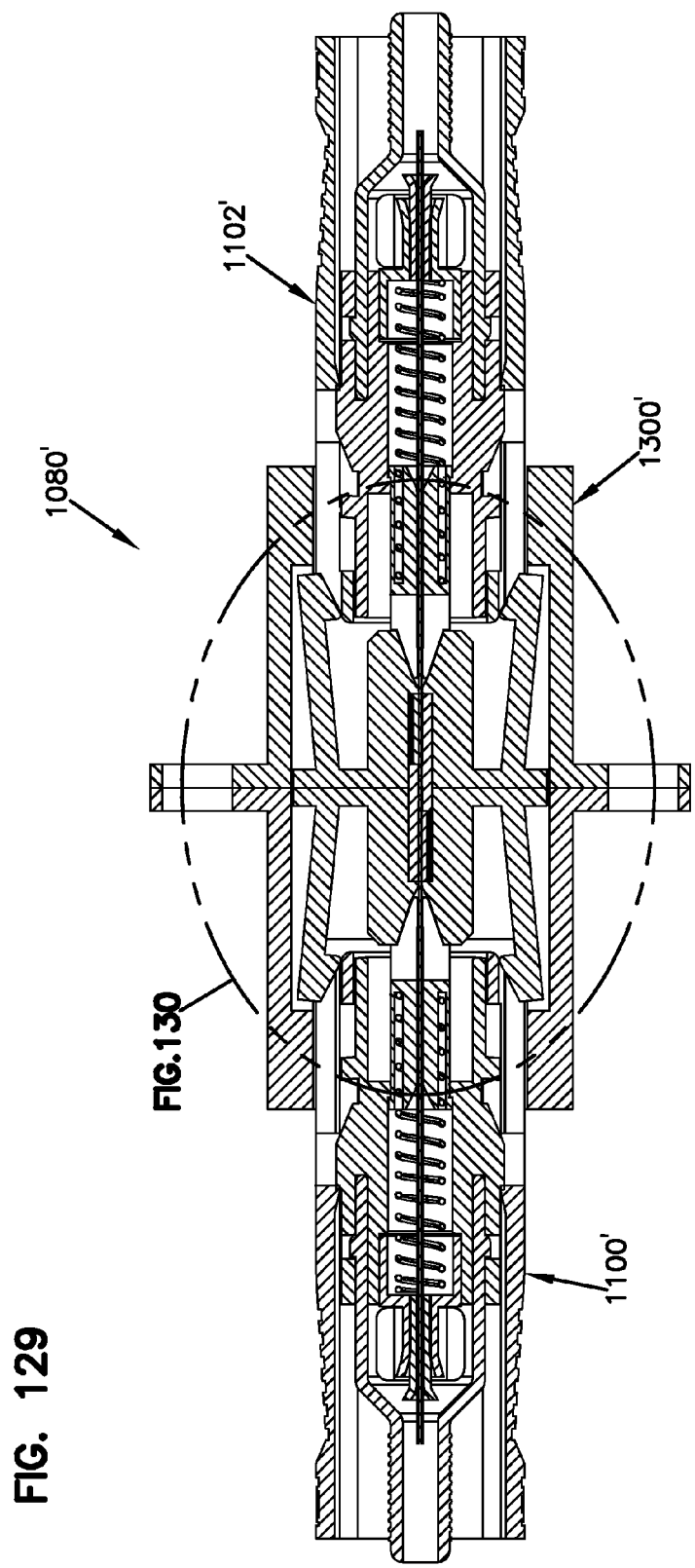
Figure 131:
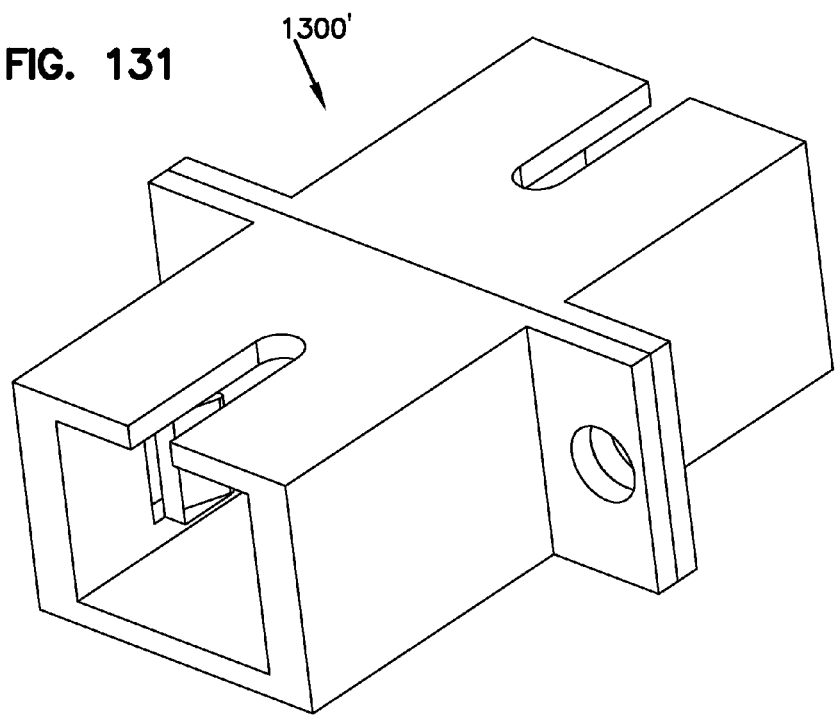
Figure 132:
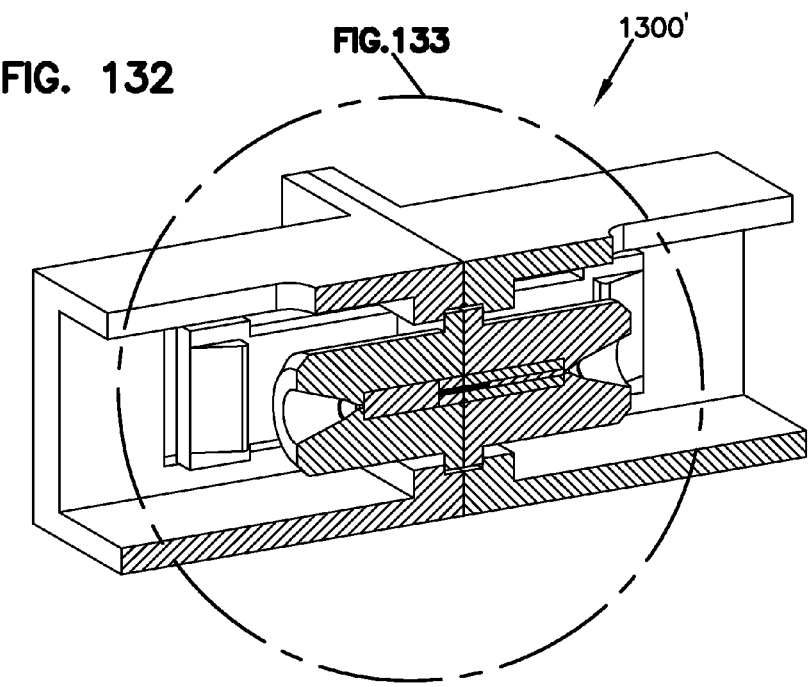
Figure 133:
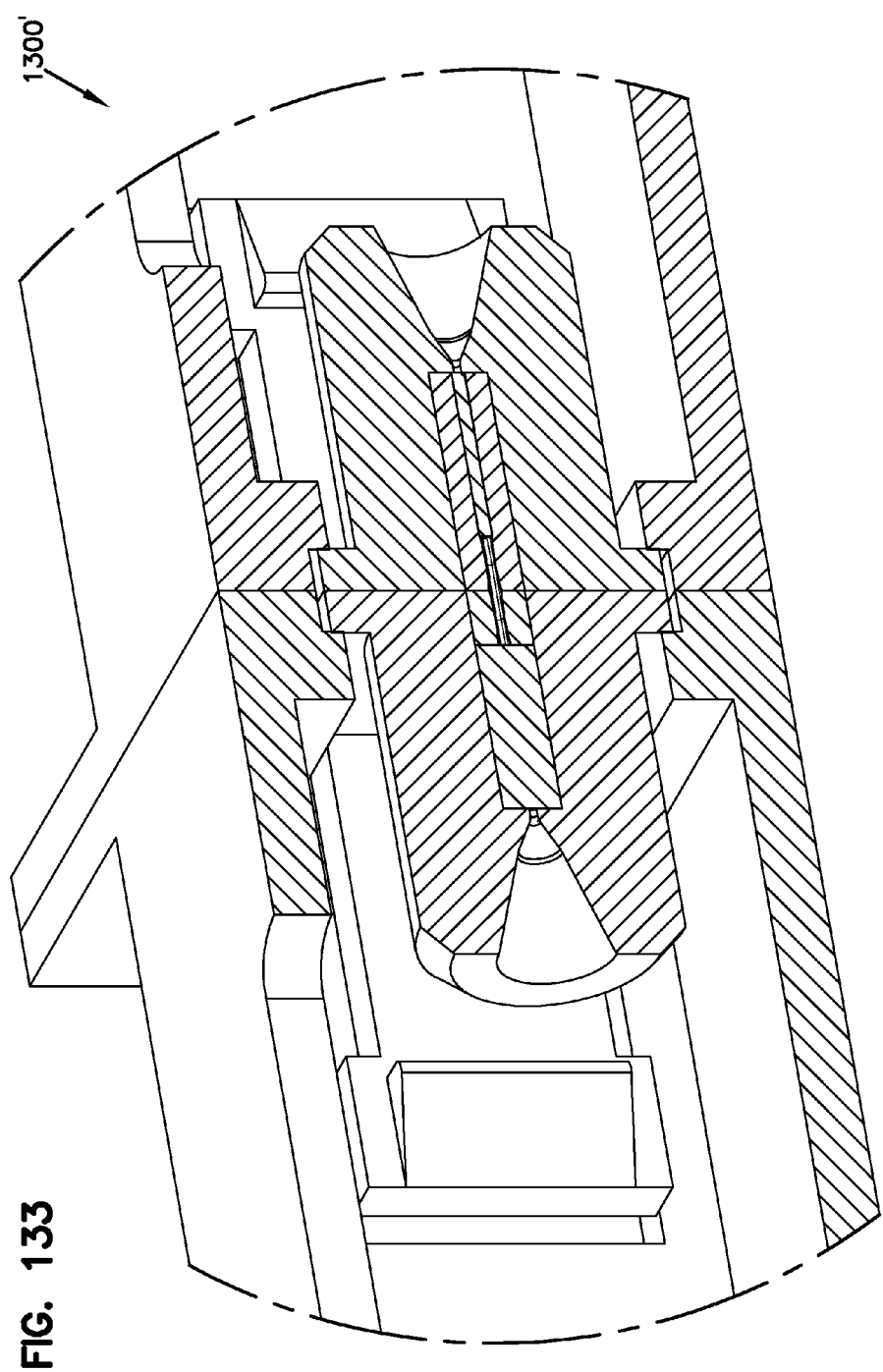
Figure 134:
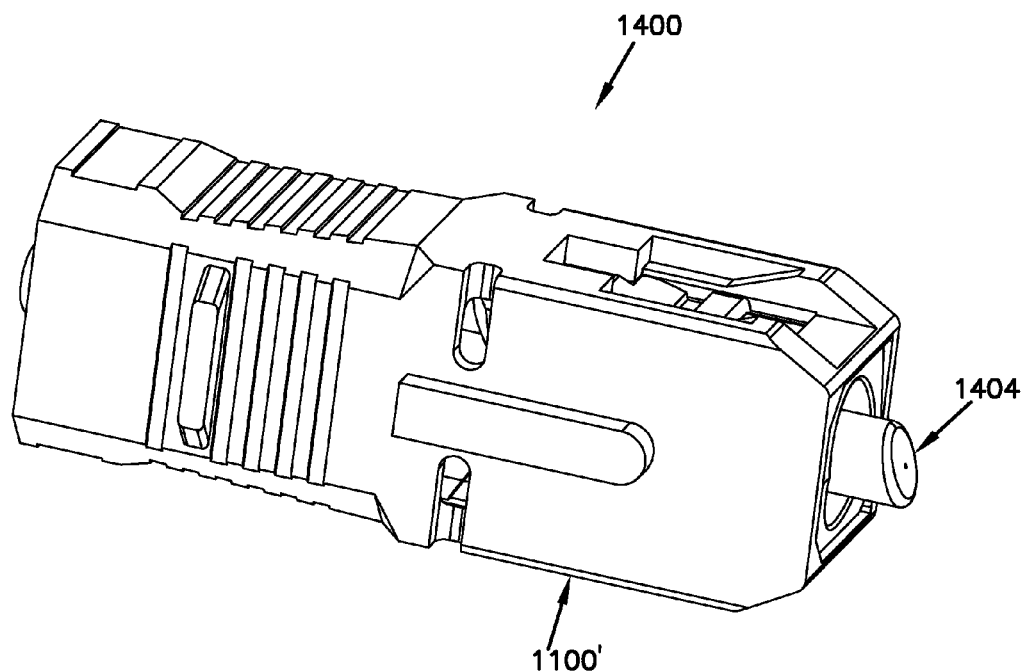
Figure 136:
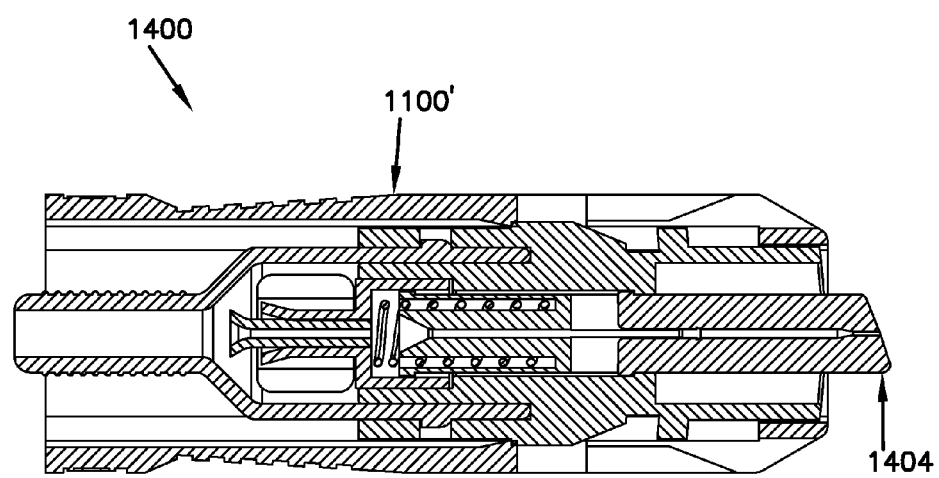
Figure 140:
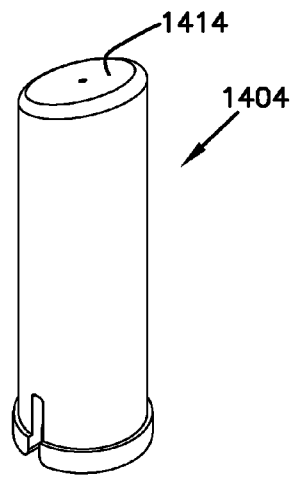
Figure 141:
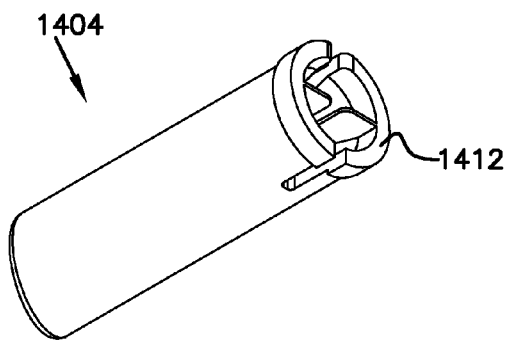
Figure 143:
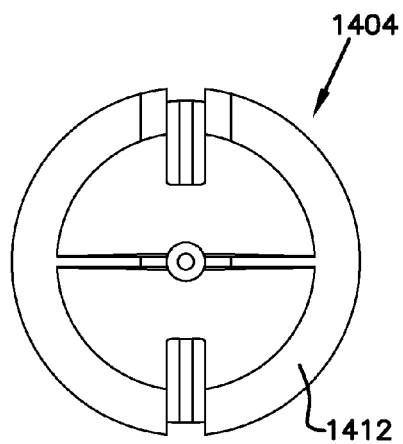
Figure 142:
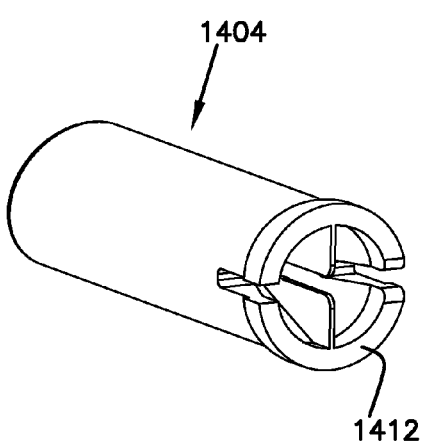

FIG. 126 is a cross-sectional top plan view of still another optical fiber connection system, according to the principles of the present disclosure, including a fiber optic adapter, with the pair of V-blocks and the pair of gel blocks of FIG. 121, and two fiber optic connectors, with the fiber optic connectors fully inserted into the fiber optic adapter, the view revealing a protective sheath of the fiber optic connectors in a retracted configuration and a release sleeve of the fiber optic connectors in a non-releasing configuration;

FIG. 127 is an enlarged portion of FIG. 126;

FIG. 128 is the cross-sectional top plan view of FIG. 126 but with the release sleeves of the fiber optic connectors moved to a releasing configuration;

FIG. 129 is the cross-sectional top plan view of FIG. 126 but with the fiber optic connectors partially inserted into the fiber optic adapter and the protective sheaths of the fiber optic connectors in an extended configuration;

FIG. 130 is an enlarged portion of FIG. 129;

FIG. 131 is a perspective view of the fiber optic adapter of FIG. 126, according to the principles of the present disclosure;

FIG. 132 is a cross-sectional perspective view of the fiber optic adapter of FIG. 126;

FIG. 133 is an enlarged portion of FIG. 132;

FIG. 134 is a perspective view of one of the two fiber optic connectors of FIG. 126 converted by a ferrule adaptation into an SC compatible connector with a form factor of an SC connector, according to the principles of the present disclosure;

FIG. 135 is another perspective view of the SC compatible connector of FIG. 134;

FIG. 136 is a cross-sectional top plan view of the SC compatible connector of FIG. 134;

FIG. 137 is a cross-sectional side elevation view of the SC compatible connector of FIG. 134;

FIG. 138 is an exploded perspective view of one of the two fiber optic connectors of FIG. 126;

FIG. 139 is the exploded perspective view of FIG. 138 but with the fiber optic connector cross-sectioned;

FIG. 140 is a perspective view of the ferrule adaptation of FIG. 134;

FIG. 141 is another perspective view of the ferrule adaptation of FIG. 134;

FIG. 142 is still another perspective view of the ferrule adaptation of FIG. 134;

FIG. 143 is an end elevation view of the ferrule adaptation of FIG. 134; and

Figure 144:
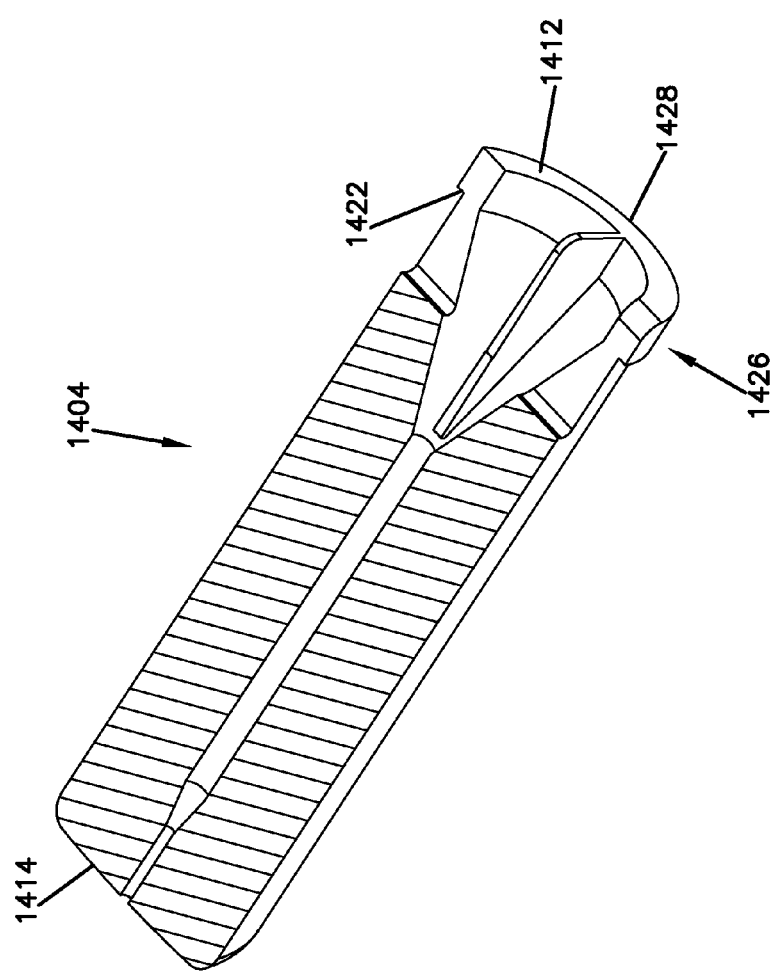

FIG. 144 is a cross-sectional perspective view of the ferrule adaptation of FIG. 134.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Referring now to FIGS. 1-6, a fiber optic connection system 80 is illustrated. The fiber optic connection system 80 is used to connect a first fiber optic cable 82 to a second fiber optic cable 92. The first fiber optic cable 82 extends between a first end portion 84 and a second end portion 86 (see FIGS. 1 and 4). Likewise, the second fiber optic cable 92 extends between a first end portion 94 and a second end portion 96. As depicted, each of the fiber optic cables 82, 92 includes an optical fiber 88 and a coating 90 (see FIGS. 22, 23, 88, and 89). Each of the optical fibers 88 in the fiber optic cables 82, 92 includes an end 98 of the optical fiber 88. As illustrated at FIGS. 3 and 4, the fiber optic connection system 80 brings the ends 98 of the optical fibers 88 in proximity to each other so that an optical signal may be transmitted between the first fiber optic cable 82 and the second fiber optic cable 92.

In the depicted embodiments of the figures, the fiber optic cables 82, 92 each include the optical fiber 88 and the coating 90. In other embodiments, the fiber optic cables may each include multiple optical fibers 88, each with the coating 90. In other embodiments, the fiber optic cables may include strength members, jackets, and other components known in the art of fiber optic cables. FIGS. 22 and 23 depict a fiber optic cable 82' similar to the fiber optic cables 82, 92 but further including a buffer layer 108 (e.g., a buffer tube, a tight buffer layer, a loose buffer layer). In preferred embodiments, the buffer layer 108 is a tight buffer layer. The fiber optic cable 82' may be a first fiber optic cable 82' or a second fiber optic cable 92'. The fiber optic cables 82', 92' also include an end 98 that may be optically connected to the other ends 98 of the fiber optic cables 82, 82', 92, 92' by the fiber optic connection system 80. The fiber optic cables 82, 82', 92, 92' may extend relatively short distances, such as in jumper cables, may extend intermediate distances, or may extend long distances of many miles.

As illustrated at FIGS. 1-3 and 5, the fiber optic connection system 80 includes a fiber optic adapter 300, a first fiber optic connector 100, and a second fiber optic connector 102. In the depicted embodiment, the first fiber optic connector 100 and the second fiber optic connector 102 are substantially the same fiber optic connector 100. In other embodiments, the fiber optic connectors may be substantially different from each other. For example, the first fiber optic connector may be a hardened fiber optic connector and the second fiber optic connector may be an unhardened fiber optic connector.

The fiber optic adapter 300 is adapted to receive the first fiber optic connector 100 and the second fiber optic connector 102. The first fiber optic connector 100 terminates the first end portion 84 of the first fiber optic cable 82, 82'. Likewise, the second fiber optic connector 102 terminates the first end portion 94 of the second fiber optic cable 92, 92'. When the first and the second fiber optic connectors 100, 102 are fully received within the fiber optic adapter 300, the ends 98 of the optical fibers 88 are held in close proximity to each other or in contact with each other, as shown at FIG. 4. The fiber optic adapter 300 thereby facilitates a physical connection of the fiber optic cables 82, 82', 92, 92', via the fiber optic connectors 100, 102, and also facilitates an optical connection between the first fiber optic cable 82, 82' and the second fiber optic cable 92, 92'. The fiber optic adapter 300 is also adapted to release either or both of the fiber optic connectors 100, 102. The fiber optic connectors 100, 102, and thereby the fiber optic cables 82, 82', 92, 92' may be disconnected from each other and the fiber optic adapter 300.

Turning now to FIGS. 7-31, the fiber optic connectors 100 and 102 will be described in detail. As the depicted embodiments of FIGS. 7-31 include fiber optic connectors 100, 102 that are the same fiber optic connector 100, reference will sometimes only be made to the fiber optic connector 100. Likewise, as certain of the depicted embodiments include fiber optic cables 82, 92 that are the same fiber optic cable 82, reference will sometimes only be made to the fiber optic cable 82. Likewise, as certain of the depicted embodiments include fiber optic cables 82', 92' that are the same fiber optic cable 82', reference will sometimes only be made to the fiber optic cable 82'.

The fiber optic connector 100 includes a housing 110, a sheath 130 (i.e., a protective shroud), a spring 170, a plug 180, and a sleeve 210. The fiber optic connector 100 extends between a distal end portion 104 and a proximal end portion 106. The distal end portion 104 generally coincides with or is adjacent to the end 98 of the optical fiber 88, and the proximal end portion 106 is generally connected to and adjacent to a portion of the fiber optic cable 82, 82' that is external to the fiber optic connector 100.

As illustrated at FIGS. 7, 8, 26, 27, 30, and 31, the housing 110 extends from a distal end portion 112 to a proximal end portion 114. The housing 110 includes an exterior 116 and an interior 118. An indexing feature 120 is included on the housing 110 of the fiber optic connector 100. The indexing feature 120 allows the fiber optic connector 100 to be oriented at a unique orientation when connected (e.g., to the fiber optic adapter 300). In the depicted embodiment, the indexing feature 120 is included on the exterior 116 of the housing 110. The housing 110 includes a bore 122. The bore 122 partially defines the interior 118 of the housing 110. The housing 110 includes a shoulder 124. In the depicted embodiment, the shoulder 124 is adjacent the distal end portion 112. In the depicted embodiment, a bore 126 is also positioned adjacent the distal end portion 112 and extends between the shoulder 124 and a distal end of the distal end portion 112. As depicted, the bore 126 includes a reduced diameter in comparison with the bore 122.

The sheath 130 extends between a distal end portion 132 and a proximal end portion 134. The sheath 130 includes a passage 136 that extends between the distal end portion 132 and the proximal end portion 134. A funnel 138 is defined adjacent the proximal end portion 134 of the sheath 130 with a larger portion extending toward the proximal end portion 134. The funnel 138 connects to a bore 142 that continues on to the distal end portion 132. The sheath 130 includes a radial compression feature 140. In the depicted embodiment, the radial compression feature 140 is a collet. In the depicted embodiment, the collet 140 is formed into the sheath 130 by slits 144 that extend between the bore 142 and an exterior 148 of the sheath 130. As depicted, there are two of the slits 144 that form two resilient fingers 158. In other embodiments, more of the slits 144 may be included and thereby form more of the resilient fingers 158. The sheath 130 includes a tapered seat 146. The tapered seat 146 is at the distal end portion 132 of the sheath 130 on the exterior 148. In the depicted embodiment, the radial compression feature 140 is actuated by the tapered seat 146. The exterior 148 of the sheath 130 also includes a cylindrical portion 150 and a step 152 between the tapered seat 146 and the cylindrical portion 150. In the depicted embodiment, the step 152 includes a shoulder. A shoulder 154 is formed adjacent the proximal end portion 134 of the sheath 130. In the depicted embodiment, the shoulder 154 is formed adjacent a cylindrical portion 156 at the proximal end portion 134 of the sheath 130. In the depicted embodiment, the cylindrical portion 156 extends between the shoulder 154 and a proximal end of the proximal end portion 134 of the sheath 130. The sheath 130 includes a spring seat 160 at the proximal end of the proximal end portion 134. In the depicted embodiment, the sheath 130 is a one-piece sheath (e.g. a unitary sheath, a monolithic sheath, etc.).

As illustrated at FIGS. 10 and 14, the sheath 130 is slidable relative to the housing 110. FIG. 14 illustrates the sheath 130 in an extended configuration 162, and FIG. 10 illustrates the sheath 130 in a retracted configuration 164. The sheath 130 may slide a distance D1 between the retracted configuration 164 and the extended configuration 162. FIG. 15 further illustrates the extended configuration 162. In particular, the shoulder 154 of the sheath 130 abuts the shoulder 124 of the housing 110. The sheath 130 is thereby prevented from extending past the extended configuration 162. As the sheath 130 is moved from the extended configuration 162 to the retracted configuration 164, the shoulder 154 separates from the shoulder 124 (see FIGS. 10-12). The cylindrical portion 150 of the sheath 130 rides on the bore 126 of the housing 110, and the cylindrical portion 156 of the sheath 130 rides on the bore 122 of the housing 110. The sheath 130 is thereby supported by the housing 110 at two locations. When the sheath 130 is at the retracted configuration 164, the step 152 is positioned adjacent the distal end portion 112 of the housing 110 (see FIG. 10).

The spring 170 of the fiber optic connector 100 extends between a first end 172 and a second end 174. As depicted, the first end 172 is a distal end and the second end 174 is a proximal end. As depicted, the spring 170 is a helical coil spring, including a helical coil 176. The spring 170 biases the sheath 130 toward the extended configuration 162. In other embodiments, other biasing members may be used to bias the sheath 130 toward the extended configuration of 162. The sheath 130 compresses the spring 170 when the sheath 130 is moved from the extended configuration 162 to the retracted configuration 164.

The plug 180 extends from a first end 182 to a second end 184. In the depicted embodiment, the plug 180 is an end plug. In the depicted embodiment, the first end 182 is a distal end and the second end 184 is a proximal end. The plug 180 may be made of a metallic material (e.g. brass, stainless steel, etc.). An interior passage 186 extends between the first end 182 and the second end 184. The interior passage 186 includes a bore portion 188, a compression portion 190, and a stress relief portion 192. The bore portion 188 is adjacent the first end 182. The stress relief portion 192 is adjacent the second end 184. The compression portion 190 is between the bore portion 188 and the stress relief portion 192. The plug 180 includes an exterior 194. The exterior 194 includes a spring seat 196, a connecting portion 198, a crimping portion 200, and a cable entrance 204. The spring seat 196 abuts the second end 174 of the spring 170 when the plug 180 is assembled into the housing 110. The spring 170 is thereby retained within the bore 122 of the housing 110.

The connecting portion 198 of the plug 180 is retained within the bore 122 of the housing 110 (e.g., by a compression fit). In other embodiments, the connecting portion 198 may be retained within the housing 110 by a threaded connection. In still other embodiments, the connecting portion 198 may be adhesively bonded to the bore 122 of the housing 110. The exterior 194 of the plug 180 further includes a transition 202 between the connecting portion 198 and the crimping portion 200. In the depicted embodiment, the transition 202 includes a step. The exterior 194 of the plug 180 further includes a transition 206 between the crimping portion 200 and the cable entrance portion 204. In the depicted embodiment, the transition 206 includes a step. The stress relief portion 192 of the interior passage 186 of the plug 180 smoothly transitions from the compression portion 190 and flares outwardly as the stress relief portion 192 extends toward the second end 184.

In the depicted embodiment, the plug 180 is a one-piece plug (e.g. a unitary plug, a monolithic plug, etc.). In the depicted embodiment, the plug 180 is a multi-function plug (e.g., the plug 180 includes the crimp function, the spring seat function, the connecting functions, and other functions including those mentioned above). In the depicted embodiment, the plug 180 is an integrated multi-function plug. In other embodiments, the various functions of the plug 180 can be separated into separate components. In certain embodiments, some or all of the components may not take the form of a plug.

The sleeve 210 of the fiber optic connector 100 extends from a first end 212 to a second end 214. In the depicted embodiment, the first end 212 is a distal end and the second end 214 is a proximal end. An interior passage 216 extends between the first end 212 and the second end 214. The interior passage 216 includes a bore portion 218, a compression portion 220, and a stress relief portion 222. The bore portion 218 generally coincides with the bore portion 188, the compression portion 220 generally coincides with the compression portion 190, and the stress relief portion 222 generally coincides with the stress relief portion 192. The sleeve 210 includes an exterior 224. The exterior 224 includes an uncompressed portion 226, a compressed portion 228, and a cable entrance 230. In the depicted embodiment, the cable entrance 230 includes a stress relief portion. The uncompressed portion 226 generally coincides with the bore portion 188 of the plug 180. The compressed portion 228 generally corresponds and coincides with the compression portion 190. And, the cable entrance 230 generally coincides with the stress relief portion 192.

In the depicted embodiment, the sleeve 210 performs a stress relief function. In particular, the stress relief portion 222 is shaped to protect the optical fiber 88 from sharp bends as the fiber optic cable 82 exits the fiber optic connector 100. In the depicted embodiment, the sleeve 210 performs a stress distributing function. In particular, the sleeve 210 includes compliant material that distributes pressure generated by the compression portion 190 of the plug 180 to the fiber optic cable 82 and/or the optical fiber 88. In the depicted embodiment, the compliant material of the sleeve 210 substantially reduces or eliminates any peak loads that would otherwise be transferred to the fiber optic cable 82 and/or the optical fiber 88 from the plug 180. In other embodiments, the various functions of the sleeve 210 can be separated into separate components. In certain embodiments, some or all of the components may not take the form of a sleeve. In certain embodiments, the sleeve 210 or portions of the sleeve 210 can be combined with (e.g., integrated with) the plug 180.

FIGS. 1-10, 14-17, 88, and 89 illustrate the fiber optic connector 100 with the fiber optic cable 82 installed. FIGS. 22 and 23 illustrate the fiber optic connector 100 with the fiber optic cable 82' installed. FIGS. 18-21 and 24-31 show the fiber optic connector 100 without the fiber optic cable 82, 82' installed. The fiber optic cables 82, 82' illustrated in the figures are fiber optic cables with a nominal 250 µm outside diameter coating 90 and a nominal 125 µm diameter optical fiber 88. Various tolerances and various processes that are used to make the optical fiber 88 and the coating 90 may result in diameters that vary from the nominal diameters. For example, the nominal 250 µm outside diameter of the coating 90 may range from about 250 µm to about 260 µm, in certain embodiments. The fiber optic cable 82' may be a fiber optic cable with a nominal 900 µm outside diameter buffer tube 108. In other embodiments, the optical fiber 88, the coating 90, and/or the buffer tube 108 can be other sizes. In the depicted embodiment, the coating 90 is a tightly bound coating.

As depicted at FIGS. 22 and 23, when the fiber optic connector 100 is used with the fiber optic cable 82' with the buffer tube 108, the sleeve 210 may be omitted, and the buffer tube 108 may directly interface with the interior passage 186 of the plug 180 (e.g., the end plug). Thus, the sleeve 210 is a converting sleeve that converts the fiber optic connector 100 to various fiber optic cable types. In certain embodiments, the sleeve 210 may have multiple variations of sizes and shapes to adapt the fiber optic connector 100 to the various fiber optic cable types.

In certain embodiments, the buffer tube 108 (if present) and the coating 90 of the fiber optic cables 82, 82' may be pre-stripped from the fiber optic cable 82, 82' before insertion of the fiber optic cable 82, 82' into the fiber optic connector 100. As illustrated at FIG. 10, dimension D2 indicates a dimension of a portion of the coating 90 that may be stripped from the fiber optic cable 82, 82'. The stripped portion of the coating 90 of the fiber optic cables 82, 82' may be stripped before the insertion of the fiber optic cables 82, 82' or may be stripped after the insertion of the fiber optic cable 82, 82' into the connector 100. The coating 90 of the fiber optic cable 82, 82' may be partially stripped to a smaller diameter before the insertion into the fiber optic connector 100, and then may be further stripped (e.g., final stripped) after the insertion of the fiber optic cable 82, 82' into the fiber optic connector 100, as further described below.

In embodiments with the buffer layer 108, it is preferred that an end portion of the buffer layer 108 is stripped from the fiber optic cable 82' before the insertion of the fiber optic cable 82' into the connector 100 (see FIGS. 22 and 23). As depicted, a length D4 of the buffer layer 108 is striped off an end portion of the fiber optic cable 82'.

Upon the pre-stripping of the buffer tube 108 (if present) and/or the coating 90 off of the fiber optic cable 82, 82', the end 98 of the optical fiber 88 is inserted through the proximal end portion 106 of the fiber optic connector 100. In embodiments that do not pre-strip, the end portion 84 of the fiber optic cable 82, 82' and/or the end 98 of the optical fiber 88 is inserted through the proximal end portion 106 of the fiber optic connector 100. In particular, the end 98 of the optical fiber 88 is inserted through the stress relief portion 222 of the sleeve 210, if present, or the stress relief portion 192 of the plug 180, if the sleeve 210 is not present. The stress relief portion 192 or the stress relief portion 222 thereby may act as a guide to aid the insertion of the end portion 84 of the fiber optic cable 82, 82' and/or the end 98 of the optical fiber 88.

The end portion 84 of the fiber optic cable 82, 82' and/or the end 98 of the optical fiber 88 is further slid through the interior passage 216 of the sleeve 210 or the interior passage 186 of the plug 180 and into the spring 170, within the helical coil 176. The insertion of the fiber optic cable 82, 82' and/or the end 98 of the optical fiber 88 into the connector 100 continues with the end portion 84 of the fiber optic cable 82, 82' and/or the end 98 of the optical fiber 88 entering the funnel 138 of the sheath 130. The insertion continues through the passage 136 until the end portion 84 and/or the end 98 extends to or beyond the distal end portion 132 of the sheath 130. In certain embodiments, the end 98 of the optical fiber 88 is fully inserted when the end 98 extends about a distance D3 beyond the distal end portion 112 of the housing 110 (see FIG. 10). In certain embodiments, the end 98 of the optical fiber 88 is fully inserted when the end 98 extends slightly greater than the distance D3 beyond the distal end portion 112 of the housing 110. The insertion distance in excess of the distance D3 can serve as a polishing allowance for when the end 98 is polished to a polished end 98', as will be further described below.

FIG. 88 illustrates the pre-stripped fiber optic cable 82 (e.g., a portion of the coating 90 has been fully or partially stripped) inserted into the fiber optic connector 100. FIGS. 23 and 89 illustrate the fiber optic cables 82, 82', with no pre-stripping of the coating 90, inserted into the fiber optic connector 100.

Upon proper longitudinal positioning of the fiber optic cable 82, 82' and/or the optical fiber 88 within the fiber optic connector 100, the compression portion 190 of the plug 180 is activated. As will be described in detail below, the compression portion 190 may be activated by the crimp portion 200 of the plug 180. The activation of the compression portion 190 causes the compression portion 190 to compress the compressed portion 228 of the sleeve 210, if present. Upon the compressed portion 228 of the sleeve 210 being compressed by the compression portion 190, the compression portion 220 of the sleeve 210 compresses the fiber optic cable 82. As depicted, the compression portion 220 of the sleeve 210 compresses the coating 90 of the fiber optic cable 82. If the sleeve 210 is not present, the activation of the compression portion 190 causes the compression portion 190 to bear directly against the buffer tube 108 of the fiber optic cable 82'. Upon the activation of the compression portion 190, the longitudinal position of the fiber optic cable 82, 82' is fixed relative to the longitudinal position of the housing 110 of the fiber optic connector 100.

In the depicted embodiment, the compression portion 190 is activated by crimping. In other embodiments, the compression portion 190 may be activated by other compressing members or member. For example, the compression portion 190 may be activated by activating a collet with a nut.

Upon the fiber optic cable 82, 82' and/or the optical fiber 88 being longitudinally located within the fiber optic connector 100, the radial compression feature 140 of the sheath 130 is activated and thereby compresses against the fiber optic cable 82, 82' and/or the optical fiber 88. In certain preferred embodiments where the coating 90 is not pre-stripped (e.g., see FIGS. 22, 23, and 89), the radial compression features 140 of the sheath 130 compress against the coating 90 near or adjacent to the end 98 of the optical fiber 88. In certain embodiments where the coating 90 is pre-stripped (e.g., see FIG. 88), the radial compression features 140 of the sheath 130 may compress against bare glass of the optical fiber 88 near or adjacent to the end 98 of the optical fiber 88. The activation of the radial compression feature 140 is done in preparation for polishing the end 98 of the optical fiber 88. In the depicted embodiment, the radial compression feature 140 is activated by the resilient fingers 158 deforming to an engaging configuration. When the resilient fingers 158 are deformed to the engaging configuration, a gripping portion 142' of the bore 142 reduces in size. The reduction in size of the gripping portion 142' causes the gripping portion 142' to compresses against the fiber optic cable 82, 82' and/or the optical fiber 88. If the coating 90 of the fiber optic cable 82, 82' is pre-stripped, the radial compression feature 140 (e.g., the gripping portion 142') may bear down directly against the glass (i.e., the light conducing portion) of the optical fiber 88. If the coating 90 of the fiber optic cable 82, 82' is unstripped or partially stripped, the radial compression feature 140 (e.g., the gripping portion 142') may bear down against the coating 90.

Upon the radial compression feature 140 being activated, the end 98 of the optical fiber 88 is polished. As the radial compression feature 140 is preferably located adjacent the end 98 of the optical fiber 88 and/or the end portion 84 of the fiber optic cable 82, 82', the end 98 and/or the end portion 84 is/are well supported and located by the radial compression feature 140, when it is activated. As illustrated at FIGS. 10, 13, 14, and 16, the end 98 of the optical fiber 88 may be polished to an angle α. In certain embodiments, the angle α may range from about 90 degrees to about 120 degrees. In other embodiments, the angle α may range from about 95 degrees to about 100 degrees. In still other embodiments, the angle α may range from about 105 degrees to about 110 degrees. As illustrated at FIGS. 13 and 16, the polishing process may remove a portion of the end 98 of the optical fiber 88 and leave the polished end 98'. The polishing process may thereby precisely locate the polished end 98' of the optical fiber 88 relative to the compression portion 190.

As the compression portion 190 fixes the longitudinal position of the fiber optic cable 82, 82' relative to the longitudinal position of the housing 110 of the fiber optic connector 100, the polishing process precisely locates the polished end 98' of the optical fiber 88 relative to the housing 110. The polishing process may further remove a portion of the distal end portion 132 of the sheath 130, as illustrated at FIGS. 6-10, 14, 16, 17, and 84. An example polishing process and tools are further described and illustrated below.

Upon the polishing process being complete, the radial compression feature 140 is deactivated. The deactivation of the radial compression feature 140 allows the sheath 130 to slide freely along the optical fiber 88 and/or the fiber optic cable 82, 82' between the extended configuration 162 and the retracted configuration 164. In the depicted embodiment, the radial compression feature 140 is deactivated by the resilient fingers 158 returning to a non-engaging configuration and thereby uncompressing the gripping portion 142' from the fiber optic cable 82, 82' and/or the optical fiber 88. In the depicted embodiment, the engaging configuration (i.e., the activated configuration) of the resilient fingers 158 has the resilient fingers 158 deformed and actuated, and the non-engaging configuration (i.e., the deactivated configuration) of the resilient fingers 158 has the resilient fingers 158 relaxed and un-actuated. In other embodiments, the engaging configuration (i.e., the activated configuration) of the resilient fingers 158 has the resilient fingers 158 un-actuated, and the non-engaging configuration (i.e., the deactivated configuration) of the resilient fingers 158 has the resilient fingers 158 actuated.

In embodiments where the coating 90 is stripped after the insertion of the fiber optic cable 82, 82' into the fiber optic connector 100, and/or in embodiments where the coating 90 is partially stripped from the fiber optic cable 82, 82' before the insertion of the fiber optic cable 82, 82' into the fiber optic connector 100, the portion of the coating 90 that is to be stripped away may be stripped by putting the sheath 130 at the retracted configuration 164 and then applying a stripping tool (not shown) to the coating 90, adjacent the distal end portion 132 of the sheath 130. The sheath 130 may then be extended to the extended configuration 162. As the sheath 130 is extended to the extended configuration 162, the stripping process may be executed. In particular, the spring 170 may assist in extending the sheath 130 to the extended configuration 162, and thereby the spring 170 may assist in the stripping process as the sheath 130 pushes on the stripping tool. The stripping tool may be similar to a stripping tool known in the art as a "Miller Buffer Stripper". Various "Miller Buffer Stripper" tools are sold by Go4Fiber Ltd. of 13/F Culturecom Centre, 47 Hung To Road, Kwun Tong, Hong Kong. The "Miller Buffer Stripper" may be modified into the stripping tool by, for example, adding a tip receiving portion to receive the tapered seat 146 and/or the distal end portion 132 of the sheath 130.

After the stripping process, the sheath 130 functions as a protective member over the optical fiber 88. In particular, as illustrated at FIGS. 3-6, when the fiber optic connector 100 is disconnected (see FIGS. 5, 6, and 8), the sheath 130 is in the extended configuration 162. When the fiber optic connector 100 is connected, the sheath 130 retracts to the retracted configuration 164 (see FIGS. 3, 4, and 7). Further details of connecting the fiber optic connector 100 and/or the fiber optic connector 102 to the fiber optic adapter 300 are described below.

Turning now to FIGS. 32-47, the fiber optic adapter 300 will be described in further detail. The fiber optic adapter 300 extends from a first end 302 to a second end 304. An intermediate portion 306 is positioned between the first end 302 and the second end 304. In the depicted embodiment, a mounting flange 308 is positioned over the intermediate portion 306. The fiber optic adapter 300 includes a housing 310 and an alignment sleeve assembly 450 housed within the housing 310. The housing 310 includes a first port 312 and a second port 314. The fiber optic adapter 300 includes an exterior 316. The mounting flange 308 may be attached to or integrated with the exterior 316 of the fiber optic adapter 300.

In the depicted embodiment, the fiber optic adapter 300 includes a first latch 322 and a second latch 324. The first latch 322 and the second latch 324 are accessible from the exterior 316 of the fiber optic adapter 300. The first latch 322 is adapted to releasably retain the first fiber optic connector 100. And the second latch 324 is adapted to releasably retain the second fiber optic connector 102. The first latch 322 includes a first release 326 that is accessible from the exterior 316 of the fiber optic adapter 300. Likewise, the second latch 324 includes a second release 328 that is accessible from the exterior 316 of the fiber optic adapter 300. By actuating the first release 326, the first fiber optic connector 100 can be released from the fiber optic adapter 300. Likewise, by actuating the second release 328, the second fiber optic connector 102 can be released from the fiber optic adapter 300. The first release 326 corresponds with the first port 312, and the second release 328 corresponds with the second port 314.

The fiber optic adapter 300 includes a keying feature 332 and a keying feature 334. The keying features 332, 334 ensure a proper orientation of the fiber optic adapter 300 when it is installed. The keying features 332, 334 are oriented such that installation of the fiber optic adapter 300 results in an orientation of the fiber optic adapter 300 that is predetermined. In the depicted embodiment, the keying feature 332 and the keying feature 334 are rotated from each other by 180 degrees about an axis A1 (see FIG. 34), and the fiber optic adapter 300 can therefore be installed in two orientations that are rotated from each other by 180 degrees about the axis A1. In the depicted embodiment, the fiber optic adapter 300 has the same form, fit, and function when it is rotated about the axis A1 by 180 degrees. In other embodiments, the fiber optic adapter 300 has a unique installation orientation.

Figure 32:
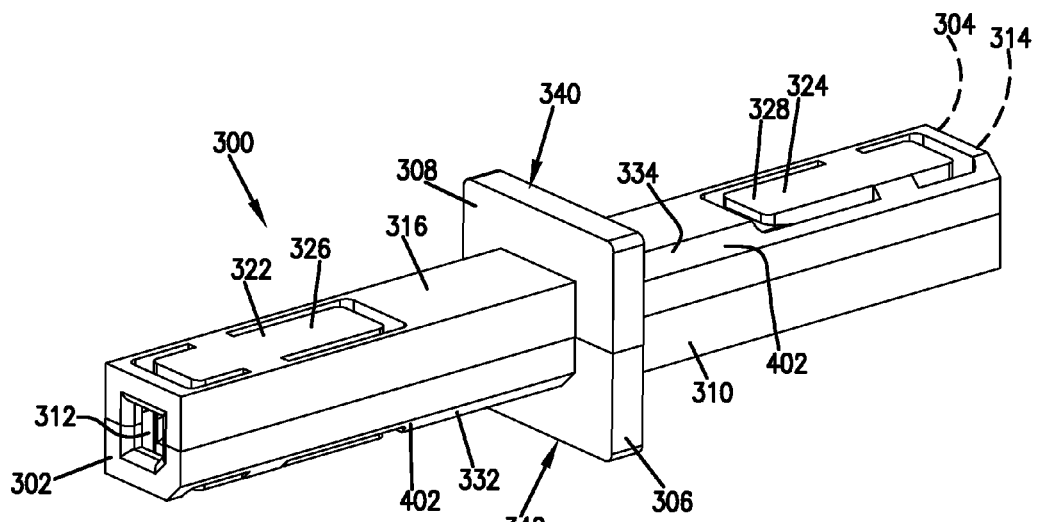
FIG. 32 is the perspective view of FIG. 1 of the fiber optic adapter of FIG. 1, according to the principles of the present disclosure.
Figure 33:
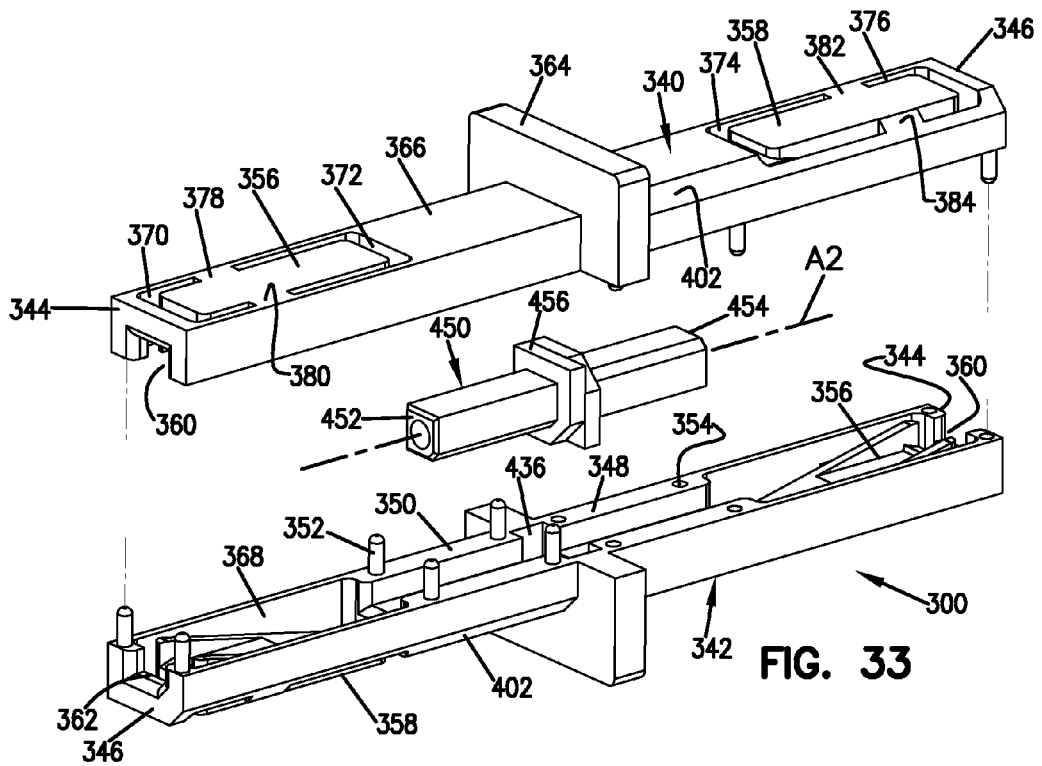
FIG. 33 is the perspective view of FIG. 32 of the fiber optic adapter of FIG. 1 but exploded revealing an alignment sleeve of the fiber optic adapter.
Figure 34:
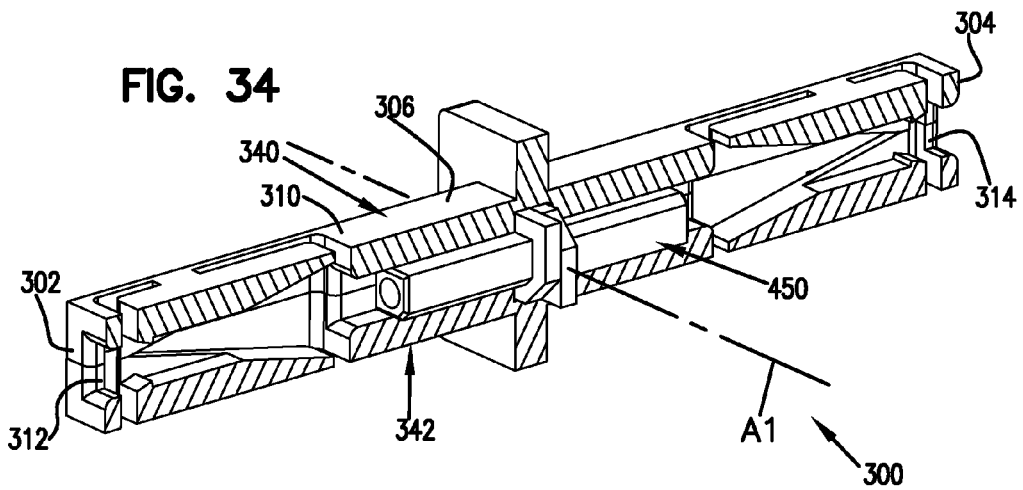
FIG. 34 is the perspective view of FIG. 32 of the fiber optic adapter of FIG. 1 but with a housing of the fiber optic adapter cut away revealing the alignment sleeve of FIG. 33.

In the depicted embodiment, the fiber optic adapter 300 includes the housing 310 that is constructed of a first housing half-piece 340 and a second housing half-piece 342. In the depicted embodiment, the first housing half-piece 340 and the second housing half-piece 342 are identical housing half-pieces 340. In the depicted embodiment, the housing half-piece 340 is a one-piece half-piece (e.g. a unitary half-piece, a monolithic half-piece, etc.). The first housing half-piece 340 extends between a first end 344 and a second end 346. The housing half-piece 340 includes a joining interface 348. The joining interface 348 allows the joining of the first housing half-piece 340 to the second housing half-piece 342. In certain embodiments, an adhesive (e.g., a glue, a bonding agent, etc.) is applied at the joining interface 348 to join the first housing half-piece 340 to the second housing half-piece 342. In other embodiments, one or more fasteners may join the first housing half-piece 340 to the second housing half-piece 342. As the second housing half-piece 342 is identical to the first housing half-piece 340, the second housing half-piece 342 also includes the first end 344 and the second end 346. When connected together, the first end 344 of the first housing half-piece 340 corresponds to the second end 346 of the second housing half-piece 342. Likewise, the second end 346 of the first housing half-piece 340 corresponds with the first end 344 of the second housing half-piece 342. As depicted, the joining interface 348 includes a joining plane 350, a plurality of pins 352, and a plurality of pin holes 354. As illustrated at FIG. 33, the pins 352 of the first housing half-piece 340 mate into the pin holes 354 of the second housing half-piece 342. Likewise, the pin holes 354 of the first housing half-piece 340 are adapted to mate to the pins 352 of the second housing half-piece 342. In certain embodiments, the pins 352 are captured by the pin holes 354 and thereby join the first housing half-piece 340 to the second housing half-piece 342. The pins 352 may be captured by a press fit, a barb, a latching feature, etc. As depicted, the joining plane 350 is parallel to the optical fibers 88 when the fiber optic connectors 100, 102 are connected to the fiber optic adapter 300.

The housing half-piece 340 includes a first latch 356 and a second latch 358. Likewise, the second housing half-piece 342 includes the first latch 356 and the second latch 358. When the housing half-pieces 340, 342 are joined into the housing 310, the first latch 356 of the first housing half-piece works in conjunction with the second latch 358 of the second housing half-piece 342 to form the first latch 322. Likewise, the second latch 358 of the first housing half-piece 340 works in conjunction with the first latch 356 of the second housing half-piece 342 to form the second latch 324. The first latch 356 includes a first release surface 398, and the second latch 358 includes a second release surface 400 (see FIG. 35). The latches 322, 324 thus each have opposed latches 356, 358, and the releases 326, 328 may be actuated by pinching across the opposed latches 356, 358 at the release surfaces 398, 400 (see FIGS. 1-3 and 5).

The first housing half-piece 340 and the second housing half-piece 342 each include a first half port 360 and a second half port 362. When assembled together, the first housing half-piece 340 and the second housing half-piece 342 form the first port 312 from the first half port 360 of the first housing half-piece 340 and the second half port 362 of the second half-piece 342. Likewise, the second port 314 is formed of the second half port 362 of the first housing half-piece 340 and the first half port 360 of the second half-piece 342.

The housing half-piece 340 includes a half flange 364. The half flange 364 of the half-pieces 340, 342 form the mounting flange 308 of the fiber optic adapter 300.

Figure 35:
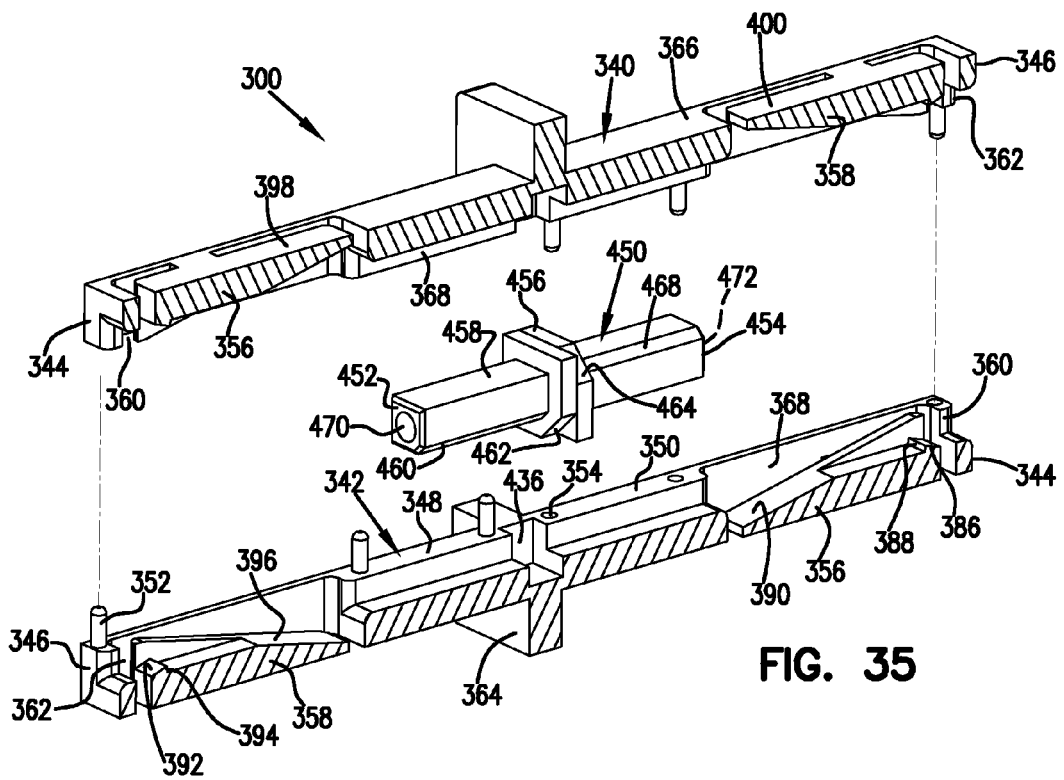
FIG. 35 is the perspective view of FIG. 33 of the fiber optic adapter of FIG. 1 but with the housing of FIG. 34 cut away, as in FIG. 34.
Figure 77:
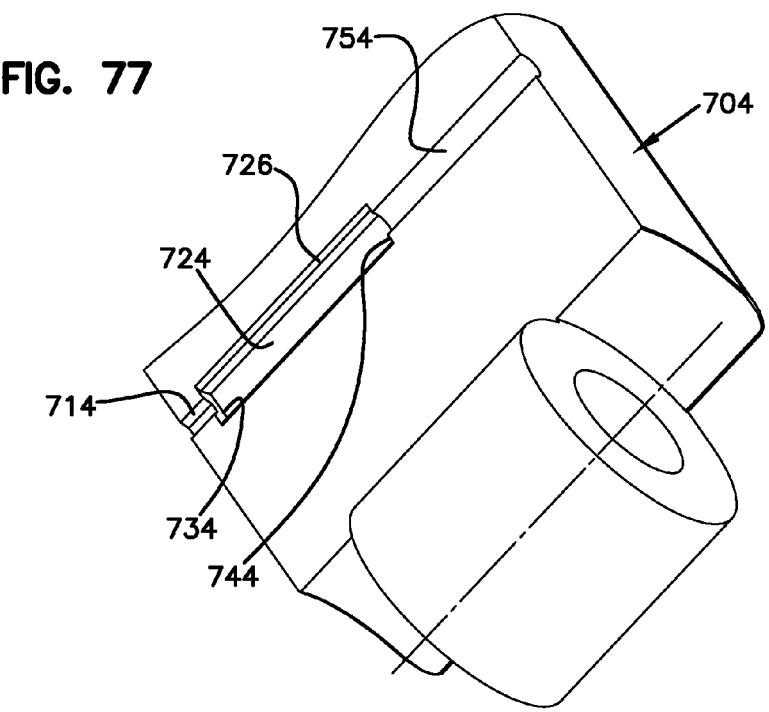
FIG. 77 is a partial perspective view of a second crimping member of the crimping tool of FIG. 70.
Figure 76:
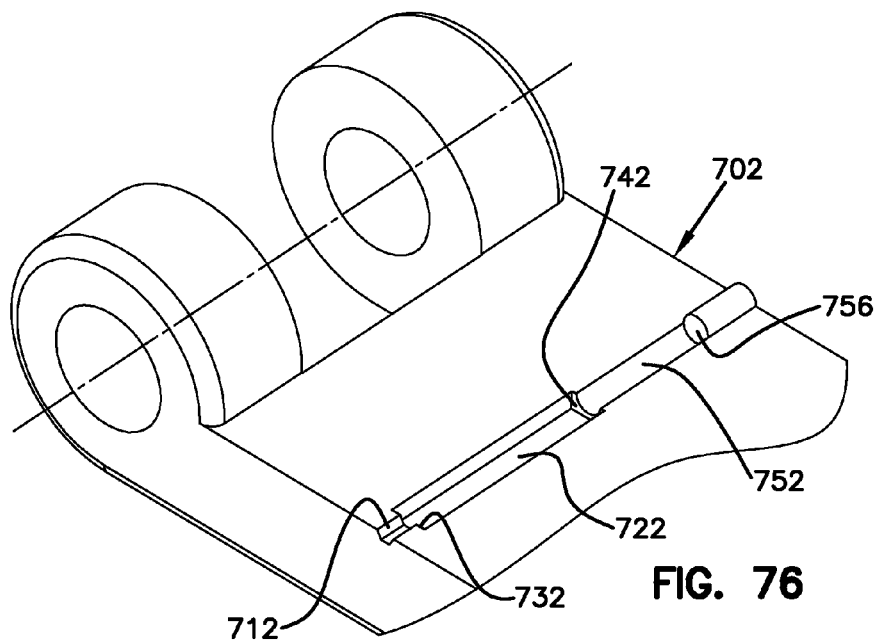
FIG. 76 is a partial perspective view of a first crimping member of the crimping tool of FIG. 70.
Figure 110:
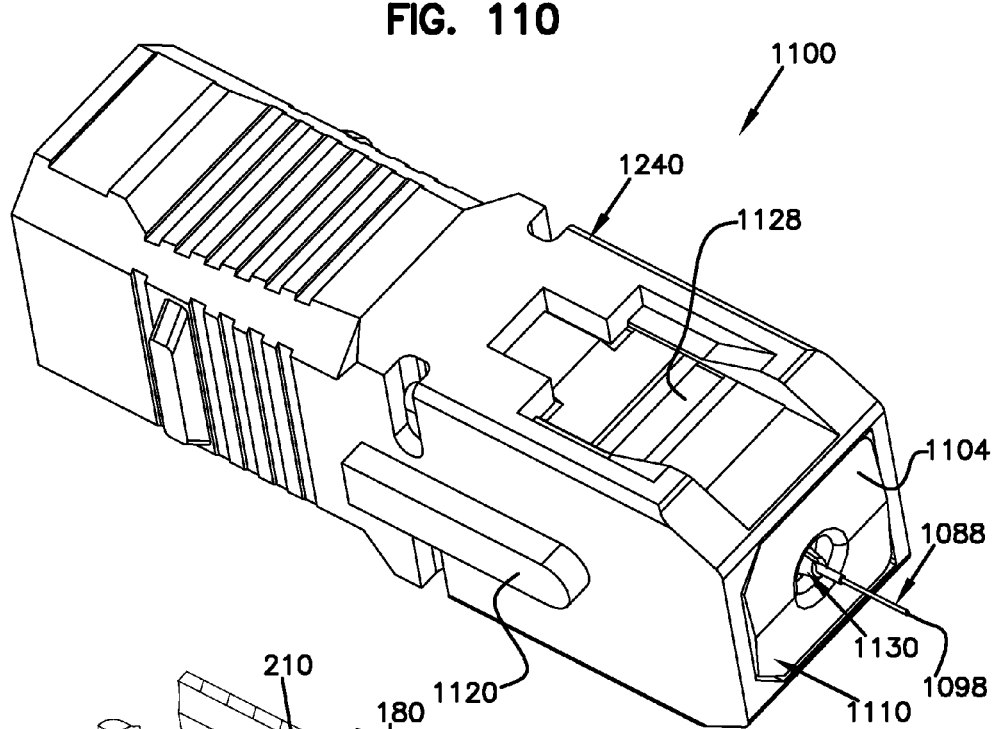
FIG. 110 is the perspective view of FIG. 108 but with the protective sheath of FIG. 101 in the refracted configuration.
Figure 111:
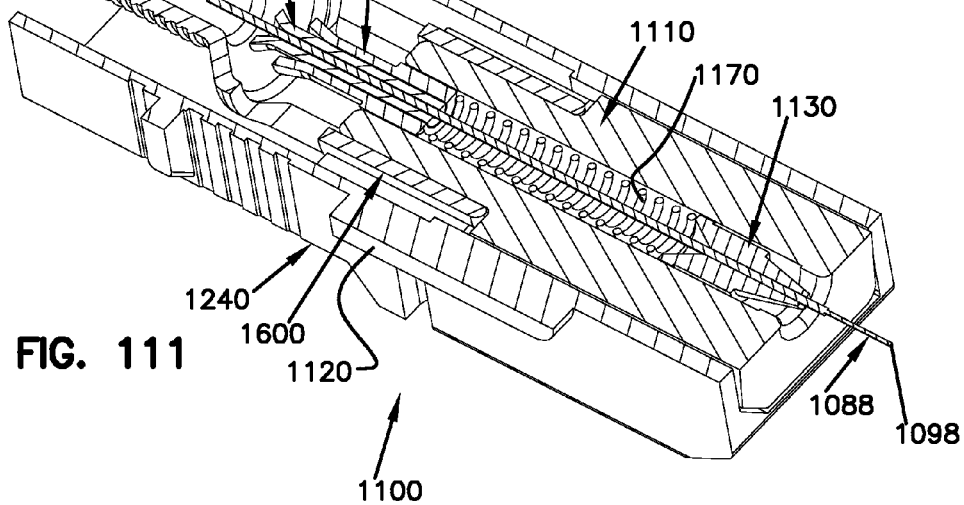
FIG. 111 is the perspective view of FIG. 110 but with the fiber optic connector cross-sectioned.

The housing half-piece 340 includes an exterior 366. The housing half-piece 340 also includes an interior 368. A first cut 370, a second cut 372, a third cut 374, and a fourth cut 376, extend between the exterior 366 and the interior 368. The first latch 356 is formed, in part, by the first cut 370 and the second cut 372, and the second latch 358 is formed, in part, by the third cut 374 and the fourth cut 376. A first flexure 378 and a second flexure 380 are formed, in part, by the first cut 370 and the second cut 372. Likewise, a third flexure 382 and a fourth flexure 384 are formed by the third cut 374 and the fourth cut 376. The flexures 378, 380, 382, and 384 are resilient flexures. The flexures 378, 380 allow the first latch 356 to move (e.g., rotate) relative to the remaining portions of the housing half-piece 340. Likewise, the flexures 382, 384 allow the second latch 358 to move (e.g., rotate) relative to the remaining portions of the housing half-piece 340. The flexures 378, 380 bias the first latch 356 toward a latching configuration (illustrated at FIG. 3). The flexures 382, 384 bias the second latch 358 toward a latching configuration (also illustrated at FIG. 3). As illustrated at FIG. 35, the first latch 356 includes a first ramp 386, a first catch 388, and a first relief 390. Likewise, the second latch 358 includes a second ramp 392, a second catch 394, and a second relief 396.

As illustrated at FIGS. 3 and 5, the ramps 386, 392 are adapted to allow the fiber optic connectors 100 and/or 102 to individually rotate both the first latch 356 and the second latch 358 when the fiber optic connector 100 or 102 is inserted into the ports 312 or 314 of the fiber optic adapter 300. When the fiber optic connector 100 or 102 is fully inserted into the fiber optic adapter 300, the latches 356, 358 rotate to the latching configuration, urged by the flexures 378, 380, 382, 384. When the latches 356, 358 are in the latching configuration, the first catch 388 and/or the second catch 394 prevent the removal of the connectors 100 and/or 102 from the fiber optic adapter 300.

When it is desired to remove the fiber optic connectors 100 and/or 102 from the fiber optic adapter 300, the release surfaces 398, 400 are pressed inwardly toward each other, as illustrated at FIGS. 2 and 5, thereby rotating the latches 356, 358 about the flexures 378, 380, 382, 384. The latches 356, 358 are thereby moved to a releasing configuration as illustrated at FIGS. 2 and 5. Upon the latches 356, 358 reaching the releasing configuration, the catches 388, 394 no longer retain the fiber optic connector 100 or 102. The fiber optic connector 100 or 102 may thereafter be pulled out of the fiber optic adapter 300. The relieves 390, 396 allow the latches 356, 358 to rotate to the releasing configuration without interfering with the fiber optic connector 100 or 102.

As previously mentioned, the fiber optic adapter 300 includes the keying feature 332 and the keying feature 334. The housing half-piece 340 includes an exterior keying feature 402. As the first housing half-piece 340 and the second housing half-piece 342 are the same housing half-piece 340, the second housing half-piece 342 also includes the exterior keying feature 402. When the half-pieces 340, 342 are assembled to form the housing 310, the exterior keying feature 402 of the first housing half-piece 340 forms the keying feature 334. Likewise, the keying feature 402 of the second housing half-piece 342 forms the keying feature 332 (see FIG. 32). As the first housing half-piece 340 and the second housing half-piece 342 have orientations that are rotated from each other by 180 degrees about the axis A1 (see FIG. 34), the exterior keying features 402, formed in the half-pieces 340, 342 provide a unique orientation of the keying features 332 and 334 of the fiber optic adapter 300.

As illustrated at FIGS. 48-58, the housing half-piece 340 includes two regions, a keyed half 412 and an unkeyed half 414 (see FIG. 49). The unkeyed half 414 is adjacent to and extends from the first end 344 of the housing half-piece 340. The keyed half 412 is adjacent to and extends from the second end 346 of the housing half-piece 340. The exterior keying feature 402 is included on the keyed half 412. In addition, a first interior keying feature 404 (see FIGS. 49 and 51), a second interior keying feature 406 (see FIG. 52), a third interior keying feature 408 (see FIGS. 53 and 54), and a fourth interior keying feature 410 (see FIG. 55) are included on the keyed half 412. The keyed half 412 of the housing half-piece 340 corresponds with the indexing feature 120 of the housing 110 of the fiber optic connectors 100 and 102 when the fiber optic connectors 100 and/or 102 are installed into the fiber optic adapter 300 (e.g., the indexing feature 120 is adjacent the interior keying features 404, 406, and/or 408). Conversely, the unkeyed half 414 is positioned opposite the indexing feature 120 of the housing 110 of the fiber optic connectors 100 and/or 102.

As the first housing half-piece 340 and the second housing half-piece 342 have orientations that are rotated from each other by 180 degrees about the axis A1 (see FIG. 34) about the fiber optic adapter 300, the interior keying features 404, 406, 408, 410 and the exterior keying feature 402 of the first housing half-piece 340 are rotated by 180 degrees about the axis A1 from their counterpart keying features 402, 404, 406, 408, 410 of the second housing half-piece 342. The arrangement of the interior keying features 404, 406, 408 of the half-pieces 340, 342 of the fiber optic adapter 300 thereby ensures that the fiber optic connectors 100 and 102 have orientations that are also rotated from each other by 180 degrees about the axis A1 about the fiber optic adapter 300 when the fiber optic connectors 100 and 102 are both fully connected to the fiber optic adapter 300.

The housing half-piece 340 includes a first receiving channel 416 (see FIG. 51) and a second receiving channel 426 (see FIG. 58). The first receiving channel 416 is on the keyed half 412 of the housing half-piece 340 and includes the keying features 404, 406, and 408. In the depicted embodiment, the second receiving channel 426 is on the unkeyed half 414 and does not include keying features. The first receiving channel 416 includes an entrance portion 418, a latch portion 420, a central connector portion 422, and a central sleeve portion 424. Likewise, the second receiving channel 426 includes an entrance portion 428, a latch portion 430, a central connector portion 432, and a central sleeve portion 434. A half-pocket 436 is positioned between the first receiving channel 416 and the second receiving channel 426. The half-pocket 436 is partly on the keyed half 412 and partly on the unkeyed half 414. In the depicted embodiment, a first half of the half-pocket 436 is on the unkeyed half 414, and a second half of the half-pocket 436 is on the keyed half 412. Therefore, the half-pocket 436 includes a keyed half 438 and an unkeyed half 440. The keyed half 438 of the half-pocket 436 includes the fourth interior keying feature 410.

Turning now to FIGS. 33-47, the alignment sleeve assembly 450 will be described in further detail. The alignment sleeve assembly 450 extends from a first end 452 to a second end 454. A flange 456 is positioned between the first end 452 and the second end 454. The alignment sleeve assembly 450 includes an exterior 458. The exterior 458 includes a first keying surface 460, a second keying surface 462, a third keying surface 464, and a fourth keying surface 468. As depicted, the second keying surface 462 and the third keying surface 464 are positioned on the flange 456. The alignment sleeve assembly 450 includes a first entrance 470 positioned at the first end 452, and a second entrance 472, positioned at the second end 454.

The alignment sleeve assembly 450 includes a first sleeve 480, a second sleeve 482, and a fiber alignment assembly 510 (see FIGS. 36-41). The first sleeve 480 is positioned adjacent the first end 452, and the second sleeve 482 is positioned adjacent the second end 454. As depicted, the first sleeve 480 and the second sleeve 482 are identical sleeves 480. In other embodiments, the first sleeve 480 may be different from the second sleeve 482. The sleeve 480 includes an outer end 484 opposite from an inner end 486. The sleeve 480 includes a first keying feature 488 and a second keying feature 490. The first keying feature 488 forms the first keying surface 460 and the fourth keying surface 468 of the alignment sleeve assembly 450. The second keying feature 490 forms the second keying surface 462 and the third keying surface 464 of the alignment sleeve assembly 450. The sleeve 480 includes an exterior 492. The first keying feature 488 and the second keying feature 490 are included on the exterior 492. The sleeve 480 includes a tubular portion 494, and a flange portion 496. In the depicted embodiment, the tubular portion 494 is positioned adjacent the outer end 484, and the flange portion 496 is positioned adjacent the inner end 486.

When the first sleeve 480 and the second sleeve 482 are assembled to form the alignment sleeve assembly 450, the inner ends 486 of the first sleeve 480 and the second sleeve 482 abut and seal against each other. The flange portion 496 of the first sleeve 480 and the second sleeve 482 thereby form the flange 456 of the alignment sleeve assembly 450. The first sleeve 480 and the second sleeve 482 have orientations that are rotated from each other by 180 degrees about the axis A1 (see FIG. 34) when assembled to form the alignment sleeve assembly 450. The sleeve 480 includes an interior 498. The interior 498 includes a pocket portion 500 and a funnel portion 502. A passage 504 extends between the outer end 484 and the inner end 486 of the sleeve 480 and through the pocket portion 500 and the funnel portion 502. The pocket portion 500 includes a pocket bottom 506. The fiber alignment assembly 510, when assembled into the alignment sleeve assembly 450, is positioned within the pocket portions 500 of the first sleeve 480 and the second sleeve 482 and is captured between the pocket bottoms 506 of the first sleeve 480 and the second sleeve 482. The fiber alignment assembly 510, when assembled into the alignment sleeve assembly 450, may seal against the pocket portions 500 of the first sleeve 480 and the second sleeve 482 and/or may seal against the pocket bottoms 506 of the first sleeve 480 and the second sleeve 482.

The first keying feature 488 of the first sleeve 480 forms the first keying surface 460 of the alignment sleeve assembly 450. The second keying feature 490 of the first sleeve 480 forms the second keying surface 462 of the alignment sleeve assembly 450. The second keying feature 490 of the second sleeve 482 forms the third keying surface 464 of the alignment sleeve assembly 450. And, the first keying feature 488 of the second sleeve 482 forms the fourth keying surface 468 of the alignment sleeve assembly 450. When the alignment sleeve assembly 450 is assembled into the fiber optic adapter 300, the first keying surface 460 is adjacent the third interior keying feature 408 of the second housing half-piece 342, the fourth keying surface 468 is adjacent the third interior keying feature 408 of the first housing half-piece 340, the second keying surface 462 is adjacent the fourth interior keying feature 410 of the second housing half-piece 342, and the third keying surface 464 is adjacent the fourth interior keying feature 410 of the first housing half-piece 340.

In the depicted embodiment, the alignment sleeve assembly 450 has the same form, fit, and function when it is rotated about the axis A1 by 180 degrees. Therefore, the first and the fourth keying surfaces 460, 468 may be swapped when installing the alignment sleeve assembly 450 in the fiber optic adapter 300. When the first and the fourth keying surfaces 460, 468 are swapped, the second and the third keying surfaces 462, 464 are also swapped. In other embodiments, the keying surfaces 460, 468 and 462, 464 cannot be swapped, and the alignment sleeve assembly 450 assembles into the fiber optic adapter 300 in a unique orientation.

The tubular portions 494 of the first sleeve 480 and the second sleeve 482 fit within and between the central sleeve portions 424, 434 of the housing half-pieces 340, 342 when the alignment sleeve assembly 450 is assembled in the fiber optic adapter 300. Likewise, the flange portions 496 of the first sleeve 480 and the second sleeve 482 fit within the half pockets 436 of the housing half-pieces 340, 342. The alignment sleeve assembly 450 is thereby retained within the fiber optic adapter 300. In the depicted embodiment, the central sleeve portions 424 and 434 have an interior cross-sectional shape similar to an interior cross-sectional shape of the central connector portions 422 and 432, respectively. In the depicted embodiment, the tubular portion 494 has an exterior cross-sectional shape similar to an exterior cross-sectional shape of the housing 110 of the fiber optic connector 100. A portion of the housing 110, that includes the distal end portion 112, fits within and between the central connector portions 422, 432 when the fiber optic connector 100 is installed into the fiber optic adapter 300. The fit of the portion of the housing 110 between the central connector portions 422 and 432 is similar to or the same as the fit of the tubular portion 494 between the central sleeve portions 424 and 434. In the depicted embodiment, the central connector portions 422 and 432 are continuous with the central sleeve portions 424 and 434, respectively.

As illustrated at FIGS. 38, 39, and 41, the fiber alignment assembly 510 extends between a first end 512 and a second end 514. The fiber alignment assembly 510 includes a passage 516 (see FIG. 40) that extends between the first end 512 and the second end 514. The fiber alignment assembly 510 includes a first V-block 520, a second V-block 522, a first gel block 540, and a second gel block 542. In the depicted embodiment, the first V-block 520 and the second V-block 522 are identical V-blocks 520. In other embodiments, the V-blocks 520, 522 may be different from each other. In the depicted embodiment, the first gel block 540 and the second gel block 542 are identical gel blocks 540. In other embodiments, the gel blocks 540, 542 may be different from each other. The first V-block 520 and the second V-block 522 have orientations that are rotated from each other by 180 degrees about the axis A1 (see FIG. 34) when assembled to form the fiber alignment assembly 510. Likewise, the first gel block 540 and the second gel block 542 have orientations that are rotated from each other by 180 degrees about the axis A1 (see FIG. 34) when assembled to form the fiber alignment assembly 510. The fiber alignment assembly 510 therefore has the same form, fit, and function when it is rotated about the axis A1 by 180 degrees. The fiber alignment assembly 510 therefore may be assembled into the alignment sleeve assembly 450 as shown or rotated about the axis A1 by 180 degrees from the orientation shown.

Turning now to FIGS. 63-65, the V-block 520 extends between a first end 524 and a second end 526. The V-block 520 includes a first V-groove 528 and a second V-groove 530 that each extends between the first end 524 and the second end 526. As depicted, the first V-groove 528 and the second V-groove 530 are positioned on opposite sides of the V-block 520. The V-grooves 528, 530 each include an entrance transition 532 at each end of the V-grooves 528, 530. The V-block 520 includes an insertion transition 534 at each of the ends 524, 526. A groove radius 536 is included at a bottom of the first V-groove 528 and also is included at a bottom of the second V-groove 530.

The gel block 540 extends between a first end 544 and a second end 546. The gel block 540 includes a ridge 548 that extends between the first end 544 and the second end 546. The ridge 548 includes a ridge radius 550. As illustrated at FIG. 41, the ridge 548 generally fills the V-groove 528 or the V-groove 530 in the fiber alignment assembly 510. The ridge 548 may seal against the V-groove 528 or the V-groove 530 in the fiber alignment assembly 510. The gel block 540 may seal against the V-blocks 520 wherever they contact each other.

The gel block 540 may be made of a thixotropic material. Example materials included in the gel block 540 may be silicones, urethanes, and/or Kratons (e.g., Krayton® D, Kraton® D (SBS) with styrene and butadiene, Kraton® D (SIS) with styrene and isoprene, Kraton® FG, Kraton® FG with maleic anhydride grafted onto the rubber midblock, Krayton® G, Kraton® G (SEBS, SEPS) with styrene-ethylene/butylene-styrene and/or styrene-ethylene/propylene-styrene, Kraton® IR isoprene rubbers, Kraton® IR Latex polyisoprene latex, Kraton® styrenic block copolymers (SBC), Kraton® triblock polymer, and/or oil gels based on Kraton® polymers). Kratons are marketed by Kraton Polymers U.S. LLC of Houston, Tex. USA. Other example materials included in the gel block 540 may be diblock polymer, polyisoprene, rubbery gels, thermoplastic gels, thermoset gels, thixotropic gels, and/or thixotropic grease. The gel block 540 may be formulated to be tacky, semi-tacky, or non-tacky. The gel block 540 is made of easily deformable material. Other example materials included in the gel block 540 may include siloxanes and/or organosilicon compounds. The gel block 540 may include, but is not limited to including, any of the materials mentioned in this paragraph.

As depicted at FIG. 41, the ridge 548 of each of the gel blocks 540 and 542 blocks and seals the passage 516 of the fiber alignment assembly 510. However, the easily deformable material (e.g., the thixotropic material) of the gel block 540, 542 may be pushed aside and/or penetrated by the optical fiber 88 as the optical fiber 88 is slid through the passage 516. The passage 516 may remain sealed by the gel blocks 540, 542 after the optical fiber 88 is fully and/or partially slid through the passage 516. The gel blocks 540, 542 may seal against the optical fiber 88 wherever they contact each other. The optical fiber 88 need not penetrate the gel blocks 540, 542 as the optical fiber 88 may slide between the gel blocks 540, 542 and the V-blocks 520, 522. The insertion of the end 98 of the optical fiber 88 through the passage 516 is further described below.

As illustrated at FIGS. 38-41, and 63, the first gel block 540 coextends with the first V-block 520 over a portion of the first V-block 520 and thereby forms a first gel-backed portion 560 of the passage 516. Likewise, the second gel block 542 coextends with the second V-block 522 over a portion of the second V-block 522 and thereby forms a second gel-backed portion 562 of the passage 516. The second end 546 of the first gel block 540 abuts and seals against the second end 526 of the second V-block 522. Likewise, the second end 546 of the second gel block 542 abuts and seals against the second end 526 of the first V-block 520. The first end 524 of the first V-block 520 and the first end 544 of the first gel block 540 are positioned at or near the first end 512 of the fiber alignment assembly 510. The first end 524 of the second V-block 522 and the first end 544 of the second gel block 542 are positioned at or near the second end 514 of the fiber alignment assembly 510.

At an intermediate portion 518 of the fiber alignment assembly 510, the first V-block 520 overlaps with the second V-block 522 and thereby forms an intermediate portion 564 of the passage 516. The intermediate portion 564 of the passage 516 may be sealed by the gel blocks 540, 542 with and/or without one and/or both of the optical fibers 88 present in the passage 516. In the depicted embodiment, the first end 524 and the second end 526 of the V-blocks 520, 522 can be swapped (i.e., interchanged). In the depicted embodiment, the first end 544 and the second end 546 of the gel blocks 540, 542 can be swapped (i.e., interchanged).

At the intermediate portion 564, the passage 516 is formed between the first V-grooves 528 of the V-blocks 520 and 522 (see FIG. 40). At the first gel-backed portion 560 of the passage 516, the passage 516 is formed between the first V-groove 528 of the V-block 520 and the first gel block 540. In the depicted embodiment, the first gel-backed portion 560 is formed between the first V-groove 528 of the V-block 520 and the ridge 548 of the first gel block 540. At the second gel-backed portion 562 of the passage 516, the passage 516 is formed between the first V-groove 528 of the V-block 522 and the second gel block 542. In the depicted embodiment, the second gel-backed portion 562 is formed between the first V-groove 528 of the V-block 522 and the ridge 548 of the second gel block 542. In the depicted embodiment, the first V-groove 528 of the V-block 520 and/or 522 can be swapped with (i.e., interchanged with) the second V-groove 530 of the V-block 520 and/or 522.

An example will now be given on how to connect the first fiber optic cable 82, 82' to the second fiber optic cable 92, 92' using the fiber optic connection system 80. The steps given do not necessarily need to be performed in sequence. A first step may include preassembling the fiber optic connectors 100 and 102, as shown at FIGS. 20, 21, and 24-31. The preassembly may be accomplished at a factory, and/or the preassembly may be done at a field location (e.g., a jobsite). A second step may include preassembling the fiber optic adapter 300, as shown at FIGS. 32-41. The preassembly of the fiber optic adapter 300 may be done at a factory or may be done in the field. A third step may include connectorizing the first fiber optic cable 82, 82' and/or the second fiber optic cable 92, 92' with the fiber optic connectors 100 and/or 102, respectively. As depicted, the fiber optic cable 82 is the same as and/or similar to the fiber optic cables 82', 92, and 92', and the fiber optic connectors 100 and 102 are the same. The connectorization process will therefore sometimes only be described in regards to the fiber optic cable 82 and the fiber optic connector 100. The connectorizing of the fiber optic cables 82, 82' and 92, 92' may be done at a factory and/or may be done in the field. A fourth step may include individually inserting the fiber optic connector 100 and the fiber optic connector 102 into the ports 312 or 314 of the fiber optic adapter 300, respectively. The insertions may be done at a factory and/or may be done in the field.

Turning now to FIGS. 7-31, 88, and 89, the connectorizing of the fiber optic cable 82 with the fiber optic connector 100 will be described in detail. The first end portion 84 of the fiber optic cable 82 may be pre-stripped in certain embodiments. In particular, as depicted at FIG. 88, the coating 90 may be stripped from the end portion 84, as discussed above. Upon the first end portion 84 being stripped or being left unstripped, the end 98 of the optical fiber 88 is inserted into the fiber optic connector 100. In particular, the end 98 is inserted into the stress relief portion 222 of the sleeve 210. In embodiments using the fiber optic cable 82', the end 98 of the optical fiber 88 is inserted into the stress relief portion 192 of the plug 180 and the sleeve 210 may be discarded. As the depicted stress relief portion 222 includes a conical shape and/or a tapering shape, the stress relief portion 222 guides the end 98 of the optical fiber 88. Likewise, in embodiments using the fiber optic cable 82', the depicted stress relief portion 192 includes a conical shape and/or a tapering shape that may guide the end 98 of the optical fiber 88.

The end 98 is further inserted through the sleeve 210 and/or into the center of the helical coil 176 of the spring 170. The end 98 of the optical fiber 88 is further inserted into the sheath 130. In particular, the end 98 is inserted into the funnel 138. As the funnel 138 is conically shaped and/or taper shaped, the funnel 138 guides the end 98 into the passage 136 of the sheath 130. The end 98 is further inserted to the distal end portion 132 of the sheath 130. The end 98 may protrude slightly past the distal end portion 132 of the sheath 130 (e.g., to provide the polishing allowance) with the sheath 130 in the extended configuration 162. The fiber optic connector 100, with the fiber optic cable 82, 82' inserted, is then inserted into a crimping tool.

An example crimping tool 700 is illustrated at FIGS. 70-77. The crimping tool 700 includes a first lever 702 and a second lever 704. As depicted, the first lever 702 and the second lever 704 are rotatably connected to each other via a pin 706. FIGS. 70-73 show the crimping tool 700 in an open configuration 708. FIGS. 74 and 75 show the crimping tool 700 in a closed configuration 710. The first lever 702 includes a first crimp anvil 712, and the second lever 704 includes a second crimp anvil 714. The first and the second crimp anvils 712 and 714 are located at or adjacent a first side 716 of the crimping tool 700. The first lever 702 includes a first pocket 722, and the second lever 704 includes a second pocket 724. Chamfers 726 may be included around the first pocket 722 and/or the second pocket 724. The housing 110 of the fiber optic connector 100 may be placed within the first pocket 722 when the crimping tool 700 is in the open configuration 708. The pockets 722 and/or 724 locate the housing 110 along a longitudinal axis A2 of the fiber optic connector 100 (see FIG. 29).

Upon closing the crimping tool 700 to the closed configuration 710, the housing 110 is captured and located in and between the first and the second pockets 722, 724. The chamfers 726 allow the housing 110 to be installed more easily and/or act as a guide when the housing 110 is installed. The chamfers 726 may also accommodate slight misalignments between the first and the second pockets 722, 724. The first pocket 722 includes and extends between a first end 732 and a second end 742. Likewise, the second pocket 724 includes and extends between a first end 734 and a second end 744 (see FIGS. 76 and 77). As depicted, the housing 110 may be located by one or both of the first ends 732, 734 and/or one or both of the second ends 742, 744. In particular, the proximal end portion 114 of the housing 110 may abut the first ends 732, 734 and/or the distal end portion 112 of the housing 110 may abut the second ends 742, 744. The crimp tool 700 thereby provides a locating feature to accurately locate the housing 110 of the fiber optic connector 100. The first lever 702 includes a first channel 752, and the second lever 704 includes a second channel 754. The first and the second channels 752, 754 accommodate the sheath 130 when the fiber optic connector 100 is placed within the crimping tool 700. FIGS. 70 and 71 show the crimping tool 700 without the fiber optic connector 100 installed. FIGS. 72 and 73 show the crimping tool 700 with the fiber optic connector 100 installed.

Upon the fiber optic connector 100 being installed into the first pocket 722, the fiber optic cable 82, 82' is slid toward the distal end portion 104 of the fiber optic connector 100 (i.e., in a distal direction), if necessary. The sliding of the fiber optic cable 82, 82' continues until the end 98 of the optical fiber 88 abuts a stop 756 of the crimping tool 700 (see FIG. 76). As depicted, the stop 756 is located adjacent a second side 718 of the crimping tool 700. In certain embodiments, the stop 756 locates the end 98 of the optical fiber 88 about the distance D3 beyond the distal end portion 112 of the housing 110 (see FIG. 10). As mentioned above, the polishing allowance may be added to the distance D3, and the stop 756 correspondingly locates the end 98 of the optical fiber 88 a distance equal to about the distance D3 plus the polishing allowance beyond the distal end portion 112 of the housing 110. Upon the fiber optic connector 100 being positioned and the fiber optic cable 82, 82' being longitudinally located by the stop 756, the crimping tool 700 is moved to the closed position 710.

By closing the crimping tool 700, the crimp anvils 712 and 714 crimp the crimping portion 200 of the plug 180. By crimping the crimping portion 200 of the plug 180, the optical fiber 88 is longitudinally fixed with respect to the housing 110. Upon crimping the fiber optic connector 100 to the fiber optic cable 82, 82', the crimping tool 700 may be returned to the open configuration 708. The fiber optic connector 100 may thereafter be removed from the crimping tool 700.

Upon the fiber optic cable 82, 82' being crimped to the fiber optic connector 100, the fiber optic connector 100 may be placed (e.g., inserted) into a polishing tool. An example polishing tool 800 is illustrated at FIGS. 78-87. The polishing tool 800 both polishes the end 98 of the optical fiber 88 and accurately positions the polished end 98' with respect to the housing 110 of the fiber optic connector 100. The polishing tool 800 includes a base 802. As depicted, the base 802 includes a protrusion 804 and a paper platform 806. The protrusion 804 of the base 802 may be used to hold onto the base 802, or may be used to place the base 802 on another surface (e.g., a table, a bench, etc.). The paper platform 806 of the base 802 is adapted to hold polishing paper 810. The polishing paper 810 has an abrasive side 812 and an attachment side 814 (see FIG. 79). The attachment side 814 may include pressure sensitive adhesive. The pressure sensitive adhesive may bond the polishing paper 810 to the paper platform 806 of the base 802. The polishing paper 810 may be replaceable.

The polishing tool 800 also includes a holder 820. The holder 820 includes a base 822. The base 822 interfaces with the abrasive side 812 of the polishing paper 810. The holder 820 also includes a protrusion 824. The protrusion 824 may be used to hold the holder 820. The holder 820 holds the fiber optic connector 100. In particular, the holder 820 includes a connector holder 830. The connector holder 830 includes a pocket 842 that extends between a first end 844 and a second 846. The proximal end portion 114 of the housing 110 abuts the second end 846 of the pocket 842, and/or the distal end portion 112 of the housing 110 abuts the first end 844 of the pocket 842. The housing 110 is thereby accurately located with respect to the holder 820 by a locating feature of the holder 820. As the fiber optic cable 82, 82' is crimped and joined to the housing 110 by the plug 180, the optical fiber 88 is also accurately located with respect to the holder 820.

Upon the insertion of the fiber optic connector 100 into the polishing tool 800 (e.g., the holder 820), the tapered seat 146 of the radial compression feature 140 of the sheath 130 activates the radial compression feature 140. In particular, as depicted, the tapered seat 146 presses into a tapered seat 834 of the holder 820. Upon the tapered seat 146 being activated by the tapered seat 834, the end 98 of the optical fiber 88 is firmly supported by the sheath 130 via the radial compression feature 140 which, in turn, is firmly supported by the holder 820. A bore 838 and a channel 840 of the holder 820 are adapted to hold the remaining portions of the sheath 130 (see FIG. 81). A shoulder 836 is included between the tapered seat 834 and the bore 838 of the holder 820.

To allow easy installation of the fiber optic connector 100 into the holder 820, a cut-out 826 is formed through a portion of the protrusion 824 and a portion of the base 822. The cut-out 826 reduces the pocket 842 to about half of the size of the housing 110. The fiber optic cable 82, 82' may extend through a cable passage 848 of the holder 820 when the fiber optic connector 100 is positioned within the holder 820.

The holder 820 defines a polishing plane 860 at a bottom 852 of the base 822. As illustrated at FIG. 83, when the fiber optic connector 100 is first loaded into the holder 820, a portion of the distal end portion 132 of the sheath 130 protrudes past the polishing plane 860. In addition, a portion of the optical fiber 88, including the end 98, extends past the polishing plane 860. Upon loading the fiber optic connector 100 into the holder 820, the bottom 852 of the holder 820 is positioned against the polishing paper 810 on the base 802 such that the abrasive side 812 of the polishing paper 810 is adjacent the bottom 852 of the base 822. A polishing motion, such as a FIG. 8 motion may be used to polish the end 98 of the optical fiber 88 to the polished end 98'. As illustrated at FIG. 84, the end 98 of the optical fiber 88 has been reduced to the polished end 98' and also a portion of the distal end portion 132 of the sheath 130 has been removed by the polishing paper 810.

Torque that is generated on the distal end portion 132 of the sheath 130 and/or the end 98 of the optical fiber 88 by the polishing motion may be reacted through and/or transferred to the tapered seat 146 and further transferred to the tapered seat 834. The torque therefore does not affect the orientation of the polished end 98' as the torque is reacted by a torque holding device (e.g., the pair of the tapered seats 146, 834).

As the polishing and repeated polishings occur, the bottom 852 of the base 822 will experience wear from the polishing paper 810. Any wear of the bottom 852 will affect the locational accuracy of the position of the polished end 98' relative to the housing 110. A relief pocket 828 and/or a relief groove 850 at the bottom 852 can serve as wear indicators. For example, a surface texture may be applied to the relief pocket 828 and/or the relief groove 850. Upon the surface texture changing from direct exposure to the polishing paper 810, the wear limit has been reached, and the holder 820 is due for replacement and/or overhaul.

The holder 820 holds the fiber optic connector 100 at the angle α with respect to the polishing plane 860. Upon the polishing being completed, the angle α is imparted to the polished end 98' of the optical fiber 88. Upon the polishing being completed, the fiber optic connector 100 and the attached fiber optic cable 82, 82' may be removed from the holder 820. The fiber optic connector 100 and the fiber optic connector 102, upon being similarly polished and prepared, are ready for connection to the fiber optic adapter 300, and thereby connection to each other.

Turning again to FIGS. 1-8, the insertion and connection of the fiber optic connectors 100 and 102 into the fiber optic adapter 300 will be described in detail. The fiber optic connector 100 and the fiber optic connector 102 may now be individually inserted into the fiber optic adapter 300. In particular, the distal end portion 104 of the fiber optic connector 100 may be inserted into the first port 312 or the second port 314 of the fiber optic adapter 300. Also, the fiber optic connector 102 may be inserted into the remaining port 312, 314 of the fiber optic adapter 300. Prior to the insertion of the fiber optic connectors 100, 102, the fiber optic connectors 100, 102 should be oriented properly about their longitudinal axes A2 (see FIG. 29). The fiber optic connectors 100, 102 are properly oriented upon the indexing feature 120 of the housing 110 being positioned adjacent the exterior keying feature 402 of the housing half pieces 340, 342. In the depicted embodiment, the indexing feature 120 of the housing 110 is oriented adjacent the keying features 332, 334 nearest the port 312, 314 that the fiber optic connector 100, 102 is being inserted into (see FIG. 2).

The fiber optic connectors 100, 102 individually move the corresponding latches 322, 324 of the fiber optic adapter 300 as the fiber optic connectors 100, 102 are inserted into the ports 312, 314 (see FIG. 5). The fiber optic connectors 100, 102 are then further inserted until the shoulder 154 of the sheath 130 abuts the corresponding end 452, 454 of the alignment sleeve assembly 450 that is positioned within the fiber optic adapter 300 (see FIG. 5). The fiber optic connectors 100, 102 are then further inserted into the fiber optic adapter 300. In certain embodiments, the fiber optic connector 100 is further inserted into the fiber optic adapter 300 by the distance D1 (see FIG. 10). In certain embodiments, the fiber optic connector 102 is further inserted into the fiber optic adapter 300 by the distance D1. In particular, the housing 110 and the optical fiber 88 are further inserted into the fiber optic adapter 300. However, the sheath 130 is stopped by a corresponding one of the ends 452 or 454 of the alignment sleeve assembly 450 and advances no further. Instead, the sheath 130 is moved to the retracted configuration 164, thereby compressing the spring 170.

Upon the fiber optic connectors 100, 102 being fully inserted into the fiber optic adapter 300, the corresponding latches 322, 324 retain the fiber optic connectors 100, 102 by latching to the housing 110. In the depicted embodiment, the latches 322, 324 latch onto the proximal end portion 114 of the housing 110, as shown at FIG. 3.

As the fiber optic connectors 100, 102 are fully inserted, the optical fibers 88 extend into the alignment sleeve assembly 450. In certain embodiments, the optical fibers 88 each individually extend into the alignment sleeve assembly 450 by a distance equal to or about equal to the distance D1 (see FIG. 10). In particular, the polished ends 98' of the optical fiber 88 are received by the entrances 470 or 472. In particular, the polished end 98' is received by the funnel portion 502. FIGS. 42-47 illustrate in detail the alignment of the funnel portion 502 with respect to the passage 516 of the fiber alignment assembly 510. The funnel portion 502 guides the polished end 98' into the passage 516 and the entrance transition 532 of the V-block 520 or 522. As the polished end 98' slides into the passage 516, the polished end 98' is wiped and cleaned of any contaminants by the gel block 540. As the end portion 84 slides into the passage 516, the end portion 84 may be wiped and cleaned of any contaminants by the gel block 540.

As the polished end 98' extends through the passage 516, adjacent the gel blocks 540 or 542 (i.e., the gel-backed portions 560 or 562), the gel block 540 or 542 deforms out of the way thereby opening the passage 516 to the optical fiber 88. In addition, the gel block 540 or 542 cleans the polished end 98' of the optical fiber 88. Contaminants that may have been present on the polished end 98' or other portions of the optical fiber 88 are wiped away by the gel block 540 or 542. The angle α angles the polished end 98' of the optical fiber 88 toward the gel block 540 or 542. The cleaning action of the gel block 540 or 542 may be enhanced by the angle α and/or its orientation with respect to the gel block 540. The angle α at the polished end 98' prevents a stagnation region from forming at the polished end 98'. If any of the contaminants were located in such a stagnation region, flow of gel of the gel block 540 or 542 may have difficulty removing the contaminants from the stagnation region. In contrast, the flow of the gel of the gel block 540 or 542 carries any contamination away from the angled polished end 98'.

Further insertion of the polished end 98' into the fiber alignment assembly 510 results in the polished end 98' entering the intermediate portion 564 of the passage 516 (i.e., the portion between the first V-block 520 and the second V-block 522). In the intermediate portion 564 of the passage 516, the V-groove 528 of the V-block 520 and the V-groove 528 of the V-block 522 retain the optical fiber 88 in a radial direction and thereby locate the optical fiber 88. In the depicted embodiment, a slight clearance exists (e.g., about 1 μm) between the intermediate portion 564 of the passage 516 and the optical fiber 88.

Upon each of the fiber optic connectors 100, 102 being fully inserted, the polished ends 98' meet near or at a center of the fiber alignment assembly 510 (as shown at FIG. 4). The angles α formed into the polished ends 98' match each other, and the angled polished ends 98' thereby abut each other upon each of the fiber optic connectors 100, 102 being fully inserted into the fiber optic adapter 300.

The optical fiber 88 and/or the fiber optic cable 82, 82' may buckle or slightly buckle between the polished end 98' and the compression portion 190 of the plug 180 to accommodate slight variations in length (e.g., manufacturing tolerances, polishing tolerances, thermal expansion, etc.). FIG. 10 illustrates a buckled optical fiber 88*b* and a buckled fiber optic cable 82*b* overlaying the optical fiber 88 and the fiber optic cable 82, when not buckled.

Upon release of the fiber optic connectors 100, 102 from the fiber optic adapter 300, the spring 170 of the fiber optic connectors 100, 102 may assist in ejecting the fiber optic connectors 100, 102 from the fiber optic adapter 300.

As described above, the fiber optic adapter 300 and the fiber optic connectors 100, 102 assemble to each other in pre-determined orientations. In particular, as illustrated at FIGS. 3 and 4, the polished ends 98' abut each other with the angles α formed into the polished ends 98' matching each other when both of the fiber optic connectors 100, 102 are fully assembled into the fiber optic adapter 300. To ensure the pre-determined orientations and to prohibit other orientations, the fiber optic adapter 300 includes the interior keying features 404, 406, 408 (see FIGS. 49 and 51-54) that interface with the indexing feature 120 of the fiber optic connectors 100, 102 (see FIGS. 7 and 8). A first set of the interior keying features 404, 406, 408 and the indexing feature 120 controls the orientation of the fiber optic connector 100, and a second set of the interior keying features 404, 406, 408 and the indexing feature 120 controls the orientation of the fiber optic connector 102. Thus, the fiber optic connectors 100, 102 can only be assembled to the fiber optic adapter 300 in the proper pre-determined orientations. Improper assembly orientations may interfere with the proper functioning of the fiber optic connection system 80. In particular, the polished ends 98' may not abut each other properly and/or the wiping/cleaning action of the gel blocks 540, 542 on the optical fibers 88 may not function properly. In either case, the optical signal connection of the fiber optic connection system 80 may be compromised or broken. By including features that prohibit improper assembly at the fiber optic connector 100, 102/fiber optic adapter 300 assembly level, the fiber optic connection system 80 is made fool-resistant, more fool-proof, and/or poka-yoke and may prevent errors during the connector/adapter assembly process. The connector/adapter assembly process is often accomplished by users of the fiber optic connection system 80 (e.g., technicians at a telephone company).

As described above, the fiber optic adapter 300 also includes features that prohibit improper assembly of the fiber optic adapter 300. In particular, assembly features of the fiber optic adapter 300 only allow the fiber optic adapter 300 to be assembled in a predetermined configuration/orientation. For example, fastening features (i.e., the pins 352 and the pin holes 354) are arranged such that the first housing half-piece 340 and the second housing half-piece 342 may only be assembled together in a proper predetermined orientation. As another example, the interior keying features 408, 410 and the keying surfaces 460, 462, 464, 468 allow the alignment sleeve assembly 450 to be assembled within the fiber optic adapter 300 in only a proper predetermined orientation. Thus, by including features that prohibit improper assembly at the fiber optic adapter 300 assembly level, the fiber optic connection system 80 is made fool-resistant, more fool-proof, and/or poka-yoke and may prevent errors during the fiber optic adapter 300 assembly process. The fiber optic adapter 300 assembly process may be accomplished at the factory or may be accomplished by an installer of the fiber optic connection system 80 at various field locations.

As depicted at FIGS. 36-47, the alignment sleeve assembly 450 may be assembled in multiple configurations including a proper predetermined configuration/orientation (as shown) but also in improper configuration/orientations (e.g., an orientation of the fiber alignment assembly 510 may be reversed). As the alignment sleeve assembly 450 may preferably be factory assembled on production machinery, the proper predetermined configuration/orientation of the alignment sleeve assembly 450 may be ensured by the production machinery.

An alternative alignment sleeve assembly 450' is illustrated at FIGS. 90-93. As will be further described below, the alignment sleeve assembly 450' may only be assembled in a proper predetermined configuration/orientation. The alignment sleeve assembly 450' is compatible with the fiber optic adapter 300 and may replace the alignment sleeve assembly 450 in the fiber optic adapter 300. The alignment sleeve assembly 450' may be factory assembled on production machinery or may be assembled/serviced in the field. By including features that prohibit improper assembly at the alignment sleeve assembly 450' assembly level, the fiber optic connection system 80 is made fool-resistant, more fool-proof, and/or poka-yoke and may prevent errors during the alignment sleeve assembly 450' assembly process.

Turning now to FIGS. 90-93, the alignment sleeve assembly 450' will be described in further detail. The alignment sleeve assembly 450' extends from a first end 452' to a second end 454'. A flange 456' is positioned between the first end 452' and the second end 454'. The alignment sleeve assembly 450' includes an exterior 458'. The exterior 458' includes a first keying surface 460', a second keying surface 462', a third keying surface 464', and a fourth keying surface 468'. As depicted, the second keying surface 462' and the third keying surface 464' are positioned on the flange 456'. The alignment sleeve assembly 450' includes a first entrance 470' positioned at the first end 452', and a second entrance 472', positioned at the second end 454'. The exterior 458' of the alignment sleeve assembly 450' is the same as or similar to the exterior 458 of the alignment sleeve assembly 450.

The alignment sleeve assembly 450' includes a first sleeve 480', a second sleeve 482', and a fiber alignment assembly 510'. The first sleeve 480' is positioned adjacent the first end 452', and the second sleeve 482' is positioned adjacent the second end 454'. As depicted, the first sleeve 480' and the second sleeve 482' are identical sleeves 480'. In other embodiments, the first sleeve 480' may be different from the second sleeve 482'. The sleeve 480' includes an outer end 484' opposite from an inner end 486'. The sleeve 480' includes a first keying feature 488' and a second keying feature 490'. As depicted, the first keying feature 488' and the second keying feature 490' are the same as or similar to the first keying feature 488 and the second keying feature 490, respectively. The first keying feature 488' forms the first keying surface 460' and the fourth keying surface 468' of the alignment sleeve assembly 450'. The second keying feature 490' forms the second keying surface 462' and the third keying surface 464' of the alignment sleeve assembly 450'. The sleeve 480' includes an exterior 492'. As depicted, the exterior 492' is the same as or similar to the exterior 492. The first keying feature 488' and the second keying feature 490' are included on the exterior 492'. The sleeve 480' includes a tubular portion 494', and a flange portion 496'. In the depicted embodiment, the tubular portion 494' is positioned adjacent the outer end 484', and the flange portion 496' is positioned adjacent the inner end 486'.

When the first sleeve 480' and the second sleeve 482' are assembled to form the alignment sleeve assembly 450', the inner ends 486' of the first sleeve 480' and the second sleeve 482' abut and seal against each other. The flange portion 496' of the first sleeve 480' and the second sleeve 482' thereby form the flange 456' of the alignment sleeve assembly 450'. The first sleeve 480' and the second sleeve 482' have orientations that are rotated from each other by 180 degrees, similar to the first sleeve 480 and the second sleeve 482 described above, when assembled to form the alignment sleeve assembly 450'. The sleeve 480' includes an interior 498'. The interior 498' includes a pocket portion 500' and a funnel portion 502'. A passage 504' extends between the outer end 484' and the inner end 486' of the sleeve 480' and through the pocket portion 500' and the funnel portion 502'.

The pocket portion 500' includes a pocket bottom 506'. The fiber alignment assembly 510', when assembled into the alignment sleeve assembly 450', is positioned within the pocket portions 500' of the first sleeve 480' and the second sleeve 482' and is captured between the pocket bottoms 506' of the first sleeve 480' and the second sleeve 482'. The fiber alignment assembly 510', when assembled into the alignment sleeve assembly 450', may seal against the pocket portions 500' of the first sleeve 480' and the second sleeve 482' and/or may seal against the pocket bottoms 506' of the first sleeve 480' and the second sleeve 482'.

To ensure the proper predetermined configuration/orientation of the alignment sleeve assembly 450', the first sleeve 480', the second sleeve 482', and the fiber alignment assembly 510' include features that prohibit improper assembly of the alignment sleeve assembly 450'. As depicted, a first set and a second set of the features that prohibit the improper assembly of the alignment sleeve assembly 450' are included. The first set or the second set alone is sufficient to prevent the improper assembly of the alignment sleeve assembly 450'.

The first set of features includes a raised portion 570 within the pocket portions 500' and a first step 572 and a second step 574 on the fiber alignment assembly 510'. As illustrated at FIGS. 91-93, the raised portion 570 of the pocket portion 500' of the first sleeve 480' interfaces with the first step 572, and the raised portion 570 of the pocket portion 500' of the second sleeve 482' interfaces with the second step 574. As depicted, the fiber alignment assembly 510' could be rotated 180 degrees about an axis A3 (see FIG. 92) thus swapping the first step 572 and the second step 574. In this rotated configuration, the raised portion 570 of the pocket portion 500' of the first sleeve 480' interfaces with the second step 574, and the raised portion 570 of the pocket portion 500' of the second sleeve 482' interfaces with the first step 572. Either the depicted configuration or the rotated configuration provides the proper predetermined configuration/orientation of the fiber alignment assembly 510' within the alignment sleeve assembly 450'.

The second set of features includes a fillet 580 within the pocket portions 500' and a first chamfer 582 and a second chamfer 584 on the fiber alignment assembly 510'. As illustrated at FIG. 90, the fillet 580 of the pocket portion 500' of the first sleeve 480' interfaces with the first chamfer 582, and the fillet 580 of the pocket portion 500' of the second sleeve 482' interfaces with the second chamfer 584. As depicted, the fiber alignment assembly 510' could be rotated 180 degrees about the axis A3 thus swapping the first chamfer 582 and the second chamfer 584. In this rotated configuration, the fillet 580 of the pocket portion 500' of the first sleeve 480' interfaces with the second chamfer 584, and the fillet 580 of the pocket portion 500' of the second sleeve 482' interfaces with the first chamfer 582. Either the depicted configuration or the rotated configuration provides the proper predetermined configuration/orientation of the fiber alignment assembly 510' within the alignment sleeve assembly 450'.

The first keying feature 488' of the first sleeve 480' forms the first keying surface 460' of the alignment sleeve assembly 450'. The second keying feature 490' of the first sleeve 480' forms the second keying surface 462' of the alignment sleeve assembly 450'. The second keying feature 490' of the second sleeve 482' forms the third keying surface 464' of the alignment sleeve assembly 450'. And, the first keying feature 488' of the second sleeve 482' forms the fourth keying surface 468' of the alignment sleeve assembly 450'. When the alignment sleeve assembly 450' is assembled into the fiber optic adapter 300, the first keying surface 460' is adjacent the third interior keying feature 408 of the second housing half-piece 342, the fourth keying surface 468' is adjacent the third interior keying feature 408 of the first housing half-piece 340, the second keying surface 462' is adjacent the fourth interior keying feature 410 of the second housing half-piece 342, and the third keying surface 464' is adjacent the fourth interior keying feature 410 of the first housing half-piece 340.

In the depicted embodiment, the alignment sleeve assembly 450' has the same form, fit, and function when it is rotated by 180 degrees, similar to the alignment sleeve assembly 450. Therefore, the first and the fourth keying surfaces 460', 468' may be swapped when installing the alignment sleeve assembly 450' in the fiber optic adapter 300. When the first and the fourth keying surfaces 460', 468' are swapped, the second and the third keying surfaces 462', 464' are also swapped. In other embodiments, the keying surfaces 460', 468' and 462', 464' cannot be swapped, and the alignment sleeve assembly 450' assembles into the fiber optic adapter 300 in a unique orientation.

The tubular portions 494' of the first sleeve 480' and the second sleeve 482' fit within and between the central sleeve portions 424, 434 of the housing half-pieces 340, 342 when the alignment sleeve assembly 450' is assembled in the fiber optic adapter 300. Likewise, the flange portions 496' of the first sleeve 480' and the second sleeve 482' fit within the half pockets 436 of the housing half-pieces 340, 342. The alignment sleeve assembly 450' is thereby retained within the fiber optic adapter 300. In the depicted embodiment, the tubular portion 494' has an exterior cross-sectional shape similar to the exterior cross-sectional shape of the housing 110 of the fiber optic connector 100. The fit of the portion of the housing 110 between the central connector portions 422 and 432 is similar to or the same as the fit of the tubular portion 494' between the central sleeve portions 424 and 434.

The fiber alignment assembly 510' extends between a first end 512' and a second end 514'. The fiber alignment assembly 510' includes a passage 516' (see FIG. 91) that extends between the first end 512' and the second end 514'. The fiber alignment assembly 510' includes a first V-block 520', a second V-block 522', a first gel block 540', and a second gel block 542'. In the depicted embodiment, the first V-block 520' and the second V-block 522' are identical V-blocks 520'. In other embodiments, the V-blocks 520', 522' may be different from each other. In the depicted embodiment, the first gel block 540' and the second gel block 542' are identical gel blocks 540'. In other embodiments, the gel blocks 540', 542' may be different from each other. The first V-block 520' and the second V-block 522' have orientations that are rotated from each other by 180 degrees about the axis A3 when assembled to form the fiber alignment assembly 510'. Likewise, the first gel block 540' and the second gel block 542' have orientations that are rotated from each other by 180 degrees about the axis A3 when assembled to form the fiber alignment assembly 510'. The fiber alignment assembly 510' therefore has the same form, fit, and function when it is rotated by 180 degrees about the axis A3. The fiber alignment assembly 510' therefore may be assembled into the alignment sleeve assembly 450' as shown or rotated by 180 degrees about the axis A3 from the orientation shown.

As depicted, the gel block 540' is similar to the gel block 540 but has a lower profile. In particular, a back side 590 of the gel block 540' is opposite a ridge 548 of the gel block 540'. The ridge 548 is the same on the gel blocks 540 and 540', but the back side 590 of the gel block 540' is spaced closer to the ridge 548 on the gel block 540' as compared to a spacing of the back side 590 of the gel block 540 and the ridge 548 on the gel block 540. The backside 590 is adapted to fit adjacent and seal against the raised portion 570 of the pocket portion 500'.

In the embodiment depicted at FIGS. 90-93, the backside 590 of the gel block 540' forms the first step 572 of the fiber alignment assembly 510', and the backside 590 of the gel block 542' forms the second step 574 of the fiber alignment assembly 510'. As depicted at FIG. 93, the gel block 540' fits between the second V-block 522' and the pocket bottom 506' of the first sleeve 480', and the gel block 542' fits between the first V-block 520' and the pocket bottom 506' of the second sleeve 482'. The gel block 540' may seal against the second V-block 522' and the pocket bottom 506' of the first sleeve 480', and the gel block 542' may seal against the first V-block 520' and the pocket bottom 506' of the second sleeve 482'. The gel block 540' may press against the second V-block 522' and press against the pocket bottom 506' of the first sleeve 480', and the gel block 542' may press against the first V-block 520' and press against the pocket bottom 506' of the second sleeve 482'. The gel block 540' may thereby urge the second V-block 522' against the pocket bottom 506' of the second sleeve 482' and seal the second V-block 522' against the pocket bottom 506' of the second sleeve 482'. Likewise, the gel block 542' may thereby urge the first V-block 520' against the pocket bottom 506' of the first sleeve 480' and seal the first V-block 520' against the pocket bottom 506' of the first sleeve 480'.

The gel blocks 540, 540' may be made of the same or similar materials, described and listed above. The gel blocks 540, 540' may have the same or similar sealing arrangement, described in detail above. The gel blocks 540, 540' may wipe/clean the optical fiber 88 in the same or similar manner, as described above.

As depicted, the V-block 520' is similar to the V-block 520 but includes a chamfer 592 (see FIG. 90). In the embodiment depicted at FIGS. 90-93, the chamfer 592 of the first V-block 520' forms the first chamfer 582 of the fiber alignment assembly 510', and the chamfer 592 of the second V-block 522' forms the second chamfer 584 of the fiber alignment assembly 510'.

As depicted at FIGS. 78-87, the fiber optic connector 100 may be assembled (i.e., loaded) in multiple orientations into the connector holder 830 of the holder 820 of the polishing tool 800. The depicted assembled orientation is a proper predetermined orientation. Other improper orientations are possible (e.g., the fiber optic connector 100 may be rotated 90, 180, or 270 degrees about the axis A2). As the polishing process may be done by a technician, the technician may ensure that the fiber optic connector 100 is assembled into the holder 830 at the proper predetermined orientation.

An alternative holder 820' is illustrated at FIGS. 94-99. The polishing tool 800 is compatible with the holder 820'. The holder 820' is similar to the holder 820 except that the connector holder 830' of the holder 820' includes an alignment feature 870. As depicted, the alignment feature 870 is included in a pocket 842' of the connector holder 830'. The holder 820' includes the base 822 of the holder 820. The base 822, when included on the holder 820', functions in the same or a similar manner to that described above. The holder 820' also includes the protrusion 824 of the holder 820. The protrusion 824, when included on the holder 820', functions in the same or a similar manner to that described above.

As depicted, the fiber optic connector 100 is not compatible with the connector holder 830' as the housing 110 of the fiber optic connector 100 would interfere with the alignment feature 870. However, as depicted at FIGS. 94, 95, 98, and 99, an alternative fiber optic connector 100' is compatible with the connector holder 830'. The fiber optic connector 100' is also compatible with the fiber optic adapter 300 and is generally otherwise compatible for use wherever the fiber optic connector 100 is used. The fiber optic connector 100' is the same as the fiber optic connector 100 except an alternative housing 110' replaces the housing 110. The housing 110' is the same as the housing 110 except an alignment feature 872 is added.

The fiber optic connector 100' may only be assembled to the holder 820' in one unique orientation which is a proper predetermined orientation. In particular, the alignment feature 870 of the holder 820' fits within the alignment feature 872 of the fiber optic connector 100'. By including features that prohibit improper assembly at the polishing process, the fiber optic connection system 80 is made fool-resistant, more fool-proof, and/or poka-yoke and may prevent errors during the polishing process. Upon assembly to the holder 820', the holder 820' holds and locates the fiber optic connector 100' by holding and locating the housing 110'. The housing 110' is held and located in the same or a similar manner as the holder 830 holds and locates the housing 110, as described above. The housing 110' is thereby accurately located with respect to the holder 820'. As the fiber optic cable 82, 82' is crimped and joined to the housing 110' by the plug 180, the optical fiber 88 is also accurately located with respect to the holder 820'. Upon the insertion of the fiber optic connector 100' into the holder 820', the tapered seat 146 of the radial compression feature 140 of the sheath 130 activates the radial compression feature 140 in the same or a similar manner to the activation of the radial compression feature of the fiber optic connector 100. Upon the tapered seat 146 being activated, the end 98 of the optical fiber 88 is firmly supported by the sheath 130 via the radial compression feature 140 which, in turn, is firmly supported by the holder 820'.

Referring now to FIGS. 100-107, a fiber optic connection system 1080 is illustrated. The fiber optic connection system 1080 is used to connect a first fiber optic cable 1082 to a second fiber optic cable 1092 (see FIG. 101). In particular, a first fiber optic connector 1100 is connected to a second fiber optic connector 1102 with a fiber optic adapter 1300. The first fiber optic connector 1100 terminates the first fiber optic cable 1082, and the second fiber optic connector 1102 terminates the second fiber optic cable 1092. As illustrated, the first fiber optic connector 1100 may be the same as the second fiber optic connector 1102. The fiber optic connection system 1080 includes aspects that are the same as or similar to the fiber optic connection system 80, discussed above.

When the first fiber optic connector 1100 and the second fiber optic connector 1102 are connected to the fiber optic adapter 1300, they are oriented 180 degrees with respect to each other about the axis A4 (see FIG. 100). This is similar to the connectors 100, 102 being oriented 180 degrees with respect to each other about the axis A1 when they are both connected to the fiber optic adapter 300.

As will be discussed in detail below, the fiber optic connection system 1080 includes aspects that are the same as or similar to SC fiber optic connection systems known in the art. In particular, a latching system 1318 includes a release sleeve 1240 and catches 1128 on the fiber optic connector 1100 and latches 1322 on the fiber optic adapter 1300 that are similar to a latching system on the SC fiber optic connection systems. Also, an exterior 1316 of the fiber optic adapter 1300 is similar to an exterior of fiber optic adapters of the SC fiber optic connection systems.

Similar to the fiber optic connection system 80, the fiber optic connection system 1080 allows either or both of the fiber optic connectors 1100, 1102 to be selectively connected and disconnected from the fiber optic adapter 1300. FIGS. 100 and 101 illustrate the fiber optic connectors 1100, 1102 each fully inserted into ports 1312, 1314 (see FIG. 119) of the fiber optic adapter 1300, respectively. In addition, FIGS. 100 and 101 illustrate the fiber optic connectors 1100, 1102 each latched to the fiber optic adapter 1300, and the release sleeve 1240 configured to a non-releasing configuration. In particular, the latches 1322 of the fiber optic adapter 1300 are latched to the respective catches 1128 of the fiber optic connectors 1100, 1102. FIGS. 103 and 104 illustrate the release sleeve 1240 of each of the fiber optic connectors 1100, 1102 pulled away from the fiber optic adapter 1300 to a releasing configuration thereby releasing the latches 1322 of the fiber optic adapter 1300 from the respective catches 1128 of the fiber optic connectors 1100, 1102. FIGS. 105 and 106 illustrate the release sleeve 1240 of each of the fiber optic connectors 1100, 1102 pulled further away from the fiber optic adapter 1300 thereby partially removing the fiber optic connectors 1100, 1102 from the ports 1312, 1314 of the fiber optic adapter 1300, respectively.

By individually pulling the release sleeve 1240 of each of the fiber optic connectors 1100, 1102 further away from the fiber optic adapter 1300, the fiber optic connectors 1100, 1102 can be individually fully removed from the fiber optic adapter 1300. Upon removal of the fiber optic connector 1100, 1102 from the fiber optic adapter 1300, the release sleeve 1240 automatically returns to the non-releasing configuration as it is biased toward the non-releasing configuration (e.g., by a spring).

Similar to the fiber optic connectors 100, 102, the fiber optic connectors 1100, 1102 automatically deploy a sheath 1130 to an extended configuration when the fiber optic connectors 1100, 1102 are removed from the fiber optic adapter 1300. In the depicted embodiment, a spring 1170 biases the sheath 1130 toward the extended configuration. In particular, as illustrated at FIGS. 106 and 107, the sheath 1130 is automatically deployed to the extended configuration before the fiber optic connectors 1100, 1102 are fully removed from the fiber optic adapter 1300.

To individually connect or reconnect either or both of the fiber optic connectors 1100, 1102 to the respective ports 1312, 1314 of the fiber optic adapter 1300, a key 1120 of the release sleeve 1240 of the fiber optic connectors 1100, 1102 is aligned with one of two slots 1402 of the fiber optic adapter 1300. The keys 1120 and the slots 1402 ensure that the fiber optic connectors 1100, 1102 are correctly oriented with respect to each other and with respect to the fiber optic adapter 1300. The keys 1120 and the slots 1402 further ensure poka-yoke assembly between the fiber optic connectors 1100, 1102 and the fiber optic adapter 1300.

Upon aligning the key 1120 and the slot 1402, a distal end portion 1104 of the fiber optic connector 1100, 1102 is inserted into the respective port 1312, 1314 of the fiber optic adapter 1300. Insertion of the distal end portion 1104 into the port 1312, 1314 causes a pair of the latches 1322 of the latching system 1318 to spread apart and allow the distal end portion 1104 to enter between the pair of the latches 1322. Insertion continues until the extended sheath 1130 contacts a fiber alignment portion 1450 of the fiber optic adapter 1300 (see FIGS. 106 and 107). Similar to the fiber optic connection system 80, further insertion of the fiber optic connector 1100, 1102 into the port 1312, 1314 results in an end 1098 of an optical fiber 1088 of the fiber optic cable 1082, 1092 penetrating the fiber alignment portion 1450, and no further penetration of the sheath 1130 into the port 1312, 1314. Similar to the fiber optic connection system 80, upon continued insertion of the fiber optic connector 1100, 1102 and penetration of the end 1098 into the fiber alignment portion 1450, the end 1098 is wiped and cleaned by the fiber alignment portion 1450 and the sheath 1130 is moved toward a retracted configuration, thereby compressing the spring 1170.

Upon full insertion of the fiber optic connector 1100, 1102 and full penetration of the end 1098 into the fiber alignment portion 1450, the end 1098 is substantially centered both in the fiber optic connector 1100, 1102 and the fiber alignment portion 1450 (see FIGS. 101 and 102). Upon full insertion of the fiber optic connector 1100, 1102, the pair of the latches 1322 of the latching system 1318 returns and latches the fiber optic connector 1100, 1102 to the fiber optic adapter 1300 (see FIG. 101). Upon full insertion of the fiber optic connector 1100, 1102, the sheath 1130 is positioned at the retracted configuration. Upon full insertion of both of the fiber optic connectors 1100 and 1102, the ends 1098 meet and become optically connected (see FIG. 102). Buckling of either or both of the optical fibers 1088 may be used as a mechanism for accommodating tolerances of the fiber optic connectors 1100, 1102 and/or optical fibers 1088, similar to the buckling of the optical fiber 82*b*, illustrated at FIG. 10.

Referring now to FIGS. 108-117, the fiber optic connector 1100 will be described in detail. As depicted, the fiber optic connector 1100 is the same as the fiber optic connector 1102. Therefore, the fiber optic connector 1102 follows the fiber optic connector 1100 and will generally not be described duplicatively. The fiber optic connector 1100 includes a connector body 1110, the sheath 1130, the spring 1170, the plug 180, a cable attachment member 1600, and the release sleeve 1240. In certain embodiments, the fiber optic connector 1100 may include the sleeve 210. The features and functions of the plug 180 and the sleeve 210 are described in detail above with respect to the fiber optic connector 100 and are similar in application to the fiber optic connector 1100.

As mentioned above, the fiber optic connector 1100 is similar to the fiber optic connector 100. In particular, the connector body 1110 is similar to the housing 110. The connector body 1110 includes an interior 1118 similar to the interior 118 of the housing 110 (see FIG. 115). The interior 1118 includes a bore 1122 similar to the bore 122, a shoulder 1124 similar to the shoulder 124, and a bore 1126 similar to the bore 126. The sheath 1130 is similar to the sheath 130 and is similarly positioned in and slides within the interior 1118 of the connector body 1110. The sheath 1130 is slidingly mounted within the connector body 1110. As depicted, the sheath 1130 is shorter than the sheath 130. The sheath 1130 similarly protects the optical fiber 1088 when the sheath 1130 is in the extended configuration. The sheath 1130 similarly grips and locates the optical fiber 1088 with a radial compression feature 1140 when the end 1098 of the optical fiber 1088 is being polished. The spring 1170 is similar to or the same as the spring 170 and has the same or similar function. The plug 180 is similarly mounted to the connector body 1110 (e.g., in the bore 1122). The sleeve 210, when present in an embodiment of the fiber optic connector 1100, functions and fits in a similar manner as described above with regards to certain embodiments of the fiber optic connector 100.

As mentioned above, the fiber optic connector 1100 has similarities to an SC connector of the SC fiber optic connection system. In particular, an exterior 1116 of the connector body 1110 is similar to an exterior of an SC connector body in that it facilitates the slidable mounting of the release sleeve 1240 over the exterior 1116, and in that the exterior 1116 includes a pair of the catches 1128, mentioned above (see FIG. 114).

The cable attachment member 1600 extends between a distal end portion 1602 and a proximal end portion 1604 and includes a pair of tabs 1606 similar to a pair of tabs of the SC connector. The connector body 1110 mounts over the distal end portion 1602 of the cable attachment member 1600, and the pair of the tabs 1606 engages a pair of slots 1129 of the connector body 1110 and thereby connects the connector body 1110 to the cable attachment member 1600.

The release sleeve 1240 is similar to a release sleeve of the SC connector. In particular, the release sleeve 1240 includes a set of releasing ramps 1242 that engages a set of releasing features 1326 of the pair of the latches 1322 of the latching system 1318 to free the pair of the catches 1128 from a pair of hooks 1325 of the latches 1322 (see FIGS. 114, 117, and 119). The release sleeve 1240 also includes a set of connecting ramps 1244 that facilitate connection of the fiber optic connector 1100 to the fiber optic adapter 1300 by engaging connecting ramps 1324 of the pair of the latches 1322 of the latching system 1318 and by spreading apart the pair of the latches 1322 when the fiber optic connector 1100 is inserted into the fiber optic adapter 1300. As mentioned above, the key 1120 is included on the release sleeve 1240. The release sleeve 1240 further includes gripping features 1246 (see FIGS. 114-116). A pair of alignment features 1248 of the release sleeve 1240 interfaces with a pair of alignment features 1121 of the connector body 1110 to ensure a unique orientation between the release sleeve 1240 and the connector body 1110 and poka-yoke assembly of the fiber optic connector 1100.

In addition to the pair of the tabs 1606, mentioned above, the cable attachment member 1600 includes a passage 1608 and a pair of openings 1610 (see FIGS. 114-117). The passage 1608 extends through the cable attachment member 1600 from the distal end portion 1602 to the proximal end portion 1604 and includes a distal portion 1608*d* and a proximal portion 1608*p*. As depicted, the distal portion 1608*d* is larger in diameter than the proximal portion 1608*p*. The distal portion 1608*d* fits over a mating feature 1127 of the connector body 1110 when the fiber optic connector 1100 is assembled and also surrounds a portion of the bore 1122 and at least a portion of the plug 180. The openings 1610 provide access to the plug 180 when the connector body 1110, the sheath 1130, the spring 1170, and the plug 180 are assembled together. A pair of anvils of a crimping tool (not shown) can reach through the openings 1610 from opposite sides of the plug 180 and thereby crimp the crimping portion 200 of the plug 180 with the cable attachment member 1600 assembled to the connector body 1110. The crimping of the plug 180 secures the position of the end 1098 of the optical fiber 1088 with respect to the connector body 1110, similar to the above description concerning the optical fiber 88 and the housing 110 and the plug 180 of the fiber optic connector 100.

The fiber optic cables 1082 and 1092 may be the same type of fiber optic cable, or they may be different types of fiber optic cables. The fiber optic cables 1082 and 1092 may be similar to the fiber optic cables 82, 82', 92, and/or 92', discussed above. In FIGS. 116 and 117, the fiber optic cable 1082 is illustrated with certain optional features by way of example only. In particular, the fiber optic cable 1082 includes the optical fiber 1088 with a coating 1090, a buffer layer 1108, strength members 1107, and a jacket 1109. As the fiber optic cable 1082, illustrated at FIGS. 116 and 117, includes the buffer layer 1108, the fiber optic connector 1100 is configured without the sleeve 210, similar to the fiber optic connector 100, as configured at FIGS. 22 and 23. The discussion above, pertaining to the fiber optic connector 100, as configured at FIGS. 22 and 23 similarly applies to the fiber optic connector 1100, as configured at FIGS. 116 and 117. For example, the compression portion 190 of the plug 180 may bear down directly on the buffer layer 1108 when the crimping portion 200 of the plug 180 is crimped.

The fiber optic connector 1100, as configured at FIGS. 116 and 117, includes a sleeve 1650. The sleeve 1650 may be a crimp sleeve. The sleeve 1650 extends from a first end 1652 to a second end 1654. The sleeve 1650 includes an interior surface 1656 positioned over a gripping portion 1620 of the cable attachment member 1600. The strength members 1107 of the fiber optic cable 1082 may be secured to the cable attachment member 1600, and thereby secured to the fiber optic connector 1100, by positioning the strength members 1107 over the gripping portion 1620 and sliding the sleeve 1650 over the gripping portion 1620. The sleeve 1650 may further be crimped over the strength members 1107 and the gripping portion 1620.

Other components typically found on SC connectors can be included on the fiber optic connector 1100. For example, a strain-relief boot, a shrink tube, adhesive, epoxy, external clips, straps, a cap, etc. can be included on the fiber optic connector 1100.

An example assembly sequence for connectorizing the fiber optic cable 1082 with the fiber optic connector 1100 includes preparing the fiber optic cable 1082 (e.g., cutting the jacket 1109, stripping the buffer layer 1108 and/or the coating 1090, trimming the strength members 1107, etc.); pre-applying the sleeve 1650 over the fiber optic cable 1082; connecting the cable attachment member 1600 to the connector body 1110; inserting the end 1098 of the optical fiber 1088 through the passage 1608 of the cable attachment member 1600, the interior passage 216 of the sleeve 210, the interior passage 186 of the plug 180, a helical coil 1176 of the spring 1170, a passage 1136 of the sheath 1130, and/or the interior 1118 of the connector body 1110; axially locating the end 1098 of the optical fiber 1088 with respect to the connector body 1110;

crimping the crimp portion 200 of the plug 180 to secure the axial location of the optical fiber 1088; positioning the strength members 1107 over the gripping portion 1620, positioning the sleeve 1650 over the gripping portion 1620 and over the strength members 1107; crimping the sleeve 1650 to the gripping portion 1620 and to the strength members 1107; installing the release sleeve 1240 over the connector body 1110; connecting the connector body 1110 to a polishing tool (e.g., a polishing tool similar to the holder 820); polishing the end 1098 of the optical fiber 1088 with a polishing tool (e.g., a polishing tool similar to the base 802); angling the end 1098 of the optical fiber 1088 with the polishing tool; and releasing the connector body 1110 from the polishing tool.

As mentioned above, the fiber optic adapter 1300 has similarities to an SC adapter of the SC fiber optic connection system. In particular, the latches 1322 of the latching system 1318, the slots 1402, a form and fit of the exterior 1316, a pair of flanges 1308, and connector guides 1330 of the fiber optic adapter 1300 are similar to and function similar to corresponding features of the SC adapter. Other SC adapter components, such as external clips, plugs, mounting features, mounting brackets, etc. can be included on the fiber optic adapter 1300.

As mentioned above, the fiber optic adapter 1300 has similarities to the fiber optic adapter 300. In particular, the fiber alignment portion 1450 is similar to the alignment sleeve assembly 450, 450' of the fiber optic adapter 300. The fiber alignment portion 1450 includes a fiber alignment assembly 1510 similar to the fiber alignment assembly 510, 510' (see FIGS. 102 and 107). The fiber alignment assembly 1510 includes a first V-block 1520, a second V-block 1522, a first gel block 1540, and a second gel block 1542 similar to and positioned similar to the first V-block 520', the second V-block 522', the first gel block 540', and the second gel block 542', respectively.

Referring now to FIGS. 118-120, the fiber optic adapter 1300 will be described in further detail. The fiber optic adapter 1300 extends from a first end 1302 to a second end 1304. An intermediate portion 1306 is positioned between the first end 1302 and the second end 1304. In the depicted embodiment, a mounting flange 1308 is positioned over the intermediate portion 1306. The mounting flange 1308 may be attached to or integrated with the exterior 1316 of the fiber optic adapter 1300. The fiber optic adapter 1300 includes a housing 1310, and the fiber alignment portion 1450 is housed within the housing 1310. The housing 1310 includes the first port 1312 and the second port 1314 at the first end 1302 and the second end 1304, respectively.

In the depicted embodiment, the fiber optic adapter 1300 includes the housing 1310 that is constructed of a first housing half-piece 1340 and a second housing half-piece 1342. In the depicted embodiment, the first housing half-piece 1340 and the second housing half-piece 1342 are identical housing half-pieces 1340. In the depicted embodiment, the housing half-piece 1340 is a one-piece half-piece (e.g. a unitary half-piece, a monolithic half-piece, etc.). The first housing half-piece 1340 extends between a first end 1344 and a second end 1346. The housing half-piece 1340 includes a joining interface 1348. The joining interface 1348 allows the joining of the first housing half-piece 1340 to the second housing half-piece 1342. In certain embodiments, an adhesive (e.g., a glue, a bonding agent, etc.) is applied at the joining interface 1348 to join the first housing half-piece 1340 to the second housing half-piece 1342. In other embodiments, one or more fasteners or latches may join the first housing half-piece 1340 to the second housing half-piece 1342. The first housing half-piece 1340 is positioned adjacent the first end 1302 and defines the first port 1312, and the second housing half piece 1342 is positioned adjacent the second end 1304 and defines the second port 1314. When the half-pieces 1340, 1342 are connected together, the first end 1344 of the first housing half-piece 1340 corresponds to the first end 1302. Likewise, the first end 1344 of the second housing half-piece 1342 corresponds with the second end 1304. When the half-pieces 1340, 1342 are connected together, they are oriented 180 degrees with respect to each other about the axis A4 (see FIG. 100). The second ends 1346 of the half-pieces 1340, 1342 meet each other at the joining interface 1348. As depicted, the joining interface 1348 includes a joining plane 1350. As depicted, the joining plane 1350 is perpendicular to the optical fibers 1088 when the fiber optic connectors 1100, 1102 are connected to the fiber optic adapter 1300.

In the depicted embodiment, the housing half-piece 1340 includes a sleeve portion 1480 positioned adjacent the second end 1346. The sleeve portion 1480 is similar to the sleeve 480 of the alignment sleeve assembly 450 and the sleeve 480' of the alignment sleeve assembly 450', described in detail above. However, as depicted, the sleeve portion 1480 is integrated with the housing half-piece 1340. In other embodiments, the sleeve portion 1480 may be included on a separate part. As shown at FIG. 120, the sleeve portions 1480 of the first and the second housing half-pieces 1340, 1342 join together to form a housing for the fiber alignment assembly 1510. The sleeve portions 1480 of the first and the second housing half-pieces 1340, 1342 and the fiber alignment assembly 1510 form, at least in part, the fiber alignment portion 1450. The fiber alignment assembly 1510 may seal on one or more sides with the sleeve portions 1480. The sleeve portion 1480 includes a protrusion 1483 (e.g., a tubular protrusion) with an end 1484. The end 1484 interfaces with the sheath 1130 of the fiber optic connector 1100. In particular, the end 1484 causes the sheath 1130 to move to the retracted configuration when the fiber optic connector 1100 is inserted into the fiber optic adapter 1300.

Turning now to FIGS. 121-125, a fiber alignment assembly 1510' with certain similarities to the fiber alignment assemblies 510, 510', and 1510 is illustrated. In general, the various features, dimensional characteristics, and/or components of the fiber alignment assemblies 510, 510', 1510, and 1510' may be recombined with each other to form additional embodiments of a fiber alignment assembly. In the following discussion, new features will be described while features relating to previously described features may rely on the related earlier description.

The fiber alignment assembly 1510' includes an undulating fiber path (e.g., an undulating fiber passage). The undulating fiber path/passage does not necessarily need to be enclosed. As illustrated, the undulating fiber path may be defined by a pair of blocks 1520', 1522'. The blocks 1520', 1522' may be identical to each other. The undulating fiber path may be defined by grooves (e.g., V-grooves) 1528'. The fiber passage includes an undulating portion with a first contact 1529 (see FIG. 123) adapted to contact a first optical fiber and a second contact 1529' (see FIG. 124) adapted to contact a second optical fiber. The first contact 1529 urges a first angled end face of the first optical fiber in a first lateral direction. The second contact urges a second angled end face of the second optical fiber in a second lateral direction opposite the first lateral direction. The first angled end face and the second angled end face are thereby urged together. As depicted, the undulating fiber path is included within an intermediate portion 1518 positioned between the first and the second ends of the fiber passage. The intermediate portion 1518 is also adapted to align the first and the second optical fibers.

Turning now to FIGS. 126-130, a fiber optic connection system 1080' with certain similarities to the fiber optic connection system 1080 (see FIGS. 100-107) is illustrated. In general, the various features, dimensional characteristics, and/or components of the fiber optic connection system 1080 may be recombined with each other to form additional embodiments of a fiber optic connection system. In the following discussion, new features will be described while features relating to previously described features may rely on the related earlier description.

The fiber optic connection system 1080' includes proportions that are the same as or similar to the SC fiber optic connection system, known in the art of fiber optic connection systems. In particular, a fiber optic adapter 1300' includes proportions, components, and features that are the same as or similar to an SC fiber optic adapter (see FIGS. 131-133). In addition, a first fiber optic connector 1100' and a second fiber optic connector 1102' include proportions, components, and features that are the same as or similar to an SC fiber optic connector (see FIGS. 138 and 139). The first fiber optic connector 1100' and the second fiber optic connector 1102' may be the same fiber optic connector 1100'.

Turning now to FIGS. 134-137, the fiber optic connector 1100' is shown in a converted configuration of an SC compatible connector 1400. The fiber optic connector 1100' is converted into the SC compatible connector 1400 by adding a ferrule adaptation 1404 (see FIGS. 140-144). The ferrule adaptation 1404 extends between a first end 1412 and a second end 1414. The first end 1412 of the ferrule adaptation 1404 is adapted to abut the distal end of the sheath, and the second end 1414 of the ferrule adaptation 1404 is adapted to hold an end portion of an optical fiber when the ferrule adaptation converts the fiber optic connector 1100' into the SC compatible connector 1400. The housing 1416 includes a bore 1418 and a shoulder 1420. The sheath and the ferrule adaptation 1404 are positioned within the bore 1418. A shoulder 1422 of the ferrule adaptation 1404 abuts the shoulder 1420 of the bore 1418 when the ferrule adaptation 1404 converts the fiber optic connector 1100' into the SC compatible connector 1400 (see FIGS. 139 and 144).

The fiber optic connector 1100' may further include a spring 1424 that biases the sheath toward the extended configuration. The spring 1424 urges the distal end of the sheath and the second end of the ferrule adaptation 1404 together. The spring 1424 also urges the shoulder 1422 of the ferrule adaptation 1404 and the shoulder 1420 of the bore 1418 together when the ferrule adaptation 1404 converts the fiber optic connector 1100' into the SC compatible connector 1400. The ferrule adaptation 1404 may be assembled into the bore 1418 through the distal end of the housing 1416 with a snap-fit connection 1426. The snap-fit connection may include at least one resilient member 1428 at the first end 1412 of the ferrule adaptation 1404.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An optical fiber connection system comprising:
   a first optical fiber including an end portion with an end;
   a fiber optic adapter comprising:
      a housing including a first port and a second port; and
      a fiber alignment apparatus including a first V-block and a first gel block, the fiber alignment apparatus positioned between the first port and the second port;
   a first fiber optic connector comprising:
      a housing extending between a proximal end and a distal end, the first optical fiber extending through the housing and attached to the housing, the end portion of the first optical fiber positioned outside the housing beyond the distal end of the housing; and
      a sheath slidably connected to the housing, the sheath slidable between an extended configuration and a retracted configuration, the sheath covering the end portion of the first optical fiber when the sheath is at the extended configuration, and the sheath exposing the end portion of the first optical fiber when the sheath is at the refracted configuration.

2. The optical fiber connection system of claim 1, wherein the first optical fiber includes a coating.

3. The optical fiber connection system of claim 2, wherein the coating is stripped off of the end portion of the first optical fiber.

4. The optical fiber connection system of claim 3, wherein the coating is pre-stripped off of the end portion of the first optical fiber before the first optical fiber is attached to the housing.

5. The optical fiber connection system of claim 3, wherein the coating is post-stripped off of the end portion of the first optical fiber after the first optical fiber is attached to the housing.

6. The optical fiber connection system of claim 1, wherein the first optical fiber is slid between the first V-block and the first gel block when the first fiber optic connector is connected to the fiber optic adapter.

7. The optical fiber connection system of claim 6, wherein the first gel block cleans contaminants from the end of the first optical fiber while the first optical fiber is sliding between the first V-block and the first gel block.

8. The optical fiber connection system of claim 7, wherein the end of the first optical fiber is an angled end that faces toward the first gel block while the first optical fiber is sliding between the first V-block and the first gel block, wherein the angled end displaces a displaced portion of the first gel block while the first optical fiber is sliding between the first V-block and the first gel block, and wherein the displaced portion of the first gel block wipes the contaminants from the angled end of the first optical fiber while the first optical fiber is sliding between the first V-block and the first gel block.

9. The optical fiber connection system of claim 1, wherein the fiber optic adapter connects the first optical fiber of the first fiber optic connector to a second optical fiber of a second fiber optic connector, the fiber optic adapter further comprising:
   a fiber passage extending from a first end to a second end, the fiber passage adapted to receive the first optical fiber through the first end of the fiber passage and adapted to receive the second optical fiber through the second end of the fiber passage, the fiber passage including;
      an intermediate portion positioned between the first and the second ends of the fiber passage, the intermediate portion adapted to align the first and the second optical fibers when the first and the second fiber optic connectors are both connected to the fiber optic adapter;
      a first portion positioned between the first end of the fiber passage and the intermediate portion of the fiber passage, the first portion of the fiber passage including a first groove; and
      a second portion positioned between the second end of the fiber passage and the intermediate portion of the fiber passage, the second portion of the fiber passage including a second groove;

wherein the first gel block includes at least a portion positioned within the first groove; and wherein a second gel block includes at least a portion positioned within the second groove.

10. The optical fiber connection system of claim 9, wherein the first groove and the second groove each extend into the intermediate portion of the fiber passage and overlap each other to form a fiber alignment portion of the fiber passage and wherein the fiber alignment portion of the fiber passage is adapted to align the first and the second optical fibers when the first and the second fiber optic connectors are both connected to the fiber optic adapter.

11. The optical fiber connection system of claim 9, wherein the first gel block fills the first groove along at least a portion of the first portion of the fiber passage and the second gel block fills the second groove along at least a portion of the second portion of the fiber passage when no fiber optic connectors are connected to the fiber optic adapter.

12. The optical fiber connection system of claim 11, wherein the first and the second gel blocks seal the intermediate portion of the fiber passage.

13. The optical fiber connection system of claim 9, wherein the first gel block is adapted to clean an end portion of the first optical fiber when the first fiber optic connector is connected to the fiber optic adapter and the second gel block is adapted to clean an end portion of the second optical fiber when the second fiber optic connector is connected to the fiber optic adapter.

14. The optical fiber connection system of claim 1, wherein the sheath is adapted to slide over the end portion of the first optical fiber that extends beyond the distal end of the housing when the sheath is slid to the extended configuration, the sheath is adapted to slide over the end portion of the first optical fiber to expose the end portion of the first optical fiber when the sheath is slid to the retracted configuration, and the sheath includes a compression member at a distal end of the sheath adapted to hold the end portion of the first optical fiber when the end portion of the first optical fiber is being polished, the compression member adapted to release the end portion of the first optical fiber when the first optical fiber is not being polished.

15. The optical fiber connection system of claim 14, further comprising a spring that biases the sheath toward the extended configuration.

16. The optical fiber connection system of claim 14, further comprising a crimp member adapted to attach the housing to the first optical fiber.

17. The optical fiber connection system of claim 16, further comprising a spring that biases the sheath toward the extended configuration, wherein the crimp member is also a spring stop that retains the spring.

18. The optical fiber connection system of claim 14, wherein the compression member includes a collet.

19. The optical fiber connection system of claim 14, further comprising a ferrule adaptation adapted to convert the first fiber optic connector into an SC compatible connector.

20. The optical fiber connection system of claim 19, wherein the ferrule adaptation extends between a first end and a second end, the first end of the ferrule adaptation adapted to abut the distal end of the sheath and the second end of the ferrule adaptation adapted to hold the end portion of the first optical fiber when the ferrule adaptation converts the first fiber optic connector into the SC compatible connector.

21. The optical fiber connection system of claim 1, where the first fiber optic connector includes a ferrule-less configuration and a ferruled configuration, the end portion of the first optical fiber adapted to be directly held by alignment features of the fiber optic adapter when the first fiber optic connector is in the ferrule-less configuration, and the end portion of the first optical fiber adapted to be held by alignment features of a second fiber optic adapter via a ferrule of the first fiber optic connector when the first fiber optic connector is in the ferruled configuration, the first fiber optic connector further comprising:

a release member arrangement adapted to release the first fiber optic connector from the fiber optic adapter and also adapted to release the first fiber optic connector from the second fiber optic adapter.

22. The optical fiber connection system of claim 21, wherein the release member arrangement includes a release member adapted to release the first fiber optic connector from the fiber optic adapter and also adapted to release the first fiber optic connector from the second fiber optic adapter.

23. The optical fiber connection system of claim 21, further comprising a ferrule adaptation adapted to serve as the ferrule of the first fiber optic connector when the first fiber optic connector is in the ferruled configuration.

24. The optical fiber connection system of claim 21, wherein the sheath is slidable between the extended configuration and the retracted configuration at least when the first fiber optic connector is in the ferrule-less configuration, wherein the sheath is adapted to slide over the end portion of the first optical fiber when the sheath is slid to the extended configuration, and wherein the sheath is adapted to slide over the end portion of the first optical fiber to expose the end portion of the first optical fiber when the sheath is slid to the refracted configuration.

* * * * *